US012647665B2

(12) United States Patent
Shin et al.

(10) Patent No.: US 12,647,665 B2
(45) Date of Patent: Jun. 2, 2026

(54) CAMERA MODULE AND ELECTRONIC DEVICE COMPRISING SAME

(71) Applicant: Samsung Electronics Co., Ltd., Gyeonggi-do (KR)

(72) Inventors: Jeongkil Shin, Gyeonggi-do (KR); Dongok Choi, Gyeonggi-do (KR); Min Heu, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/382,138

(22) Filed: Oct. 20, 2023

(65) Prior Publication Data

US 2024/0129609 A1 Apr. 18, 2024

Related U.S. Application Data

(63) Continuation-in-part of application No. PCT/KR2022/016335, filed on Oct. 25, 2022.

(30) Foreign Application Priority Data

Oct. 25, 2021 (KR) ........................ 10-2021-0143003
Jan. 21, 2022 (KR) ........................ 10-2022-0009042

(51) Int. Cl.
*H04N 23/55* (2023.01)
*G02B 9/60* (2006.01)
(Continued)

(52) U.S. Cl.
CPC .............. *H04N 23/55* (2023.01); *G02B 9/60* (2013.01); *G02B 9/62* (2013.01); *H04N 23/57* (2023.01);
(Continued)

(58) Field of Classification Search
CPC ...... H04N 23/55; H04N 23/57; H04N 23/671; H04N 23/685; H04N 23/00; H04N 23/687;
(Continued)

(56) References Cited

U.S. PATENT DOCUMENTS 9,250,425 B2    2/2016  Hagiwara
9,316,810 B2    4/2016  Mercado
(Continued)

FOREIGN PATENT DOCUMENTS

KR    10-2014-0071864 A    6/2014
KR    10-2018-0023354 A    3/2018
(Continued)

OTHER PUBLICATIONS

International Search Report dated Feb. 14, 2023.

*Primary Examiner* — Abdelaaziz Tissire
(74) *Attorney, Agent, or Firm* — Sughrue Mion, PLLC

(57) ABSTRACT

In certain embodiments, an electronic device comprises: a housing; and a camera at least partially disposed in the housing, wherein the camera includes: a casing; a first one or more lenses at least partially disposed inside a first part of the casing that is at least partially exposed to outside of the housing, the first one or more lenses having positive refractive power, wherein the first one or more lenses forms a first optical axis; a second one or more lenses disposed inside a second part of the casing that is disposed inside the housing forming a second optical axis substantially perpendicular to the first optical axis; a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being (Continued)

configured to receive an optical signal passing through the second one or more lenses and generate an electrical signal based on the optical signal.

20 Claims, 47 Drawing Sheets

(51) Int. Cl.
| | |
|---|---|
| *G02B 9/62* | (2006.01) |
| *H04N 23/57* | (2023.01) |
| *H04N 23/67* | (2023.01) |
| *H04N 23/68* | (2023.01) |

(52) U.S. Cl.
CPC ......... *H04N 23/671* (2023.01); *H04N 23/685* (2023.01)

(58) Field of Classification Search
CPC ... G02B 9/60; G02B 9/62; G02B 9/10; G02B 9/34; G02B 9/64; G02B 13/00; G02B 13/0065; G02B 13/02; G03B 3/00; G03B 5/02; G03B 13/36; G03B 17/12; G03B 17/17
See application file for complete search history.

(56) References Cited

U.S. PATENT DOCUMENTS

| | | | |
|---|---|---|---|
| 9,557,627 | B2 | 1/2017 | Mercado |
| 10,334,146 | B2 | 6/2019 | Im et al. |
| 10,429,614 | B2 | 10/2019 | Mercado |
| 10,594,911 | B2 | 3/2020 | Im et al. |
| 10,884,237 | B2 | 1/2021 | Cho et al. |
| 10,955,658 | B2 | 3/2021 | Cho et al. |
| 11,029,496 | B2 | 6/2021 | Yao et al. |
| 11,054,618 | B2 | 7/2021 | Lee et al. |
| 11,106,010 | B2 | 8/2021 | Lee et al. |
| 11,112,582 | B2 | 9/2021 | Mercado |
| 11,112,589 | B2 | 9/2021 | Song et al. |
| 11,268,829 | B2 | 3/2022 | Yedid et al. |
| 11,268,830 | B2 | 3/2022 | Yedid et al. |
| 11,277,550 | B2 | 3/2022 | Im et al. |
| 11,733,064 | B1 | 8/2023 | Yedid et al. |
| 11,762,217 | B1 | 9/2023 | Ouyang et al. |
| 11,867,535 | B2 | 1/2024 | Yedid et al. |
| 2014/0152887 | A1 | 6/2014 | Hagiwara |
| 2015/0253543 | A1* | 9/2015 | Mercado ................ G02B 13/02 348/370 |
| 2015/0253647 | A1 | 9/2015 | Mercado |
| 2016/0231540 | A1 | 8/2016 | Mercado |
| 2018/0059376 | A1* | 3/2018 | Lin ................... G02B 13/0065 |
| 2018/0067335 | A1 | 3/2018 | Chen et al. |
| 2018/0367714 | A1* | 12/2018 | Im ........................ H04N 23/687 |
| 2019/0196148 | A1* | 6/2019 | Yao ................... G02B 13/0035 |
| 2019/0204570 | A1 | 7/2019 | Song et al. |
| 2021/0048628 | A1* | 2/2021 | Shabtay ............. G02B 13/0045 |
| 2021/0063701 | A1 | 3/2021 | Son et al. |
| 2021/0072515 | A1* | 3/2021 | Chang ................... G02B 17/08 |
| 2021/0294074 | A1 | 9/2021 | Yao et al. |
| 2021/0356712 | A1 | 11/2021 | Lee et al. |
| 2022/0057602 | A1 | 2/2022 | Mercado |
| 2022/0159155 | A1 | 5/2022 | Im et al. |
| 2022/0342276 | A1 | 10/2022 | Min et al. |
| 2023/0393412 | A1 | 12/2023 | Ouyang et al. |

FOREIGN PATENT DOCUMENTS

| | | | |
|---|---|---|---|
| KR | 10-2018-0077609 | A | 7/2018 |
| KR | 10-2018-0137277 | A | 12/2018 |
| KR | 10-2019-0133586 | A | 12/2019 |
| KR | 10-2067069 | B1 | 1/2020 |
| KR | 10-2020-0087214 | A | 7/2020 |
| KR | 10-2021-0000069 | A | 1/2021 |
| KR | 10-2021-0027183 | A | 3/2021 |
| WO | 2019/207464 | A2 | 10/2019 |

* cited by examiner

450

501

<Focusing>

<Pitch>

<Yaw>

<u>601</u>

<Focusing>

<Pitch>

<Yaw>

701

\<Focusing\>

\<Pitch\>

\<Yaw\>

<Focusing>

<Pitch>

<Yaw>

CAMERA MODULE AND ELECTRONIC DEVICE COMPRISING SAME

CROSS REFERENCE TO RELATED APPLICATIONS

This application claims priority to PCT Application PCT/KR2022/016335, filed on Oct. 25, 2022, which claims priority to Korean Patent Applications KR-10-2021-0143003 filed Oct. 25, 2021 and KR-10-2022-0009042 filed Jan. 21, 2022 in the Korean Intellectual Property Office, the disclosures of which are herein incorporated by reference.

BACKGROUND

1. Technical Field

Embodiments of the disclosure described herein relate to a camera and an electronic device including the same.

2. Description of Related Art

A mobile electronic device, such as a smartphone, may include a camera. The camera may include a one or more lenses and an image sensor. The one or more lenses may include a plurality of lenses that receive incident light. The image sensor generates an electrical signal from the incident light that passes through the one or more lens. The camera may be configured to perform an image stabilization function for correcting image shake in response to disturbance and an auto focus function for changing a focal length. Image stabilization compensates for small movements of the user hand, such as from shaking. Lenses can have various fields of view and focal lengths, such as a wide angle lens and a telephoto lens.

To secure a long focal length, the camera including the telephoto lens in the related art includes a reflective member (e.g., a prism) and is configured to reflect incident light at an angle of 90 degrees. However, to obtain sufficient brightness, a lens aperture is required to be increased according to the increased focal length. A limited thickness of the mobile electronic device restricts an increase in the lens aperture, and therefore some cameras include a partially cut lens. Lens cutting may cause difficulties in a manufacturing process, and sufficient brightness may not be provided.

Embodiments of the disclosure provide a camera for securing sufficient brightness without lens cutting and providing an auto focus function and an image stabilization function and an electronic device including the camera. The camera may obtain a high-magnification telephoto image without deterioration in image quality.

SUMMARY

In certain embodiments, an electronic device comprises: a housing; and a camera at least partially disposed in the housing, wherein the camera includes: a casing; a first one or more lenses at least partially disposed inside a first part of the casing that is at least partially exposed to outside of the housing, the first one or more lenses having positive refractive power, wherein the first one or more lenses forms a first optical axis; a second one or more lenses disposed inside a second part of the casing that is disposed inside the housing forming a second optical axis substantially perpendicular to the first optical axis; a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being configured to receive an optical signal passing through the second one or more lenses and generate an electrical signal based on the optical signal.

In certain embodiments, a camera comprises: a casing including a first part protruding from a second part; a first one or more lenses disposed inside the first part of the casing, the one or more lenses having positive refractive power, wherein the first one or more lenses form a first optical axis; a second one or more lenses disposed inside the second part of the casing, the second one or more lenses forming a second optical axis substantially perpendicular to the first optical axis; a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being configured to receive an optical signal passing through the second one or more lenses and generate an electrical signal based on the optical signal.

BRIEF DESCRIPTION OF THE DRAWINGS

In the following description made with respect to the accompanying drawings, identical or similar components will be assigned with identical or similar reference numerals.

DETAILED DESCRIPTION

A camera according to the embodiment of the disclosure can include a bright single-focus telephoto lens disposed in a portion protruding outside the housing of the electronic device. Additionally, the camera can provide image correction by rotating a reflective member, thereby obtaining a high-quality telephoto image.

The technical problems to be solved by the disclosure are not limited to the aforementioned problems, and any other technical problems not mentioned herein will be clearly understood from the following description by those skilled in the art to which the disclosure pertains.

Hereinafter, certain embodiments of the disclosure will be described with reference to accompanying drawings. However, this is not intended to limit the present invention to specific embodiments, and should be understood to include various modifications, equivalents, and/or alternatives to the embodiments of the present invention.

Figure 1:
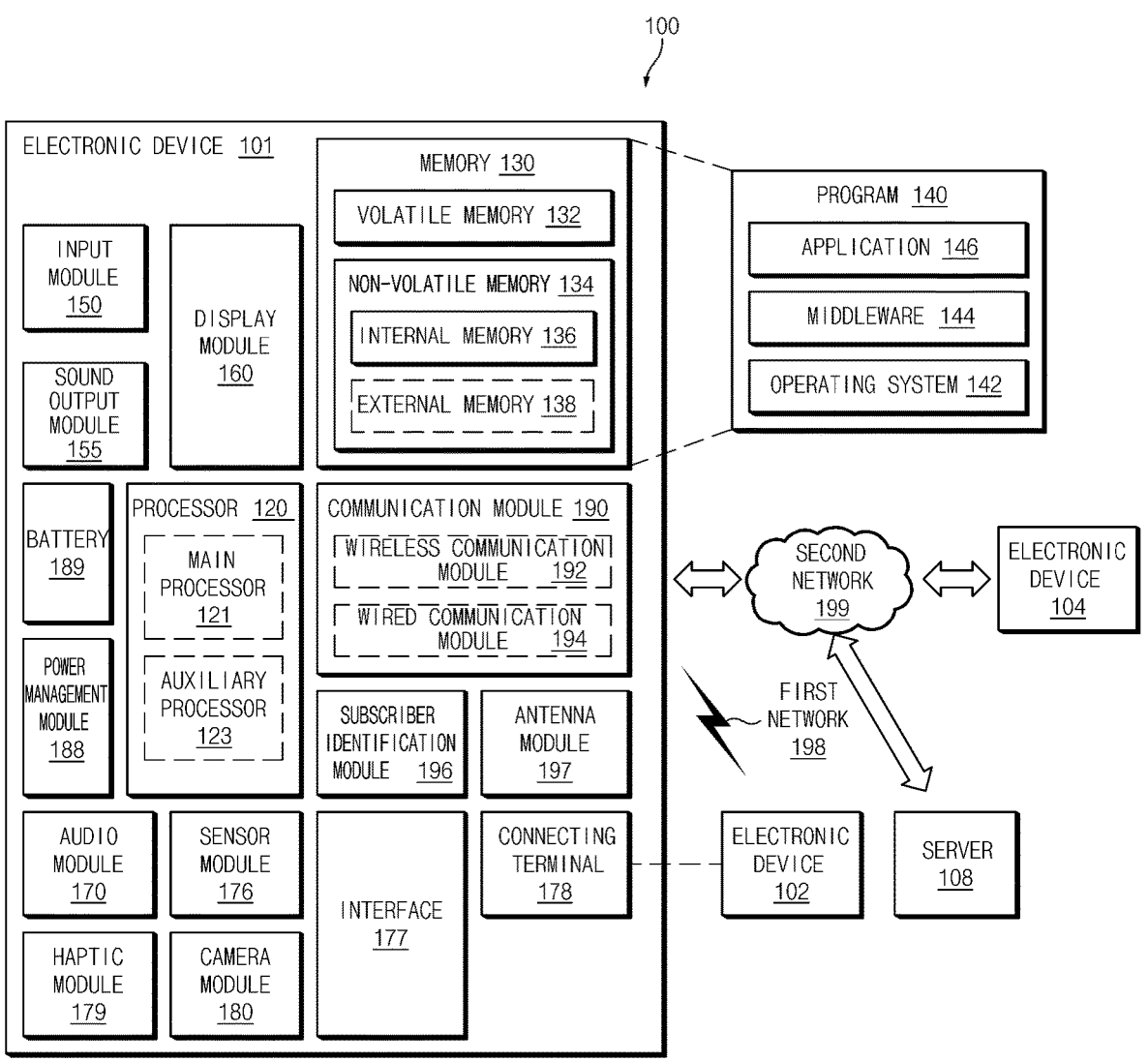
FIG. 1 is a block diagram of an electronic device in a network environment according to certain embodiments.
Figure 2:
FIG. 2 is a block diagram illustrating a camera according to certain embodiments.
Figure 2:
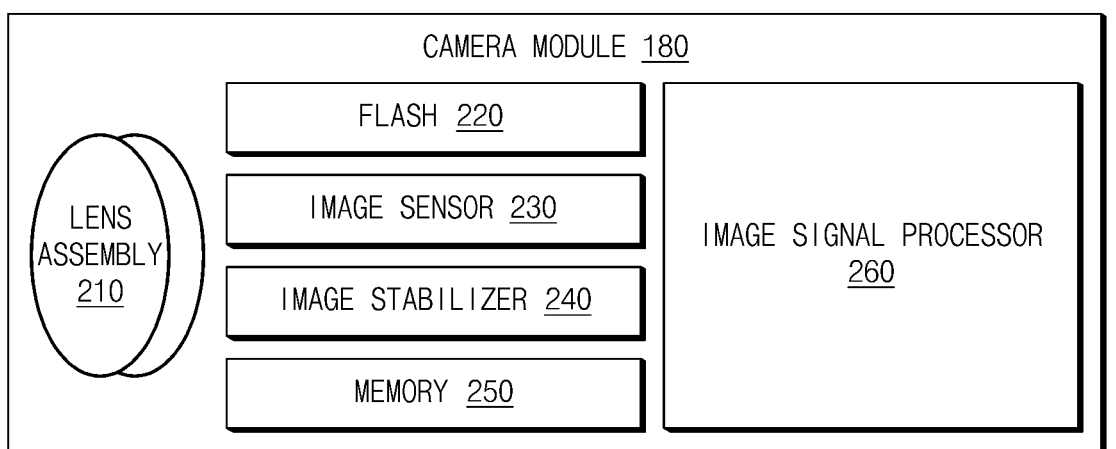

FIG. 1 describes an electronic device that can include a camera. FIG. 2 describes a camera that can be disposed in an electronic device.

Electronic Device

FIG. 1 describes an electronic device 101 that can include a camera 180.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device

104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Camera Functions

FIG. 2 is a block diagram illustrating the functions of the camera according to certain embodiments.

Referring to FIG. 2, the camera 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera 180 may include a plurality of lens assemblies 210. In such a case, the camera 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lenses attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera 180 or the electronic device 101 including the camera 180. This allows compensating for at least part of a negative effect (e.g., image blurring) by the movement on an image being captured. According to an embodiment, the image stabilizer 240 may sense such a movement by the camera 180 or the electronic device 101 using a gyro sensor (not shown) or an acceleration sensor (not shown) disposed inside or outside the camera 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera 180. An image processed by the image signal processor 260 may be stored back in the memory 250 for further processing, or may be provided to an external component (e.g., the memory 130, the display module 160, the electronic device 102, the electronic device 104, or the server 108) outside the camera 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of cameras 180 having different attributes or functions. In such a case, at least one of the plurality of cameras 180 may form, for example, a wide-angle camera and at least another of the plurality of cameras 180 may form a telephoto camera. Similarly, at least one of the plurality of cameras 180 may form, for example, a front camera and at least another of the plurality of cameras 180 may form a rear camera.

The camera 180 can be disposed in a housing of the electronic device 101. The housing of the electronic device 101 will be shown in FIGS. 3A, 3B, and 3C.

Housing of the Electronic Device

Figure 3A:
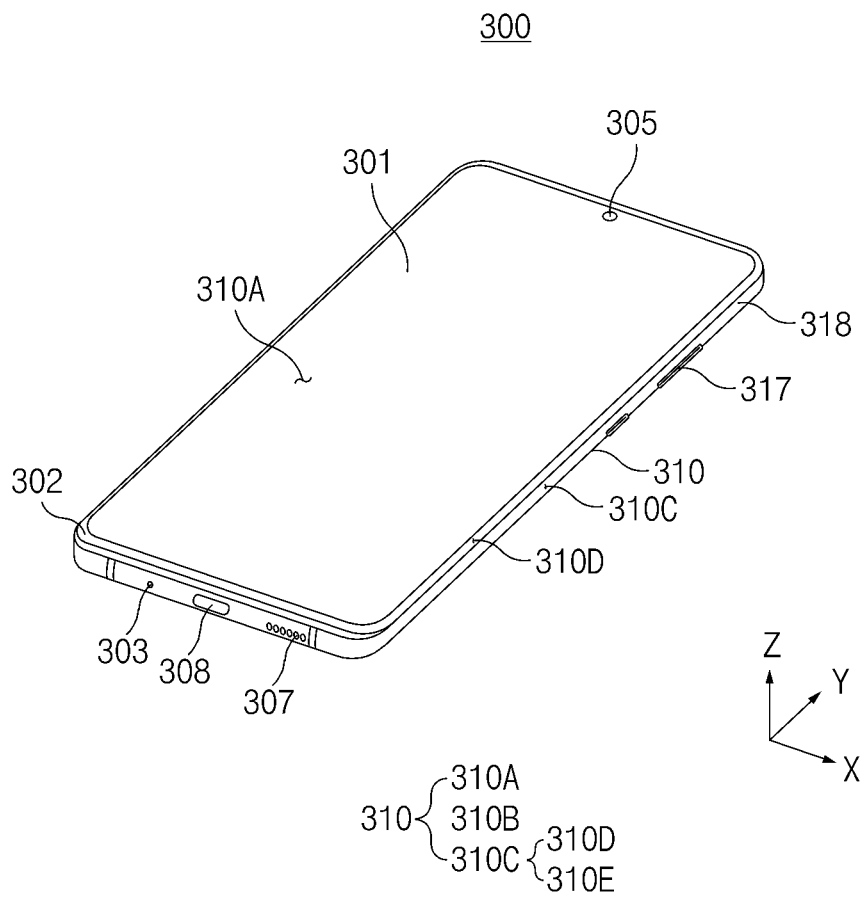
FIG. 3A is a front perspective view of an electronic device according to an embodiment.
Figure 3B:
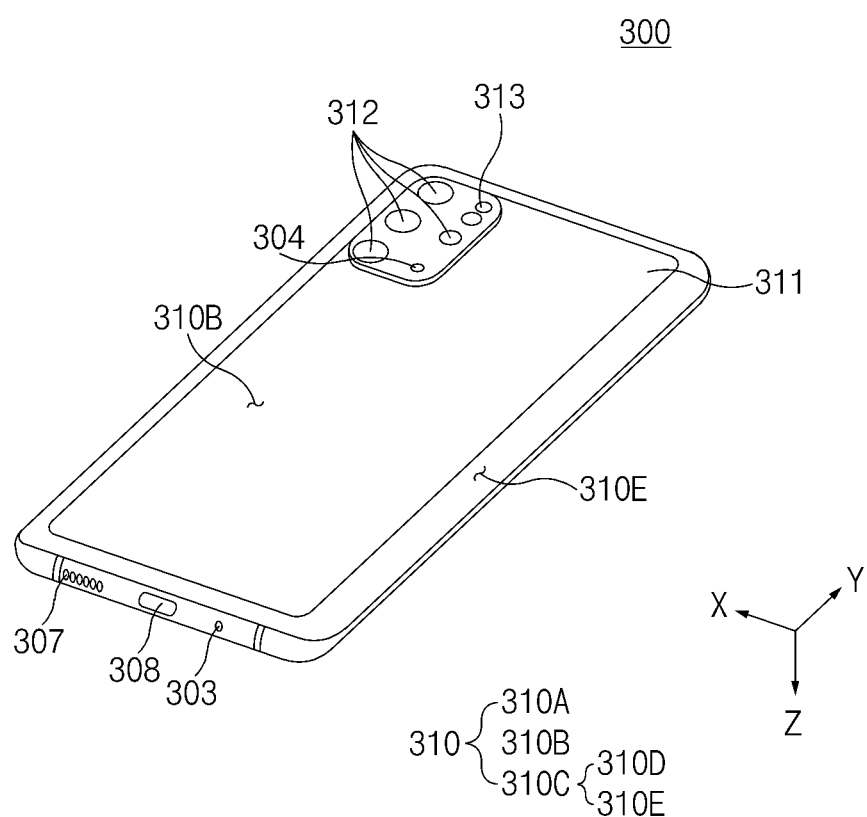
FIG. 3B is a rear perspective view of the electronic device according to an embodiment.
Figure 3C:
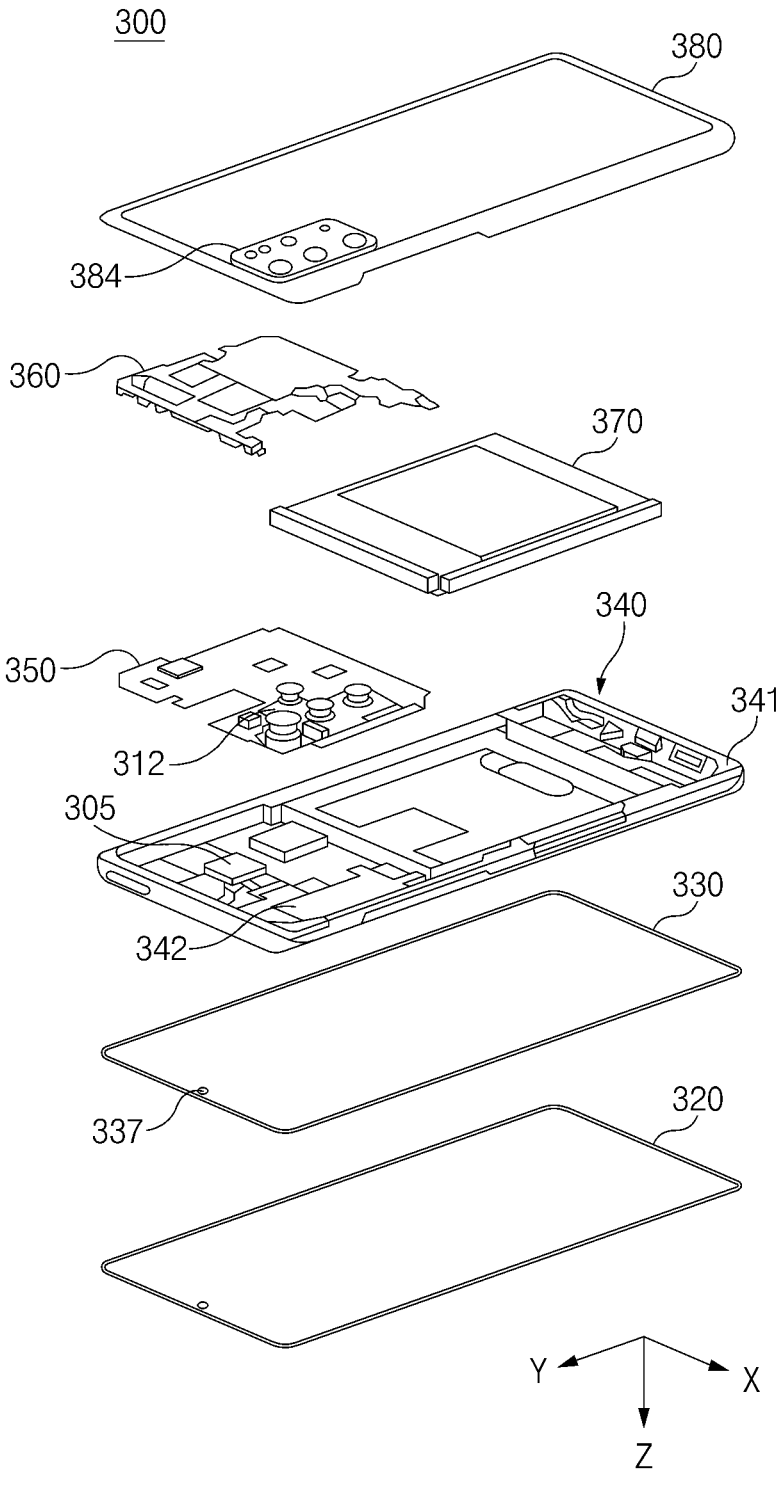
FIG. 3C is an exploded perspective view of the electronic device according to an embodiment.

FIGS. 3A, 3B, and 3C describe the housing of the electronic device.

FIG. 3A is a front perspective view of an electronic device according to an embodiment. FIG. 3B is a rear perspective view of the electronic device according to an embodiment. FIG. 3C is an exploded perspective view of the electronic device according to an embodiment.

Referring to FIGS. 3A and 3B, the electronic device 300 according to an embodiment (e.g., the electronic device 101 of FIG. 1) may include a housing 310 that includes a first surface (or, a front surface) 310A, a second surface (or, a rear surface) 310B, and a third surface (or, a side surface) 310C surrounding a space between the first surface 310A and the second surface 310B.

In another embodiment, the housing 310 may refer to a structure that forms some of the first surface 310A, the second surface 310B, and the third surface 310C.

In an embodiment, the first surface 310A may be formed by a front plate 302, at least a portion of which is substantially transparent (e.g., a glass plate including various coating layers, or a polymer plate). The second surface 310B may be formed by aback plate 311 that is substantially opaque. The back plate 311 may be formed of, for example, coated or colored glass, ceramic, a polymer, metal (e.g., aluminum, stainless steel (STS), or magnesium), or a combination of at least two of the aforementioned materials. The third surface 310C may be formed by a side bezel structure (or, a side member) 318 that is coupled with the front plate 302 and the back plate 311 and that includes metal and/or a polymer.

In another embodiment, the back plate 311 and the side bezel structure 318 may be integrally formed with each other and may include the same material (e.g., a metallic material such as aluminum).

In the illustrated embodiment, the front plate 302 may include two first regions 310D that curvedly and seamlessly extend from partial regions of the first surface 310A toward the back plate 311. The first regions 310D may be located at opposite long edges of the front plate 302.

In the illustrated embodiment, the back plate 311 may include two second regions 310E that curvedly and seamlessly extend from partial regions of the second surface 310B toward the front plate 302. The second regions 310E may be located at opposite long edges of the back plate 311.

In another embodiment, the front plate 302 (or, the back plate 311) may include only one of the first regions 310D (or, the second regions 310E). Furthermore, in another embodiment, the front plate 302 (or, the back plate 311) may not include a part of the first regions 310D (or, the second regions 310E).

In an embodiment, when viewed from a side of the electronic device 300, the side bezel structure 318 may have a first thickness (or, width) at sides (e.g., short sides) not including the first regions 310D or the second regions 310E and may have a second thickness at sides (e.g., long sides) including the first regions 310D or the second regions 310E, the second thickness being smaller than the first thickness.

In an embodiment, the electronic device 300 may include at least one of a display 301 (e.g., the display module 160 of FIG. 1), audio modules 303, 304, and 307 (e.g., the audio module 170 of FIG. 1), a sensor module (not illustrated) (e.g., the sensor module 176 of FIG. 1), cameras 305, 312, and 313 (e.g., the camera 180 of FIG. 1), key input devices 317 (e.g., the input device 150 of FIG. 1), a light emitting element (not illustrated), or a connector hole 308 (e.g., the connecting terminal 178 of FIG. 1). In another embodiment, the electronic device 300 may not include at least one component (e.g., the key input devices 317 or the light emitting element (not illustrated)) among the aforementioned components, or may additionally include other component(s).

In an embodiment, the display 301 may be visually exposed through most of the front plate 302. For example, at least a portion of the display 301 may be visually exposed through the front plate 302 that includes the first surface 310A and the first regions 310D of the third surface 310C. The display 301 may be disposed on a rear surface of the front plate 302.

In an embodiment, the periphery of the display 301 may be formed to be substantially the same as the shape of the adjacent outside edge of the front plate 302. In another embodiment, to expand the area by which the display 301 is visually exposed, the gap between the outside edge of the display 301 and the outside edge of the front plate 302 may be substantially constant.

In an embodiment, a surface of the housing 310 (or, the front plate 302) may include a screen display region that is formed as the display 301 is visually exposed. For example, the screen display region may include the first surface 310A and the first regions 310D of the side surface.

In another embodiment, the screen display region 310A and 310D may include a sensing region (not illustrated) that is configured to obtain biometric information of a user. When the screen display region 310A and 310D includes the sensing region, this may mean that at least a portion of the sensing region overlaps the screen display region 310A and 310D. For example, the sensing region (not illustrated) may refer to a region capable of displaying visual information by the display 301 like the other areas of the screen display region 310A and 310D and additionally obtaining biometric information (e.g., a fingerprint) of the user.

In an embodiment, the screen display region 310A and 310D of the display 301 may include a region through which the first camera 305 (e.g., a punch hole camera) is visually exposed. For example, at least a portion of the periphery of the region through which the first camera 305 is visually exposed may be surrounded by the screen display region 310A and 310D. In certain embodiments, the first camera 305 may include a plurality of cameras (e.g., the camera 180 of FIG. 1).

In certain embodiments, the display 301 may be configured such that at least one of an audio module (not illustrated), a sensor module (not illustrated), a camera (e.g., the first camera 305), or a light emitting element (not illustrated) is disposed on a rear surface of the screen display region 310A and 310D. For example, the electronic device 300 may be configured such that the first camera 305 (e.g., an under display camera (UDC)) is disposed on the rear side (e.g., the side facing in the −z-axis direction) of the first surface 310A (e.g., the front surface) and/or the side surface 310C (e.g., at least one surface of the first regions 310D) so as to face toward the first surface 310A and/or the side surface 310C. For example, the first camera 305 may be disposed under the display 301 and may not be visually exposed through screen display region 310A and 310D.

In certain embodiments, when the first camera 305 is implemented with an under display camera, the region of the display 301 that faces the first camera 305 may be formed to be a transmission region having a specified transmittance as a portion of the display region that displays contents. For example, the transmission region may have a transmittance of about 5% to about 50%. The transmission region may include a region through which light for generating an image by being focused on an image sensor (e.g., the image sensor 230 of FIG. 2) passes and that overlaps an effective region (e.g., a field of view (FOV) region) of the first camera 305. For example, the transmission region of the display 301 may include a region having a lower pixel density and/or wiring density than a surrounding region.

In another embodiment (not illustrated), the display 301 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 303, 304, and 307 may include the microphone holes 303 and 304 and the speaker hole 307.

In an embodiment, the microphone holes 303 and 304 may include the first microphone hole 303 formed in a partial region of the third surface 310C and the second microphone hole 304 formed in a partial region of the second surface 310B. A microphone (not illustrated) for obtaining external sound may be disposed in the microphone holes 303 and 304. The microphone may include a plurality of microphones to sense the direction of sound.

In an embodiment, the second microphone hole 304 formed in the partial region of the second surface 310B may be disposed adjacent to the cameras 305, 312, and 313. For example, the second microphone hole 304 may obtain sounds when the cameras 305, 312, and 313 are executed, or may obtain sounds when other functions are executed.

In an embodiment, the speaker hole 307 may include an external speaker hole 307 and a receiver hole for telephone call (not illustrated). The external speaker hole 307 may be formed in a portion of the third surface 310C of the electronic device 300. In another embodiment, the external speaker hole 307, together with the microphone hole 303, may be implemented as a single hole. Although not illustrated, the receiver hole for telephone call (not illustrated) may be formed in another portion of the third surface 310C. For example, the receiver hole for telephone call may be formed in another portion (e.g., a portion facing in the +y-axis direction) of the third surface 310C that faces the portion (e.g., a portion facing in the –y-axis direction) of the third surface 310C in which the external speaker hole 307 is formed. According to certain embodiments, the receiver hole for telephone call may not be formed in a portion of the third surface 310C and may be formed by a separation space between the front plate 302 (or, the display 301) and the side bezel structure 318.

In an embodiment, the electronic device 300 may include at least one speaker (not illustrated) that is configured to output sound outside the housing 310 through the external speaker hole 307 or the receiver hole for telephone call (not illustrated). According to certain embodiments, the speaker may include a piezoelectric speaker from which the speaker hole 307 is omitted.

In an embodiment, the sensor module (not illustrated) may generate an electrical signal or a data value that corresponds to an operational state inside the electronic device 300 or an environmental state external to the electronic device 300. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the cameras 305, 312, and 313 may include the first camera 305 (e.g., a punch hole camera) exposed on the first surface 310A of the electronic device 300, the second camera 312 exposed on the second surface 310B, and/or the flash 313.

In an embodiment, the first camera 305 may be visually exposed through a portion of the screen display region 310A and 310D of the display 301. For example, the first camera 305 may be visually exposed on a partial area of the screen display region 310A and 310D through an opening (not illustrated) that is formed in a portion of the display 301. In another example, the first camera 305 (e.g., an under display camera) may be disposed on a rear surface of the display 301 and may not be visually exposed through the screen display region 310A and 310D.

In an embodiment, the second camera 312 may include a plurality of cameras (e.g., a dual camera, a triple camera, or a quad camera). However, the second camera 312 is not necessarily limited to including the plurality of cameras and may include one camera.

In an embodiment, the first camera 305 and the second camera 312 may include one or more lenses, an image sensor, and/or an image signal processor. The flash 313 may include, for example, a light emitting diode or a xenon lamp. In another embodiment, two or more lenses (an IR camera lens, a wide angle lens, and a telephoto lens) and image sensors may be disposed on one surface of the electronic device 300.

In an embodiment, the key input devices 317 may be disposed on the third surface 310C of the housing 310 (e.g., the first regions 310D and/or the second regions 310E). In another embodiment, the electronic device 300 may not include all or some of the key input devices 317, and the key input devices 317 not included may be implemented in a different form, such as a soft key, on the display 301. In another embodiment, the key input devices may include a sensor module (not illustrated) that forms the sensing region (not illustrated) that is included in the screen display region 310A and 310D.

In an embodiment, the connector hole 308 may accommodate a connector. The connector hole 308 may be disposed in the third surface 310C of the housing 310. For example, the connector hole 308 may be disposed in the third surface 310C so as to be adjacent to at least a part of the audio modules (e.g., the microphone hole 303 and the speaker hole 307). In another embodiment, the electronic device 300 may include the first connector hole 308 capable of accommodating a connector (e.g., a USB connector) for transmitting/receiving power and/or data with an external electronic device, and/or a second connector hole (not illustrated) capable of accommodating a connector (e.g., an earphonejack) fortransmitting/receiving an audio signal with an external electronic device.

In an embodiment, the electronic device 300 may include the light emitting element (not illustrated). For example, the light emitting element (not illustrated) may be disposed on the first surface 310A of the housing 310. The light emitting element (not illustrated) may provide state information of the electronic device 300 in the form of light. In another embodiment, the light emitting element (not illustrated) may provide a light source that operates in conjunction with operation of the first camera 305. For example, the light emitting element (not illustrated) may include an LED, an IR LED, and/or a xenon lamp.

Referring to FIG. 3C, the electronic device 300 according to an embodiment may include a front plate 320 (e.g., the front plate 302 of FIG. 3A), a display 330 (e.g., the display 301 of FIG. 3A), a side member 340 (e.g., the side bezel structure 318 of FIG. 3A), a printed circuit board 350, a rear case 360, a battery 370, a back plate 380 (e.g., the back plate 311 of FIG. 3B), and an antenna (not illustrated).

In certain embodiments, the electronic device 300 may not include at least one component (e.g., the rear case 360) among the aforementioned components, or may additionally include other component(s). Some of the components of the electronic device 300 illustrated in FIG. 3C may be identical or similar to some of the components of the electronic device 300 illustrated in FIGS. 3A and 3B, and repetitive descriptions will hereinafter be omitted.

In an embodiment, the front plate 320 and the display 330 may be coupled to the side member 340. For example, based on FIG. 3C, the front plate 320 and the display 330 may be disposed under the side member 340. The front plate 320 and the display 330 may be located in the +z-axis direction from the side member 340. For example, the display 330 may be coupled to the bottom of the side member 340, and the front plate 320 may be coupled to the bottom of the display 330.

The front plate 320 may form a portion of an outer surface (or, an exterior) of the electronic device 300. The display 330 may be disposed between the front plate 320 and the side member 340 so as to be located inside the electronic device 300.

In an embodiment, the side member 340 may be disposed between the display 330 and the back plate 380. For example, the side member 340 may be configured to surround a space between the back plate 380 and the display 330.

In an embodiment, the side member 340 may include a frame structure 341 that forms a portion of a side surface of the electronic device 300 (e.g., the third surface 310C of FIG. 3A) and a plate structure 342 extending inward from the frame structure 341.

In an embodiment, the plate structure 342 may be disposed inside the frame structure 341 so as to be surrounded by the frame structure 341. The plate structure 342 may be connected with the frame structure 341, or may be integrally formed with the frame structure 341. The plate structure 342 may be formed of a metallic material and/or a nonmetallic (e.g., polymer) material. In an embodiment, the plate structure 342 may support other components included in the electronic device 300. For example, at least one of the display 330, the printed circuit board 350, the rear case 360, or the battery 370 may be disposed on the plate structure 342. For example, the display 330 may be coupled to one surface (e.g., a surface facing in the +z-axis direction) of the plate structure 342, and the printed circuit board 350 may be coupled to an opposite surface (e.g., a surface facing in the −z-axis direction) that faces away from the one surface.

In an embodiment, the rear case 360 may be disposed between the back plate 380 and the plate structure 342. The rear case 360 may be coupled to the side member 340 so as to overlap at least a portion of the printed circuit board 350. For example, the rear case 360 may face the plate structure 342 with the printed circuit board 350 therebetween.

In an embodiment, a processor (e.g., the processor 120 of FIG. 1), a memory (e.g., the memory 130 of FIG. 1), and/or an interface (e.g., the interface 177 of FIG. 1) may be mounted on the printed circuit board 350. The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect the electronic device 300 with an external electronic device and may include a USB connector, an SD card/MMC connector, or an audio connector.

In an embodiment, the battery 370 (e.g., the battery 189 of FIG. 1) may supply power to at least one component of the electronic device 300. For example, the battery 370 may include a primary cell that is not rechargeable, a secondary cell that is rechargeable, or a fuel cell. At least a portion of the battery 370 may be disposed on substantially the same plane as the printed circuit board 350. The battery 370 may be integrally disposed inside the electronic device 300, or may be disposed so as to be detachable from the electronic device 300.

In an embodiment, the antenna (not illustrated) (e.g., the antenna module 197 of FIG. 1) may be disposed between the back plate 380 and the battery 370. The antenna (not illustrated) may include, for example, a near field communication (NFC) antenna, a wireless charging antenna, and/or a magnetic secure transmission (MST) antenna. For example, the antenna (not illustrated) may perform short-range communication with an external device, or may wirelessly transmit and receive power required for charging.

In an embodiment, the first camera 305 may be disposed on at least a portion (e.g., the plate structure 342) of the side member 340 such that a lens receives external light through a partial region of the front plate 320 (e.g., the front surface 310A of FIG. 3A). For example, the lens of the first camera 305 may be visually exposed through a partial region of the front plate 320. A camera region 337 (e.g., an opening region or a light transmitting region) corresponding to the first camera 305 may be formed in the display 330.

In an embodiment, the second camera 312 may be disposed on the printed circuit board 350 such that a lens receives external light through a camera region 384 of the back plate 380 (e.g., the rear surface 310B of FIG. 3B) of the electronic device 300. For example, the lens of the second camera 312 may be visually exposed through the camera region 384. In an embodiment, the second camera 312 may be disposed in at least a portion of an inner space formed in the housing of the electronic device 300 (e.g., the housing 310 of FIGS. 3A and 3B) and may be electrically connected to the printed circuit board 350 through a connecting member (e.g., a connector).

In an embodiment, the camera region 384 may be formed on a surface of the back plate 380 (e.g., the rear surface 310B of FIG. 3B). In an embodiment, the camera region 384 may be formed to be at least partially transparent such that external light is incident to the lens of the second camera 312. In an embodiment, at least a portion of the camera region 384 may protrude to a predetermined height from the surface of the back plate 380. However, without being necessarily limited thereto, the camera region 384 may form substantially the same plane as the surface of the back plate 380.

Figure 4:
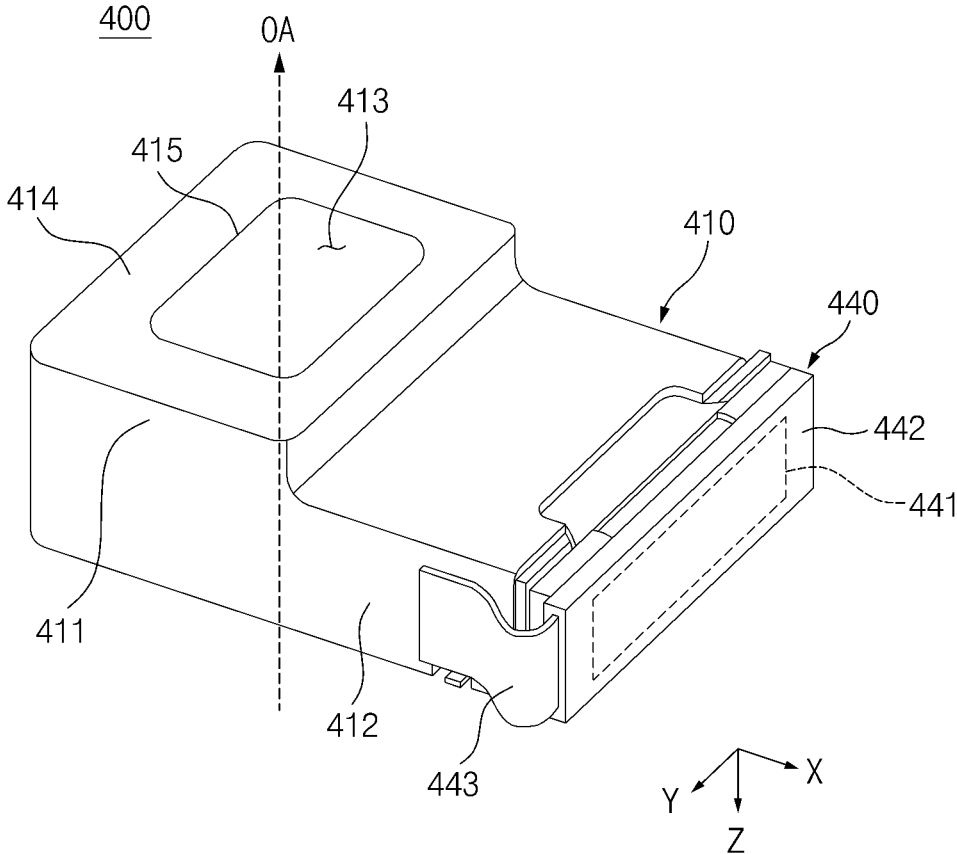
FIG. 4 is a view illustrating a camera according to an embodiment.

FIG. 4 is a view illustrating a camera according to an embodiment. The camera 400 includes a casing 410 that houses each of the other components and parts of the camera 400, which may include lenses, reflective member, or image sensors, among other things. The casing 410 includes a first part 411 and a second part 412. When the camera 400 is mounted into the housing of an electronic device, the first part 411 may be disposed outside of the housing, while the second part 412 is disposed inside the housing. The first part 411 has disposed therein, a first one or more lenses aligned with the optical axis OA. The second part 412 has disposed therein, reflective member, a second one or more lenses that are substantially perpendicular to the optical axis OA, and an image sensor 441. The reflective member reflects light from the first one or more lenses to the second one or more lenses. The image sensor 441 receives light from the second one or more lenses and converts the light to an electrical signal.

The camera 400 illustrated in FIG. 4 may be referred to as any one of the second cameras 312 illustrated in FIG. 3B. Referring to FIG. 4, the camera 400 may include a casing 410, protective glass 415, a sensor unit 440, and a connecting member 443. The casing 410 houses the other components of the camera 400.

In an embodiment, the casing 410 may include a first part 411 and a second part 412. When the casing 410 is mounted in the housing of the electronic device, the first part 411 is disposed to overlap a camera window (e.g., a camera decoration member) of the electronic device 300. The second part 412 can be located inside the electronic device 300. For example, at least a portion of the first part 411 may be visually exposed on the outer surface of the electronic device 300 through the camera window. The second part 412 may include a part extending in the x-axis direction, and the first part 411 may include a part protruding from the second part 412 in the z-axis direction. As illustrated in FIG. 3B, the first part 411 may form at least a portion of the rear surface 310B of the electronic device 300. The second part 412 may be disposed in the housing 310 of the electronic device 300. The second part 412 may be located under the back plate 311. In an embodiment, the first part 411 and the second part 412 may be connected such that inner spaces thereof are in fluid communication with each other.

A first one or more lens (e.g., a first one or more lenses 420 of FIG. 5) may be disposed in the inner space of the first part 411. An opening 413 may be formed in a first surface 414 of the first part 411. The opening 413 may be substantially aligned with an optical axis OA. The protective glass 415, which is at least partially transparent, may be disposed in the opening 413.

The protective glass 415 may be disposed to cover the opening 413 of the first part 411. The protective glass 415 may protect a structure located in the casing 410 and may pass external light. The protective glass 415 may be formed to be at least partially transparent. The protective glass 415 may protect the first one or more lenses (e.g., the first one or more lenses 420 of FIG. 5) and/or a reflective member (e.g., a reflective member 450 of FIG. 5).

A second one or more lenses (e.g., a second one or more lenses 430 of FIG. 5) and the reflective member 450 may be disposed in the inner space of the second part 412. For example, the reflective member 450 may be disposed to be aligned with the first one or more lenses 420 included in the first part 411 in the direction of the optical axis. In an embodiment, the sensor unit 440 may be disposed in the second part 412. For example, the sensor unit 440 may be located in one end portion (e.g., an end portion in the x-axis direction) of the second part 412. For example, the one end portion of the second part 412 may be provided in an open form, and the sensor unit 440 may be located in the open one end portion to receive light passing through an optical structure in the casing 410. According to certain embodiments, a third one or more lenses (e.g., a third one or more lenses 530 of FIG. 7A or a third one or more lenses 630 of FIG. 8A) may be disposed between the second one or more lenses 430 and the sensor unit 440 in the inner space of the second part 412.

In an embodiment, the sensor unit 440 may include a substrate 442, an image sensor 441, the connecting member 443, and a filter (not illustrated). In an embodiment, the image sensor 441 may be mounted on a surface of the substrate 442, or may be electrically connected to the substrate 442. The image sensor 441 may receive external light passing through the optical structure located in the casing 410 and may generate an electrical signal related to an image, based on the received light. In an embodiment, the filter (e.g., a filter 444 of FIG. 5) may cover the image sensor 441. The filter may be at least partially disposed on the substrate 442. The filter may block light having a specified wavelength band. For example, the filter may include an infrared filter that blocks light in the infrared band. In an embodiment, the connecting member 443 may include an FPCB that is at least partially flexible. The connecting member 443 may extend from one side of the substrate 442. In an embodiment, the connecting member 443 may electrically connect the substrate 442 and the printed circuit board 350 of the electronic device 300.

Figure 5:
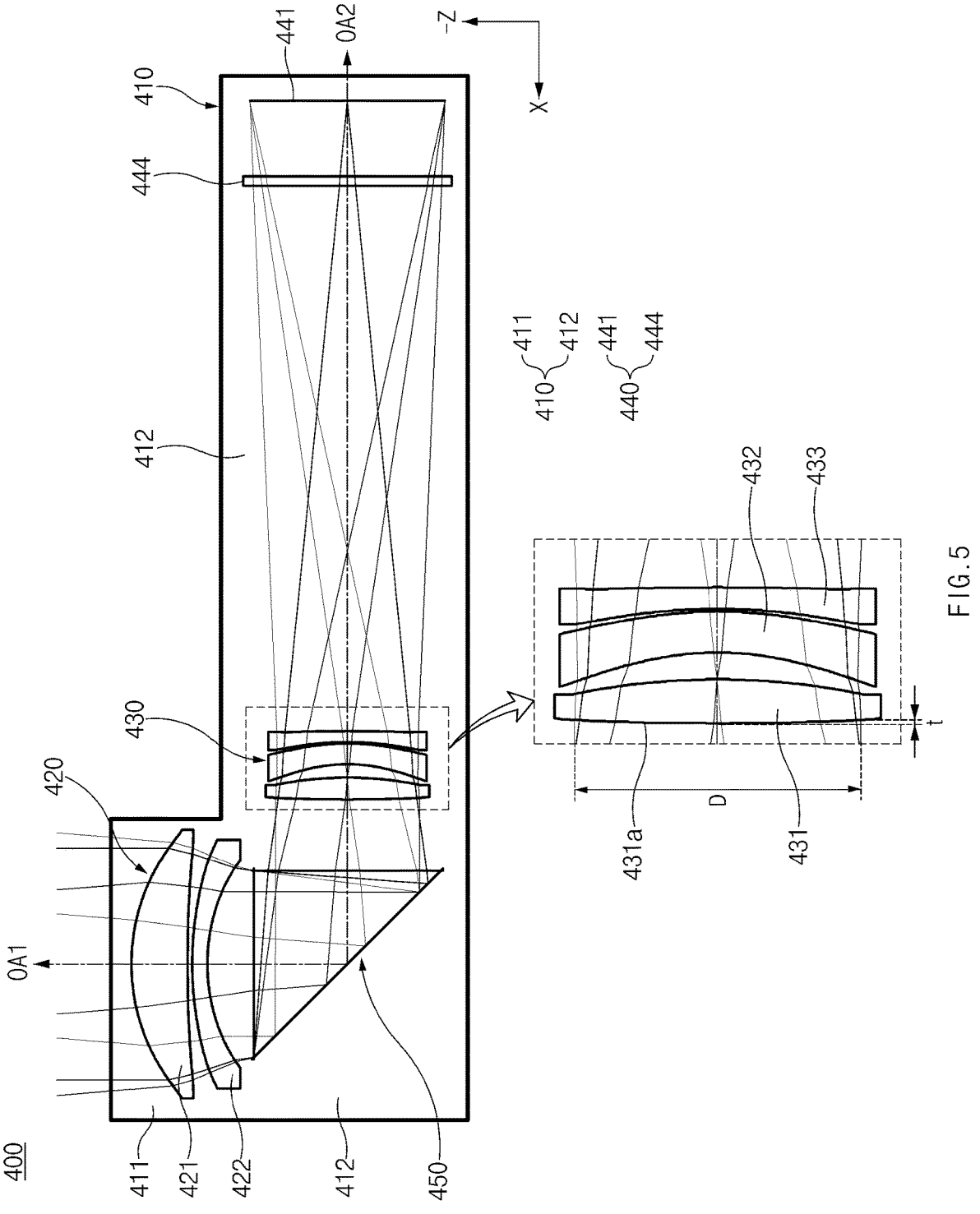
FIG. 5 is a view illustrating an arrangement of an optical structure of the camera according to an embodiment.

FIG. 5 is a view illustrating an arrangement of the optical structure of the camera according to an embodiment. The first one or more lenes 420 may include lens 421 and 422 that are substantially aligned with the optical axis OA1. The second one or more lenses 430 includes lens 431, lens 432, and lens 433 that are aligned with optical axis OA2. Reflective member 450 reflects light from the first one or more lenses 420 to the second one or more lenses 430. The image sensor 410 receives light from the second one or more lenses 430.

Hereinafter, a first optical axis OAT may refer to an optical axis OA defined by a one or more lenses (e.g., the first one or more lenses 420) disposed in the first part 411 of the casing 410. The illustrated first optical axis OA1 may be referred to as the optical axis OA of FIG. 4. A second optical axis OA2 may be defined as an optical axis formed by reflection of the optical axis OA1 by the reflective member 450. Alternatively, the second optical axis OA2 may refer to an optical axis defined by a one or more lenses (e.g., the second one or more lenses 430 or the third one or more lenses 530 or 630) disposed in the second part 412 of the casing 410.

Referring to FIG. 5, the camera 400 may include the casing 410, the first one or more lenses 420, the second one or more lenses 430, the reflective member 450, and the sensor unit 440. The sensor unit 440 may include the image sensor 441 and the optical filter 444 disposed between the image sensor 441 and the second one or more lenses 430.

In an embodiment, at least a portion of the first one or more lenses 420 may be disposed in the first part 411 of the casing 410, and the reflective member 450, the second one or more lenses 430, the image sensor 441, and the optical filter 444 may be disposed in the second part 412 of the casing 410.

In an embodiment, the first one or more lenses 420 may be at least partially disposed inside the first part 411 of the casing 410. For example, one portion of the first one or more lenses 420 may be disposed in the first part 411, and another portion of the first one or more lenses 420 may be disposed in the second part 412. In an embodiment, the first one or more lenses 420 may be located to be aligned with the reflective member 450 on the first optical axis OA1. For example, the first one or more lenses 420 may be located between the reflective member 450 and the protective glass 415 when viewed in the direction of the first optical axis OA1.

In an embodiment, the first one or more lenses 420 may include one or more lenses. For example, the first one or more lenses 420 may include a plurality of lenses. In an embodiment, the first one or more lenses 420 may include a telephoto lens having a relatively small field of view when compared to other one or more lens (e.g., the second one or more lenses 430 and the third one or more lens 530 and 630). For example, the first one or more lenses 420 may have a field of view of 50 degrees or less. For example, the first one or more lenses 420 may include a telephoto lens having a relatively long focal length when compared to the other one or more lens (e.g., the second one or more lenses 430 and the third one or more lens 530 and 630). In certain embodiments, the first one or more lenses 420 may be implemented with one lens (e.g., refer to optical systems 1101, 1201, and 1301 of FIGS. 13A, 14A, and 15A).

In an embodiment, the reflective member 450 may be disposed in the second part 412 of the casing 410. In an embodiment, the reflective member 450 may reflect incident light passing through the protective glass 415 and the first one or more lenses 420 at a predetermined angle. For example, the predetermined angle may be 90 degrees. The reflective member 450 may reflect the incident light toward the second one or more lenses 430 and the image sensor 441. For example, the reflective member 450 may include a prism. For example, the reflective member 450 may form the second optical axis OA2 by reflecting the first optical axis OA1. In an embodiment, the reflective member 450 may be aligned with the first one or more lenses 420 on the first optical axis OA1 and may be aligned with the second one or more lenses 430 on the second optical axis OA2. A reflective surface 452 of the reflective member 450 may include a point at which the first optical axis OA1 is refracted or a point at which the first optical axis OA1 and the second optical axis OA2 cross each other. A light incident surface 451 of the reflective member 450 may face the first one or more lenses 420 when viewed in the direction of the first optical axis OAT, and a light exit surface of the reflective member 450 may face the second one or more lenses 430 when viewed in the direction of the second optical axis OA2. In an embodiment, the light incident surface 451 and the light exit surface 453 may form a substantially 90 degrees. In an embodiment, the reflective member 450 may be configured to move to correct image shake caused by disturbances acting on the camera 400 or the electronic device 300.

In an embodiment, the second one or more lenses 430 may be disposed in the second part 412 of the casing 410. The second one or more lenses 430 may be disposed such that the reflective member 450, the image sensor 441, and the optical filter 444 are located on the second optical axis OA2. The second one or more lenses 430 may be located between the reflective member 450 and the image sensor 441 (or, the optical filter 444) when viewed in the direction of the second optical axis OA2. For example, the reflective member 450, the second one or more lenses 430, the optical filter 444, and the image sensor 441 may be sequentially arranged on the second optical axis OA2. In an embodiment, the second one or more lenses 430 may include one or more lenses. In an embodiment, the second one or more lenses 430 may include two or more lenses having different refractive powers. For example, when the second one or more lenses 430 includes two lenses, one lens may have positive refractive power, and the other lens may have negative refractive power. For example, an object-side lens of the second one or more lenses 430 may have positive refractive power.

In certain embodiments, the camera 400 may be configured to adjust a focus position by moving the second one or more lenses 430 or at least a part of the separate lenses included in the second one or more lenses 430 in the direction of the second optical axis OA2. For example, the second one or more lenses 430 may be entirely moved, or the separate lenses included in the second one or more lenses 430 may be moved. For example, in a case in which the second one or more lenses 430 has negative refractive power, the second one or more lenses 430 may be moved toward the reflective member 450 when an image of a remote object is taken and may be moved toward the image sensor 441 when an image of a near object is taken.

In an embodiment, the image sensor 441 may be disposed in the second part 412 of the casing 410. The image sensor 441 may be disposed to be aligned with the second optical axis OA2. The image sensor 441 may be configured to generate an electrical signal based on received light. In an embodiment, when an image stabilization function of the camera 400 is performed, the reflective member 450 may move, and the position of an image focused on the image sensor 441 may be changed by the moving reflective member 450.

In certain embodiments, the camera 400 may further include the third one or more lenses (e.g., the third one or more lenses 530 of FIG. 7A or the third one or more lenses 630 of FIG. 8A) disposed between the second one or more lenses 430 and the image sensor 441. The camera 400 may adjust a focus position by moving the third one or more lenses 530 or 630 or at least a part of separate lenses included in the third one or more lenses in the direction of the second optical axis OA2. In this case, the second one or more lenses 430 may be fixed at a specified position. For example, in a case in which the third one or more lenses 530 or 630 has negative refractive power, the third one or more lenses 530 or 630 may be moved toward the reflective member 450 when an image of a remote object is taken and may be moved toward the image sensor 441 when an image of a near object is taken.

In an embodiment, the first one or more lenses 420 may be configured to satisfy Conditional expression1 below.

$$0.6 \leq Fg1/Ft \leq 0.9 \qquad \text{Conditional expression 1]}$$

Here, "Fg1" may be defined as the focal length of the first one or more lenses 420, and "Ft" may be defined as the focal length (e.g., the composite focal length) of the entire optical system. As the refractive power of the first one or more lenses 420 with respect to the refractive power of the entire optical system is limited to a predetermined range by Conditional expression 1, the sizes of the reflective member 450 and another one or more lenses (e.g., the second one or more lenses 430 or the third one or more lenses 530 or 630) disposed on the second optical axis OA2 may be reduced. In addition, a movement distance of a lens or one or more lenses (e.g., the second one or more lenses 430 or the third one or more lenses 530 or 630) that moves to change a focal length may be limited within a specified range.

For example, when Fg1/Ft exceeds the upper limit of Conditional expression 1, a movement distance of the second one or more lenses 430 or the third one or more lenses 530 or 630 may be increased, and the camera 400 may have a mechanically complex form. Alternatively, an effective diameter required for the second one or more lenses 430 or the third one or more lenses 530 or 630 may be increased, and the thickness of the camera 400 may be increased accordingly. For example, when Fg1/Ft is less than the lower limit of Conditional expression 1, the refractive power of the second one or more lenses 430 or the third one or more lenses 530 or 630 may be increased. Therefore, the sensitivity between the one or more lens may be increased, and when the reflective member 450 moves, optical performance may be deteriorated.

In an embodiment, the first one or more lenses 420 may include a first lens 421 close to an object side and a second lens 422 close to the reflective member. In an embodiment, the first lens 421 may have positive refractive power, and the second lens 422 may have negative refractive power. In an embodiment, the first lens 421 and the second lens 422 of the first one or more lenses 420 may be configured to satisfy Conditional expression 2 below.

$$1.5 \leq Vd1/Vd2 \leq 3 \qquad \text{Conditional expression 2]}$$

Here, "Vd1" may be defined as the Abbe number of the first lens 421, and "Vd2" may be defined as the Abbe number of the second lens 422. As the Abbe numbers of the first lens 421 and the second lens 422 are limited within a predetermined range by Conditional expression 2, it may be advantageous for chromatic aberration correction.

In an embodiment, the second one or more lenses 430 may be configured such that a lens closest to an object side satisfies a predetermined optical condition. For example, the second one or more lenses 430 may include a third lens 431 closest to the object side (e.g., the reflective member 450) and may be configured such that an object-side lens surface 431a of the third lens 431 (e.g., a lens surface facing the reflective member 450) satisfies Conditional expression 3 below.

$$t/D \leq 0.1 \qquad \text{Conditional expression 3]}$$

Here, "D" may be defined as the effective diameter of the third lens 431. "t" may be defined as the maximum height difference of the object-side lens surface 431a of the third lens 431. For example, the third lens 431 may have positive refractive power, and the object-side lens surface 431a may be provided in a convex shape. For example, "t" may be defined as the maximum value of a height difference measured in the direction of the second optical axis OA2 from the periphery of the object-side lens surface 431a of the third lens 431 to the apex of the object-side lens surface 431a of the third lens 431.

In an embodiment, the camera 400 may include an aperture disposed on the first optical axis OA1 or the second optical axis OA2, and the second one or more lenses 430 may be configured to satisfy Conditional expression 4 below.

$$0.5 \leq Dmax/Da \leq 1.2 \qquad \text{Conditional expression 4]}$$

Here, "Dmax" may be defined as the maximum effective diameter of a lens (e.g., the second one or more lenses 430) disposed on the second optical axis OA2, and "Da" may be defined as the diameter of the aperture.

In certain embodiments, the camera 400 may further include the third one or more lenses 530 or 630 located between the second one or more lenses 430 and the image sensor 441 (or, the optical filter 444). In this case, "Dmax" in Conditional expression 4 may be defined as the maximum effective diameter of the lenses included in the second one or more lenses 430 and the third one or more lenses 530 or 630.

In an embodiment, an object-side surface of the first lens 421 of the first one or more lenses 420 may be convex. The object-side surface 431a of the third lens 431 of the second one or more lenses 430 may be convex. In an embodiment, the Abbe number of the first lens 421 may exceed 50, and the Abbe number of the second lens 422 may be less than or equal to 35.

In an embodiment, the first one or more lenses 420 may include a telephoto lens having a longer focal length and/or a smaller field of view than the second one or more lenses 430.

In an embodiment, the light incident surface 451 and the reflective surface 452 of the reflective member 450 may have a refractive index of 1.5 to 2 and an Abbe number of 35 to 40.

In an embodiment, the lenses included in the respective one or more lens may include aspheric lens surfaces. The aspheric surface of each lens may be expressed by Equation 1 below. The lenses may be formed of a glass or plastic material.

$$Z(r) = \frac{cr^2}{1 + \sqrt{1 - (1+k)c^2r^2}} + Ar^4 + Br^6 + \qquad \text{[Equation 1]}$$
$$Cr^8 + Dr^{10} + Er^{12} + Fr^{14} + Gr^{16} + Hr^{18} + Ir^{20}$$

In Equation 1, "c" is the reciprocal of the radius of curvature of a corresponding lens, "k" is a conic constant, "r" is the distance from any point on an aspheric surface to an optical axis, A to J are aspheric constants, and "Z" is defined as the height in the direction of the optical axis from any point on the aspheric surface to the apex of the corresponding aspheric surface.

Figure 6:
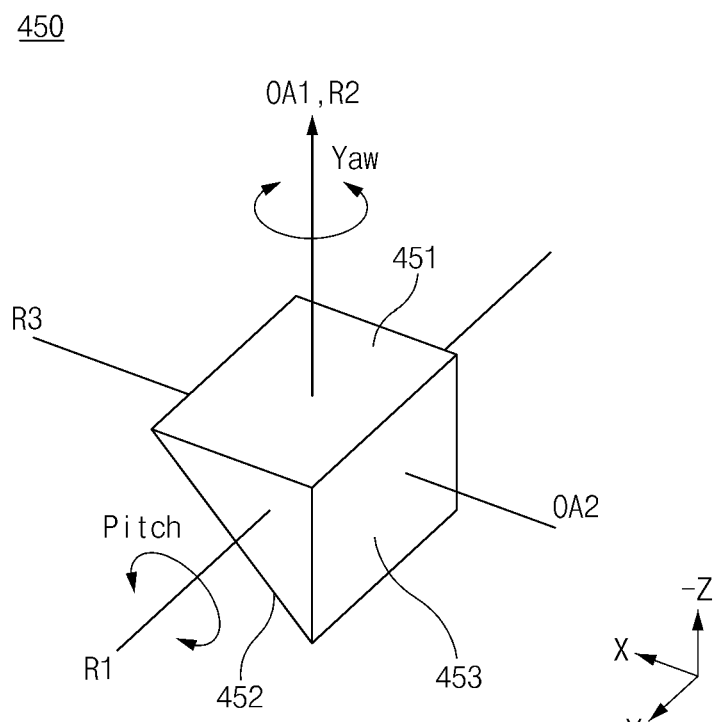
FIG. 6 is a view illustrating movement of a reflective member of the camera according to an embodiment.

FIG. 6 is a view illustrating movement of the reflective member of the camera according to an embodiment. The reflective member 450 can rotate about one or more rotational axes R1, R2, and R3 perpendicular or parallel to the first optical axis in response to disturbance. Rotation about axis R1 may be referred to as the pitch. Rotation about axis R2 may be referred to as the yaw.

Referring to FIG. 6, the camera 400 may be configured to move the reflective member 450 to correct deterioration in image quality. The deterioration may be due to disturbance (e.g., mechanical vibration). The position of an image focused on the image sensor 441 may be changed by the movement of the reflective member 450.

In an embodiment, the reflective member 450 may be configured to rotate about rotational axes R1, R2, and R3 parallel to at least one of the y axis, the z axis, or the x axis. For example, the rotational axes R1, R2, and R3 of the reflective member 450 may be perpendicular to one another.

Referring to FIG. 6, the first rotational axis R1 may be defined as an axis parallel to a direction (e.g., the y axis) perpendicular to the first optical axis OA1 and the second optical axis OA2. For example, an operation in which the reflective member 450 rotates about the first rotational axis R1 may be referred to as pitch. Referring to FIG. 6, the first rotational axis R1 is illustrated as passing through the reflective member 450. However, without being necessarily limited thereto, in some embodiments, the first rotation axis R1 may be defined outside the reflective member 450.

Referring to FIG. 6, the second rotational axis R2 may be defined as an axis (e.g., the z axis) parallel to the first optical axis OA1. For example, an operation in which the reflective member 450 rotates about the second rotational axis R2 may be referred to as yaw. Referring to FIG. 6, the second rotational axis R2 is illustrated as passing through the reflective member 450. However, without being necessarily limited thereto, in some embodiments, the second rotation axis R2 may be defined outside the reflective member 450.

Figure 7A:
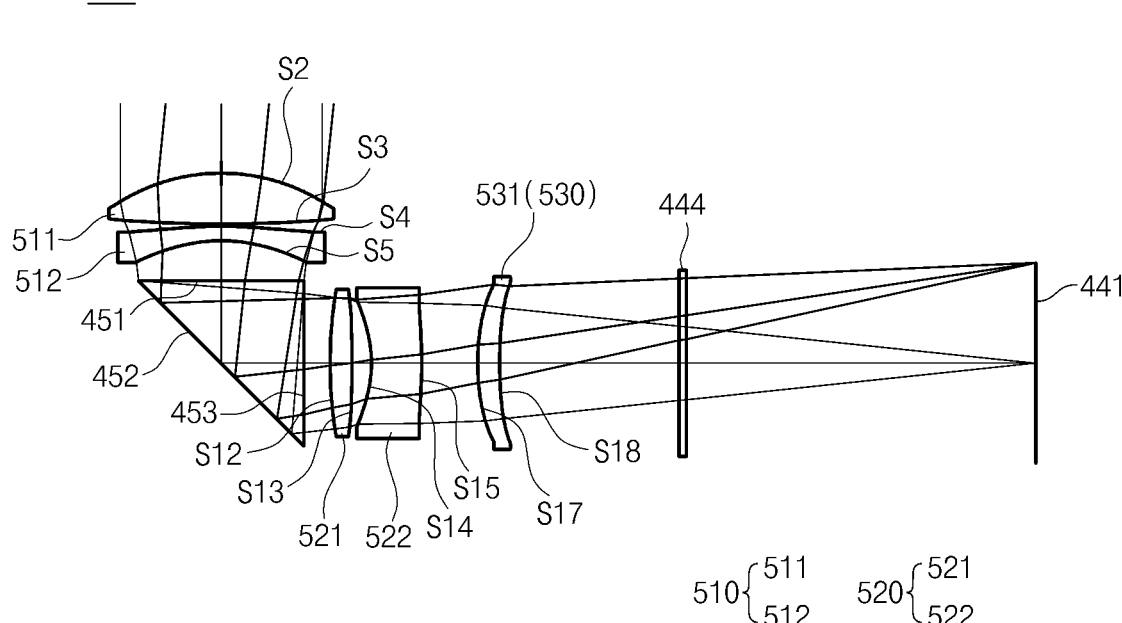
FIG. 7A is a view illustrating an optical system of a camera according to a first embodiment.
Figure 7B:
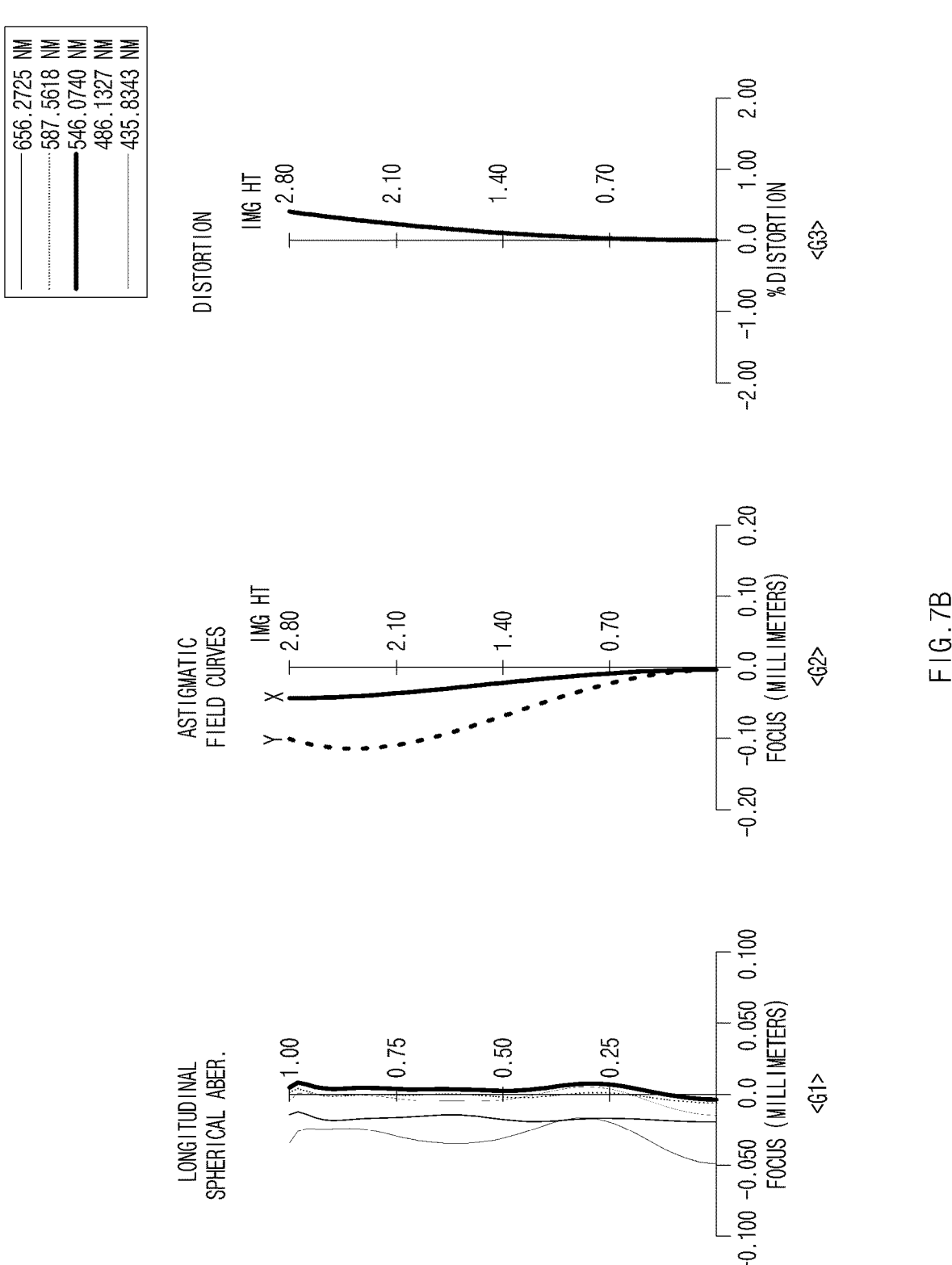
FIG. 7B is an aberration curve of the optical system of the camera according to the first embodiment.
Figure 7C:
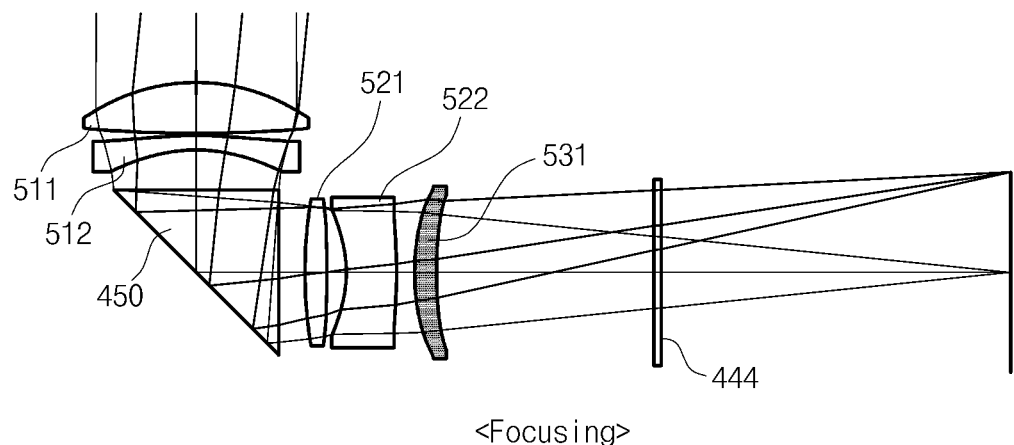
FIG. 7C is a view illustrating the optical system when the camera according to the first embodiment performs an auto focus function and an image stabilization function.
Figure 7C:
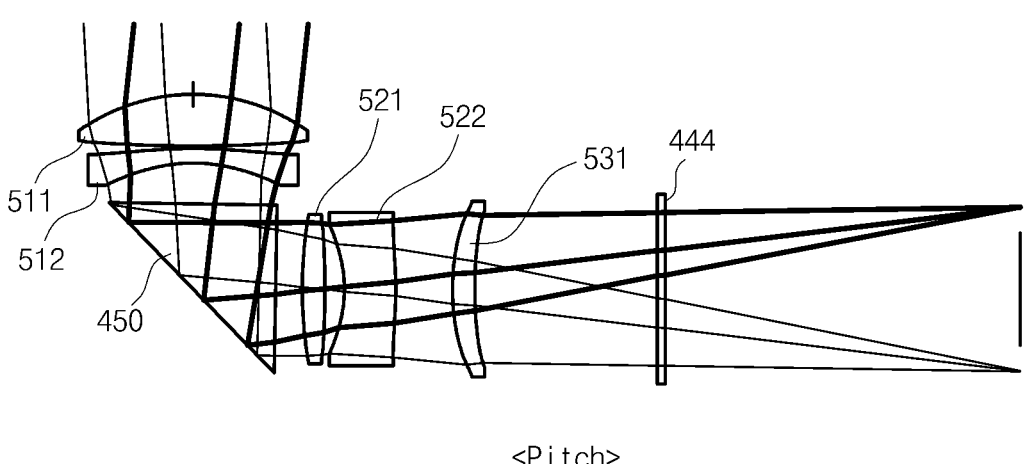
Figure 7C:
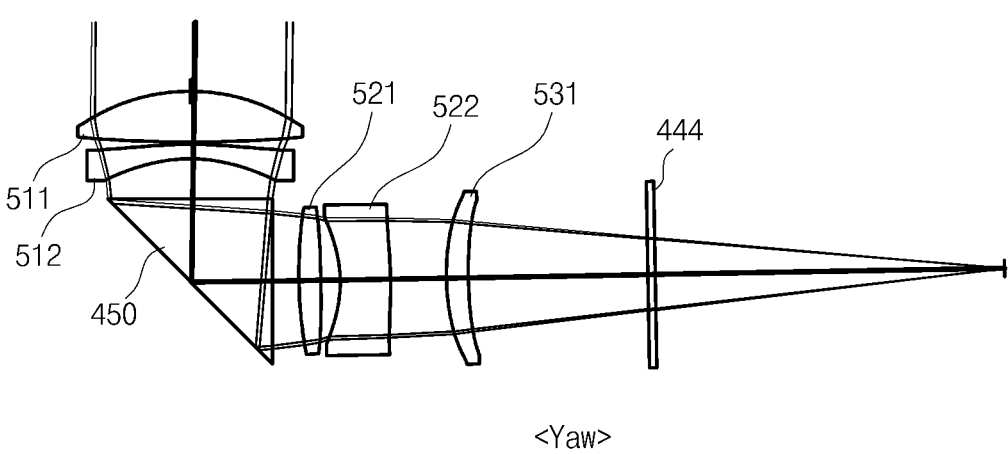

FIG. 7A is a view illustrating an optical system of a camera according to a first embodiment. FIG. 7B is an aberration curve of the optical system of the camera according to the first embodiment. FIG. 7C is a view illustrating the optical system when the camera according to the first embodiment performs an auto focus function and an image stabilization function.

Referring to FIG. 7A, the optical system 501 of the camera according to the first embodiment may include a first one or more lenses 510, a second one or more lenses 520, the third one or more lenses 530, a reflective member 450, an image sensor 441, and an optical filter 444. The second one or more lenses 520 and the third one or more lenses 530 may be disposed between the reflective member 450 and the image sensor 441 (or, the optical filter 444). The second one or more lenses 520 may be disposed closer to the reflective member 450 than the third one or more lenses 530.

In the illustrated embodiment, the first one or more lenses 510 may have positive refractive power, the second one or more lenses 520 may have negative refractive power, and the third one or more lenses 530 may have positive refractive power.

In the illustrated embodiment, the first one or more lenses 510 may include a first lens 511 that is located on an object side and that has positive refractive power and a second lens 512 that is located on an upper side (e.g., on the reflective member 450 side) and that has negative refractive power. In the illustrated embodiment, the first one or more lenses 510 may satisfy Conditional expression 1 and Conditional expression 2. For example, in relation to Conditional expression 1, the ratio Fg1/Ft of the focal length Fg1 of the first one or more lenses 510 to the focal length of the entire optical system 501 may be 0.882. In relation to Conditional expression 2, the ratio Vd1/Vd2 of the Abbe number of the first lens 511 to the Abbe number of the second lens 512 may be 1.7356.

In the illustrated embodiment, the second one or more lenses 520 may include a third lens 521 that is located on an object side (e.g., on the reflective member 450 side) and that has positive refractive power and a fourth lens 522 that is located on an upper side (e.g., on the image sensor 441 side) and that has negative refractive power. In the illustrated embodiment, the third lens 521 of the second one or more lenses 520 may satisfy Conditional expression 3. For example, in relation to Conditional expression 3, t/D of the third lens may be 0.0367.

In the illustrated embodiment, the third one or more lenses 530 may include a fifth lens 531 that is located between the fourth lens 522 and the image sensor 441 and that has positive refractive power. The fifth lens 531 may move along a second optical axis OA2 when the auto focus function of the camera 400 is performed. Accordingly, the focus position of the optical system 501 may vary.

In the illustrated embodiment, the second one or more lenses 520 and the third one or more lenses 530 may satisfy Conditional expression 4. An aperture stopper may be included in the second one or more lenses 520, and the ratio Dmax/Da of the maximum effective diameter Dmax of the lenses included in the second one or more lenses 520 and the third one or more lenses 530 to the diameter Da of an aperture may be 1.188.

Referring to FIG. 7B, <G1> of FIG. 7B is a graph depicting spherical aberration of the optical system 501 according to the first embodiment, <G2> of FIG. 7B is a graph depicting astigmatism of the optical system 501 according to the first embodiment, and <G3> of FIG. 7B is a graph depicting distortion of the optical system 501 according to the first embodiment.

<G1> of FIG. 7B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 7B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature). In <G2> of FIG. 7B, the vertical axis represents an image height (or, the size of an image), and the horizontal axis represents a focal length (in millimeters). The definitions of the respective axes are equally applied to astigmatism graphs to be described below (e.g., <G2> in FIGS. 8B, 9B, 10B, 11B, 12B, 13B, 14B, and 15B).

<G3> of FIG. 7B is a graph depicting a distortion factor for light having a wavelength of 546.0740 nm. The vertical axis represents an image height (or, the size of an image), and the horizontal axis represents a degree of distortion (in percentages). The definitions of the respective axes are equally applied to distortion graphs to be described below (e.g., <G3> in FIGS. 8B, 9B, 10B, 11B, 12B, 13B, 14B, and 15B). An image taken through the optical system 501 according to the first embodiment may be somewhat distorted at a point out of the optical axis and may provide good optical characteristics with a distortion factor of less than about 2%.

Referring to FIG. 7C, the camera 400 may perform the auto focus function by moving the third one or more lenses 530. The third one or more lenses 530 (e.g., the fifth lens 531) having positive refractive power may move to an object side when a close shot is taken and may move to an upper side when a long shot is taken. For example, the third one or more lenses 530 may move toward a light exit surface 453 of the reflective member 450 when a close shot is taken and may move toward the image sensor 441 when a long shot is taken.

Referring to FIG. 7C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R perpendicular to a first optical axis OA1 and the second optical axis A2. The reflective member 450 may perform a yaw operation of rotating about a second rotational axis R2 parallel to the first optical axis OA1.

Table 1 shows data of the optical system 501 according to the first embodiment.

TABLE 1

| Surface | Note | Radius of curvature (mm) | Thickness/ Distance (mm) | Nd Refractive index | vd Abbe number | H-Ape |
|---------|------|--------------------------|--------------------------|---------------------|----------------|-------|
| OBJ | object | infinity | infinity | | | |
| 1 | dummy | infinity | 0.00000 | | | 2.93416 |
| S2* | first lens | 5.35804 | 1.41624 | 1.54046 | 55.950 | 2.85000 |
| S3* | | −35.06909 | 0.06706 | | | 2.74608 |
| S4* | second | 12.26529 | 0.40000 | 1.58577 | 32.230 | 2.61932 |

TABLE 1-continued

| Surface | Note | Radius of curvature (mm) | Thickness/ Distance (mm) | Nd Refractive index | vd Abbe number | H-Ape |
|---|---|---|---|---|---|---|
| S5* | lens | 4.34866 | 0.61670 | | | 2.39637 |
| 6 | dummy | infinity | 0.50000 | | | 2.39606 |
| 7 | dummy | infinity | 0.00000 | | | 2.33511 |
| S8 | light incident surface | infinity | 2.30000 | 1.51680 | 64.170 | 3.47131 |
| S9 | reflective surface | infinity | −2.30000 | 1.51680 | 64.170 | 4.16413 |
| S10 | light exit surface | infinity | 0.00000 | | | 3.47131 |
| 11 | dummy | infinity | −0.73188 | | | 1.96743 |
| S12* | third lens | −12.86530 | −0.61009 | 1.67974 | 18.400 | 1.86115 |
| S13* (sto) | | 45.14425 | −0.54219 | | | 1.80596 |
| S14* | fourth lens | 3.46964 | −1.40262 | 1.62249 | 24.310 | 1.77699 |
| S15* | | 12.01106 | −1.55633 | | | 1.90884 |
| 16 | dummy | infinity | D1 | | | 2.12716 |
| S17* | fifth lens | −6.25593 | −0.61089 | 1.54400 | 56.100 | 2.18716 |
| S18* | | −11.59203 | −5 | | | 2.14767 |
| 19 | dummy | infinity | D2 | | | 2.35875 |
| S20 | optical filter | infinity | −0.21000 | 1.51680 | 64.170 | 2.36E+00 |
| S21 | | infinity | −9.73959 | | | 2.36E+00 |
| IMG | image sensor | infinity | 0.00359 | | | 2.80E+00 |

The positive thickness/distance in Table 1 means that it is located on the first optical axis OA1, and the negative thickness/distance means that it is located on the second optical axis OA2. In Table 1, "*" represents that an optical surface is formed of an aspheric surface. In Table 1, IMG means an image plane of the image sensor 441. In Table 1, S2 means an object-side surface of the first lens 511 included in the first one or more lenses 510, and S3 means an upper-side surface of the first lens 511. S4 means an object- In Table 1, S20 and S21 mean an object-side surface and an upper-side surface of the optical filter.

Aspheric coefficients of the lenses according to the first embodiment may be represented as in Table 2 below. The aspheric coefficients may be calculated based on Equation 1 described above.

TABLE 2

| Surf | K (Conic) | A | B | C | D | E | F | G |
|---|---|---|---|---|---|---|---|---|
| S2* | −1.43579E−02 | −4.27502E−04 | 1.05412E−04 | −8.27279E−06 | 1.62152E−06 | −8.12412E−07 | 1.29282E−07 | −6.49239E−09 |
| S3* | 4.12627E−01 | −1.29174E−04 | 1.96829E−04 | −2.08997E−05 | −1.19066E−05 | 3.51533E−06 | −3.43946E−07 | 1.12952E−08 |
| S4* | −1.18850E+01 | −2.37679E−03 | −4.05955E−04 | 2.22868E−04 | −5.12814E−05 | 7.51587E−06 | −6.43698E−07 | 2.36126E−08 |
| S5* | −2.38329E−02 | −3.49879E−03 | −6.03393E−04 | 2.59813E−04 | −2.73264E−05 | −1.59327E−06 | 4.71020E−07 | −2.20486E−08 |
| S12* | −2.81607E−01 | 1.98562E−03 | −4.36170E−03 | 2.93806E−03 | −1.02697E−03 | 2.16289E−04 | −2.75101E−05 | 1.58208E−06 |
| S13* | 2.72845E−02 | 9.95999E−03 | −1.27402E−02 | 8.68412E−03 | −2.93615E−03 | 5.33516E−04 | −4.99900E−05 | 1.81619E−06 |
| S14* | −1.19841E−02 | 2.21591E−03 | −1.96968E−02 | 1.57302E−02 | −6.72060E−03 | 1.63926E−03 | −2.17809E−04 | 1.23459E−05 |
| S15* | −1.47888E+01 | 5.46072E−04 | −8.74183E−03 | 5.76379E−03 | −2.17089E−03 | 4.86005E−04 | −6.11740E−05 | 3.38923E−06 |
| S17* | 4.75120E+00 | 8.12888E−03 | −6.26622E−03 | 2.86292E−03 | −7.91801E−04 | 1.58052E−04 | −2.24465E−05 | 1.55224E−06 |
| S18* | 3.62272E+00 | 2.64215E−03 | −3.38693E−03 | 9.61860E−04 | −1.24247E−04 | 2.17473E−05 | −8.72195E−06 | 1.06443E−06 | side surface of the second lens 512 included in the first one or more lenses 510, and S5 means an upper-side surface of the second lens 512.

In Table 1, S12 means an object-side surface of the third lens 521 included in the second one or more lenses 520, and S13 (sto) means an upper-side surface of the third lens 521 and means that an aperture is formed in the upper-side surface of the third lens 521. S14 means an object-side surface of the fourth lens 522 included in the second one or more lenses 520, and S15 means an upper-side surface of the fourth lens 522.

In Table 1, S17 means an object-side surface of the fifth lens 531 included in the third one or more lenses 530, and S18 means an upper-side surface of the fifth lens 531.

In Table 1, S8, S9, and S10 mean a light incident surface 451, a reflective surface 452, and the light exit surface 453 included in the reflective member 450 (e.g., a prism).

Auto focus and OIS data of the optical system 501 according to the first embodiment may be represented as in Table 3 below.

TABLE 3

| Auto-focus data | | |
|---|---|---|
| Object | infinity | 800 mm |
| D1 | 0 | 1.05633 |
| D2 | 0 | −1.05633 |

TABLE 3-continued

| Decenter data | | | |
| --- | --- | --- | --- |
| Decenter & Bend | | Alpha | |
| S9 | | 45.000 | |
| Pitch OIS 1.5 degree decenter data | | | |
| Basic | Alpha | Beta | Gamma |
| S7 | 1.002 | 0.000 | 0.000 |
| S11 | −1.002 | 0.000 | 0.000 |
| Yaw OIS 1.5 degree decenter data | | | |
| Basic | Alpha | Beta | Gamma |
| S7 | 0.000 | 0.000 | 1.947 |
| S11 | 0.000 | 1.947 | 0.000 |

Referring to Table 3, in the optical system 501 according to the first embodiment, the fifth lens 531 may move toward the fourth lens 522 when a close shot is taken. Accordingly, the distance between the object-side surface S17 of the fifth lens 531 and the upper-side surface S15 of the fourth lens 522 may be decreased, and the distance between the upper-side surface S18 of the fifth lens 531 and the optical filter 444 may be increased. For example, when an image of a subject at infinity (e.g., a long shot) is taken, both D1 and D2 in Table 1 may be 0, and when an image of a subject at a distance of 800 mm (e.g., a close shot) is taken, D1 in Table 1 may be 1.05633, and D2 in Table 1 may be −1.05633. Accordingly, the distance between S15 and S17 is decreased, and the distance between S18 and S20 is increased. In the optical system 501 according to the first embodiment, the reflective surface 452 or S9 of the reflective member 450 may form an angle of 45 degrees together with the optical axes OA1 and OA2.

Figure 8A:
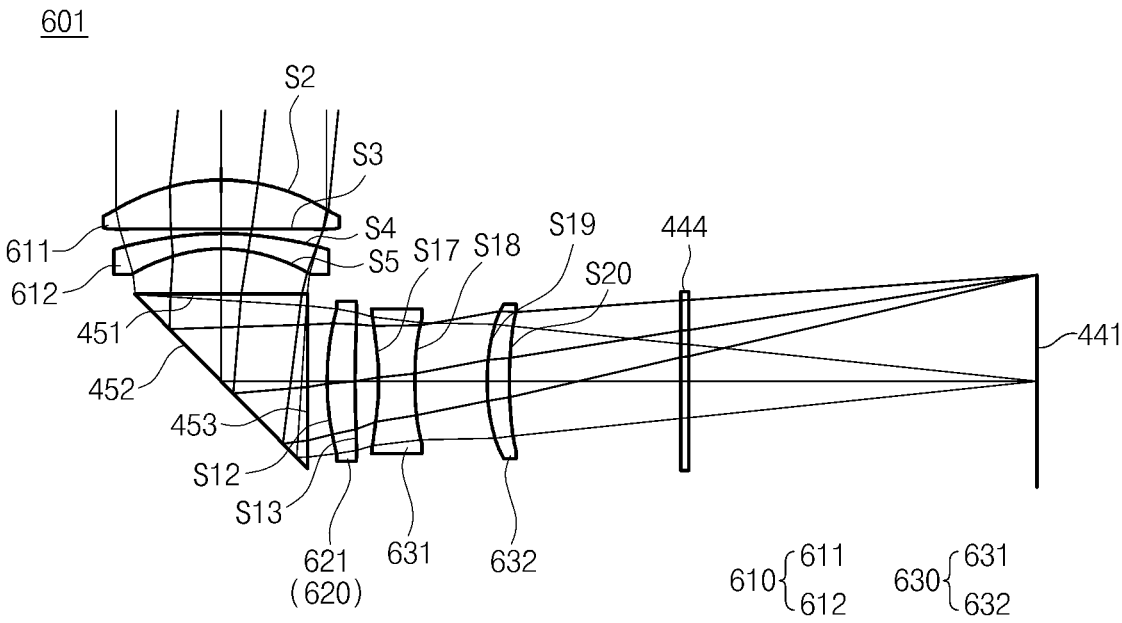
FIG. 8A is a view illustrating an optical system of a camera according to a second embodiment.
Figure 8B:
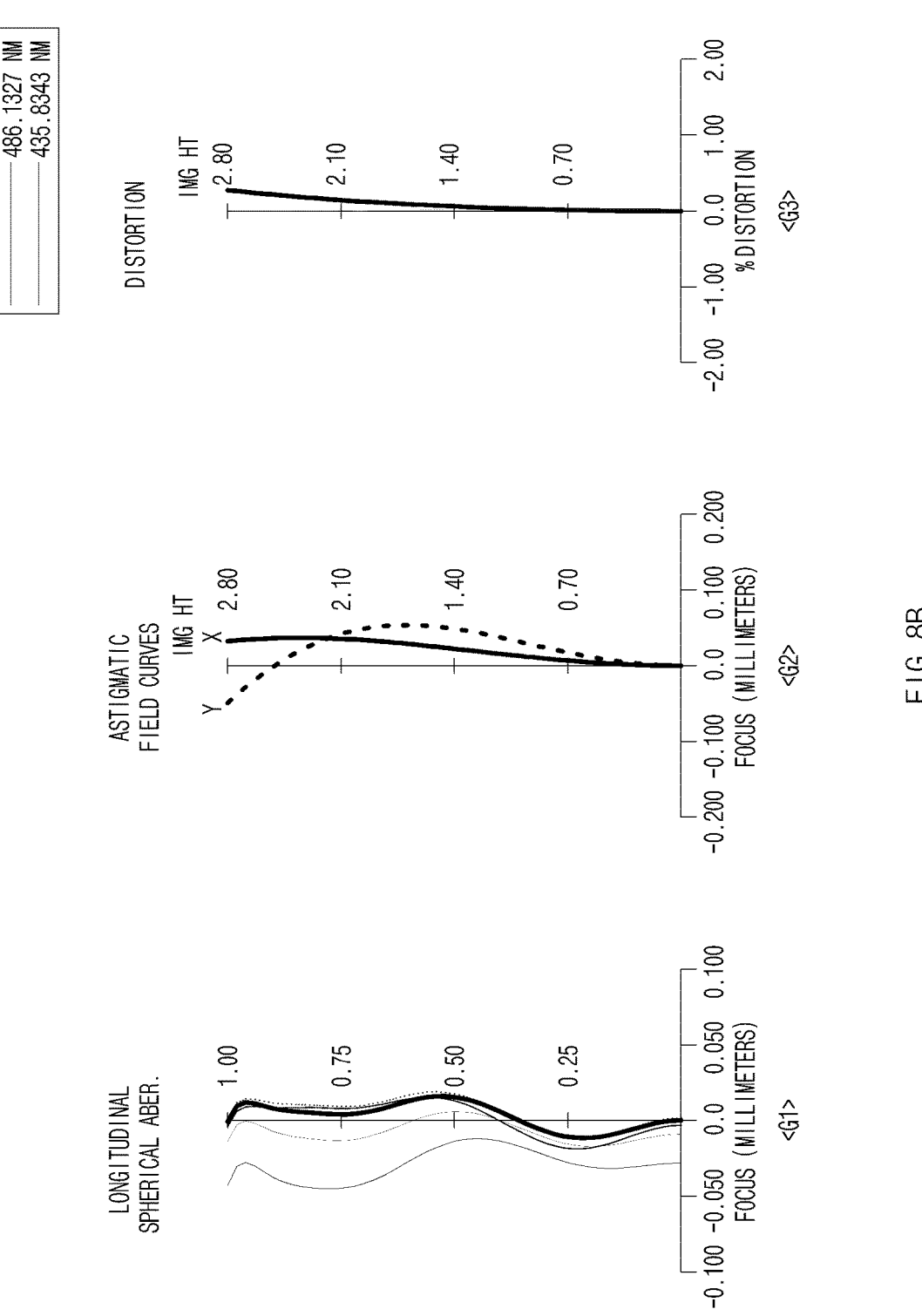
FIG. 8B is an aberration curve of the optical system of the camera according to the second embodiment.
Figure 8C:
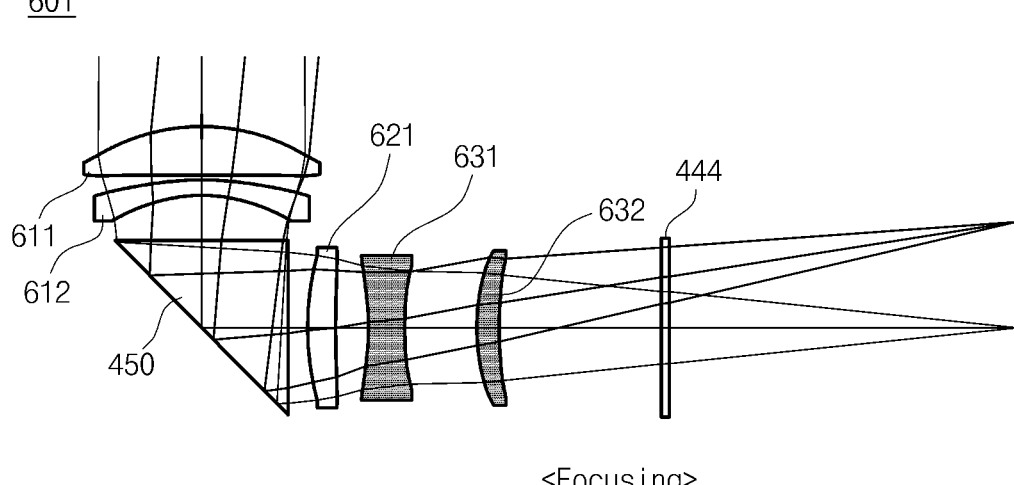
FIG. 8C is a view illustrating the optical system when the camera according to the second embodiment performs an auto focus function and an image stabilization function.
Figure 8C:
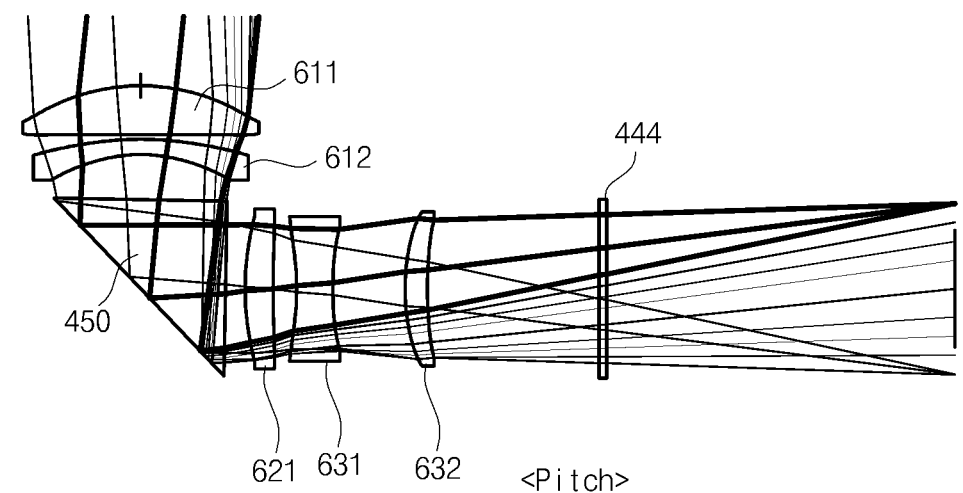
Figure 8C:
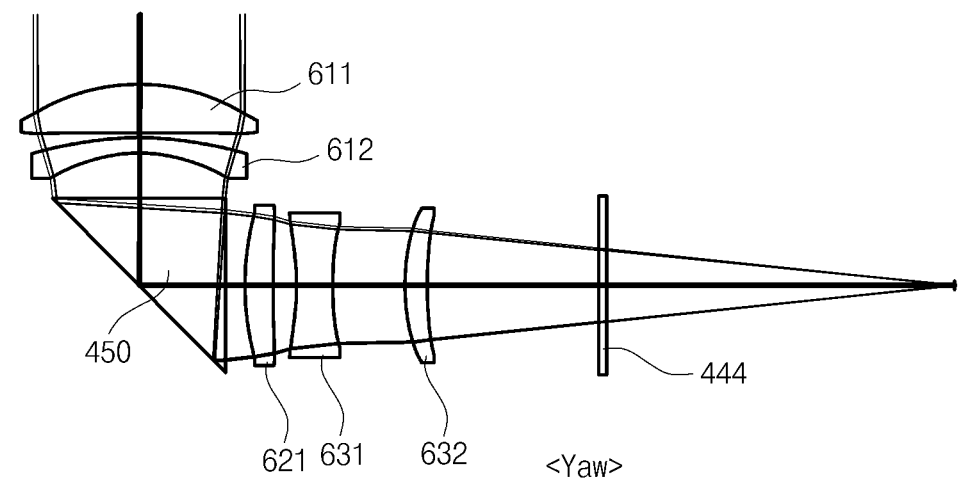

FIG. 8A is a view illustrating an optical system of a camera according to a second embodiment. FIG. 8B is an aberration curve of the optical system of the camera according to the second embodiment. FIG. 8C is a view illustrating the optical system when the camera according to the second embodiment performs an auto focus function and an image stabilization function.

Referring to FIG. 8A, the optical system 601 of the camera according to the second embodiment may include a first one or more lenses 610, a second one or more lenses 620, the third one or more lenses 630, a reflective member 450, an image sensor 441, and an optical filter 444. The second one or more lenses 620 and the third one or more lenses 630 may be disposed between the reflective member 450 and the image sensor 441 (or, the optical filter 444). The second one or more lenses 620 may be disposed closer to the reflective member 450 than the third one or more lenses 630.

In the illustrated embodiment, the first one or more lenses 610 may have positive refractive power, the second one or more lenses 620 may have positive refractive power, and the third one or more lenses 630 may have negative refractive power.

In the illustrated embodiment, the first one or more lenses 610 may include a first lens 611 that is located on an object side and that has positive refractive power and a second lens 612 that is located on an upper side (e.g., on the reflective member 450 side) and that has negative refractive power. In the illustrated embodiment, the first one or more lenses 610 may satisfy Conditional expression 1 and Conditional expression 2. For example, in relation to Conditional expression 1, the ratio Fg1/Ft of the focal length Fg1 of the first one or more lenses 610 to the focal length of the entire optical system may be 0.892. In relation to Conditional expression 2, the ratio Vd1/Vd2 of the Abbe number of the first lens 611 to the Abbe number of the second lens 612 may be 2.154.

In the illustrated embodiment, the second one or more lenses 620 may include a third lens 621 that is located on an object side (e.g., on the reflective member 450 side) and that has positive refractive power. In the illustrated embodiment, the third lens 621 of the second one or more lenses 620 may satisfy Conditional expression 3. For example, in relation to Conditional expression 3, t/D of the third lens 621 may be 0.0543.

In the illustrated embodiment, the third one or more lenses 630 may include a fourth lens 631 that is located on an object side (e.g., on the reflective member 450 side) and that has negative refractive power and a fifth lens 632 that is located on an upper side and that has positive refractive power. The third one or more lenses 630 may move along a second optical axis OA2 when the auto focus function of the camera 400 is performed. Accordingly, the focus position of the optical system 601 may vary. Unlike in the first embodiment, the fourth lens 631 and the fifth lens 632 may move together.

In the illustrated embodiment, the second one or more lenses 620 and the third one or more lenses 630 may satisfy Conditional expression 4. An aperture stopper may be included in the second one or more lenses 620, and the ratio Dmax/Da of the maximum effective diameter Dmax of the lenses included in the second one or more lenses 620 and the third one or more lenses 630 to the diameter Da of an aperture may be 1.019.

Referring to FIG. 8B, <G1> of FIG. 8B is a graph depicting spherical aberration of the optical system 601 according to the second embodiment, <G2> of FIG. 8B is a graph depicting astigmatism of the optical system 601 according to the second embodiment, and <G3> of FIG. 8B is a graph depicting distortion of the optical system 601 according to the second embodiment.

<G1> of FIG. 8B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 8B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 8B is a graph depicting a distortion factor for light having a wavelength of 546.0740 nm. An image taken through the optical system 601 according to the second embodiment may be somewhat distorted at a point out of the optical axis and may provide good optical characteristics with a distortion factor of less than about 2%.

Referring to FIG. 8C, the camera 400 may perform the auto focus function by moving the third one or more lenses 630. The third one or more lenses 630 (e.g., the fourth lens 631 and the fifth lens 632) having negative refractive power may move to an upper side when a close shot is taken and may move to an object side when a long shot is taken. For example, the third one or more lenses 630 may move toward the image sensor 441 when a close shot is taken and may move toward a light exit surface 453 of the reflective member 450 when a long shot is taken.

Referring to FIG. 8C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R1 perpendicular to a first optical axis OA1 and the second optical axis OA2. The reflective member 450 may perform a yaw operation of rotating about a second rotational axis R2 parallel to the first optical axis OA1.

Table 4 shows data of the optical system 601 according to the second upper-side surface of the first lens 611. S4 means an object-side surface of the second lens 612 included in the first one or more lenses 610, and S5 means an upper-side surface of the second lens 612.

In Table 4, S12 means an object-side surface of the third lens 621 included in the second one or more lenses 620, and S13 (sto) means an upper-side surface of the third lens 621 and means that an aperture is formed in the upper-side surface of the third lens 621.

In Table 4, S17 means an object-side surface of the fourth lens 631 included in the third one or more lenses 630, and S18 means an upper-side surface of the fourth lens 631. S19 means an object-side surface of the fifth lens 632 included in the third one or more lenses 630, and S20 means an upper-side surface of the fifth lens 632.

In Table 4, S8, S9, and S10 mean a light incident surface 451, a reflective surface 452, and the light exit surface 453 included in the reflective member 450 (e.g., a prism).

TABLE 4

| Surf | Note | Radius of curvature (mm) | Thickness/ Distance (mm) | Nd Refractive Index | Vd Abbe number | H-Ape |
|---|---|---|---|---|---|---|
| OBJ | object | infinity | infinity | | | |
| 1 | dummy | infinity | 0.00000 | | | 2.93291 |
| S2* | first lens | 5.39880 | 1.28522 | 1.54397 | 55.930 | 2.85000 |
| S3* | | −495.25858 | 0.12193 | | | 2.74989 |
| S4* | second | 7.94623 | 0.40457 | 1.61443 | 25.960 | 2.59753 |
| S5* | lens | 4.06661 | 0.68828 | | | 2.37751 |
| 6 | dummy | infinity | 0.50000 | | | 2.37536 |
| 7 | dummy | infinity | 0.00000 | | | 2.30940 |
| S8 | light incident surface | infinity | 2.30000 | 1.83400 | 37.340 | 3.47131 |
| S9 | reflective surface | infinity | −2.30000 | 1.83400 | 37.340 | 4.16413 |
| S10 | light exit surface | infinity | −0.51475 | | | 3.47131 |
| 11 | dummy | infinity | 0.00000 | | | 1.93416 |
| S12* | third lens | −6.87994 | −0.75126 | 1.67977 | 18.420 | 1.90400 |
| S13* (sto) | | −31.46091 | −0.05001 | | | 1.81450 |
| 14 | dummy | infinity | −0.40063 | | | 1.81130 |
| 15 | dummy | infinity | D1 | | | 1.73408 |
| 16 | dummy | infinity | −0.17209 | | | 1.73408 |
| S17* | fourth lens | 6.33981 | −0.96218 | 1.61443 | 25.960 | 1.73360 |
| S18* | | −10.33184 | −1.92087 | | | 1.64596 |
| S19* | fifth lens | −5.43505 | −0.59602 | 1.54397 | 55.930 | 1.85000 |
| S20* | | −11.82466 | −4.56400 | | | 1.82384 |
| 21 | dummy | infinity | D2 | | | 2.13252 |
| S22 | optical | infinity | −0.21000 | 1.51680 | 64.170 | 2.13252 |
| S23 | filter | infinity | −9.2582 | | | 2.14224 |
| IMG | image sensor | infinity | 0 | | | 2.80080 |

The positive thickness/distance in Table 4 means that it is located on the first optical axis OA1, and the negative thickness/distance means that it is located on the second optical axis OA2. In Table 4, "*" represents that an optical surface is formed of an aspheric surface. In Table 4, IMG means an image plane of the image sensor 441. In Table 4, S2 means an object-side surface of the first lens 611 included in the first one or more lenses 610, and S3 means an In Table 4, S22 and S23 mean an object-side surface and an upper-side surface of the optical filter.

Aspheric coefficients of the lenses according to the second embodiment may be represented as in Table 5 below. The aspheric coefficients may be calculated based on Equation 1 described above.

TABLE 5

| Surf | K (Conic) | A | B | C | D | E | F | G |
|---|---|---|---|---|---|---|---|---|
| S2* | 2.07174E−02 | −3.04573E−04 | 8.38547E−05 | −8.58381E−06 | 1.69999E−06 | −8.08191E−07 | 1.28143E−07 | −6.74187E−09 |
| S3* | −1.39335E−01 | 8.41024E−05 | 2.12633E−04 | −2.12017E−05 | −1.19699E−05 | 3.50799E−06 | −3.44871E−07 | 1.10433E−08 |
| S4* | −4.30490E+00 | −1.83773E−03 | −3.60462E−04 | 2.27122E−04 | −5.09749E−05 | 7.51401E−06 | −6.47409E−07 | 2.30386E−08 |
| S5* | −2.45177E−02 | −3.60031E−03 | −5.85643E−04 | 2.63389E−04 | −2.66185E−05 | −1.46722E−06 | 4.75029E−07 | −2.62730E−08 |
| S12* | −2.87735E+00 | 2.61741E−03 | −4.44163E−03 | 2.94571E−03 | −1.02807E−03 | 2.15194E−04 | −2.75084E−05 | 1.76142E−06 |
| S13* | −2.35598E+00 | 9.94124E−03 | −1.29800E−02 | 8.57784E−03 | −2.94541E−03 | 5.37522E−04 | −4.83977E−05 | 1.75509E−06 |
| S17* | −2.78145E−01 | 2.18832E−03 | −1.97350E−02 | 1.56845E−02 | −6.71209E−03 | 1.64655E−03 | −2.17637E−04 | 1.20289E−05 |
| S18* | −1.18481E+00 | −3.32428E−03 | −8.75155E−03 | 6.05361E−03 | −2.20180E−03 | 4.78204E−04 | −6.42556E−05 | 4.35353E−06 |
| S19* | 3.38905E+00 | 8.10254E−03 | −5.12500E−03 | 2.31971E−03 | −7.56236E−04 | 1.74546E−04 | −2.57533E−05 | 1.61047E−06 |
| S20* | 3.04397E−01 | 3.57578E−03 | −4.33604E−03 | 1.34018E−03 | −2.17965E−04 | 4.65257E−06 | 6.50218E−07 | −3.42368E−08 |

Auto focus and OIS data of the optical system 601 according to the second embodiment may be represented as in Table 6 below.

TABLE 6

| Auto-focus data | | |
|---|---|---|
| Object | infinity | 500 mm |
| D1 | 0 | −0.24650 |
| D2 | 0 | 0.24650 |

| Decenter data | |
|---|---|
| Decenter & Bend | Alpha |
| S9 | 45.000 |

| Pitch OIS 1.5 degree decenter data | | | |
|---|---|---|---|
| Basic | Alpha | Beta | Gamma |
| S7 | 1.002 | 0.000 | 0.000 |
| S11 | −1.002 | 0.000 | 0.000 |

| Yaw OIS 1.5 degree decenter data | | | |
|---|---|---|---|
| Basic | Alpha | Beta | Gamma |
| S7 | 0.000 | 0.000 | 2.188 |
| S11 | 0.000 | 2.188 | 0.000 |

Referring to Table 6, in the optical system 601 according to the second embodiment, the third one or more lenses 630 (e.g., the fourth lens 631 and the fifth lens 632) may move away from the third lens 621 by a predetermined distance when a close shot is taken. Accordingly, the distance between the object-side surface S17 of the fourth lens 631 and the upper-side surface S13 of the third lens 621 may be increased, and the distance between the upper-side surface S20 of the fifth lens 632 and the optical filter 444 may be decreased. For example, when an image of a subject at infinity (e.g., a long shot) is taken, both D1 and D2 in Table 4 may be 0, and when an image of a subject at a distance of 500 mm (e.g., a close shot) is taken, D1 in Table 4 may be −0.24650, and D2 in Table 4 may be 0.24650. Accordingly, the distance between S13 and S17 is increased, and the distance between S20 and S22 is decreased. In the optical system 601 according to the second embodiment, the reflective surface 452 or S9 of the reflective member 450 may form an angle of 45 degrees together with the optical axes OA1 and OA2.

Figure 9A:
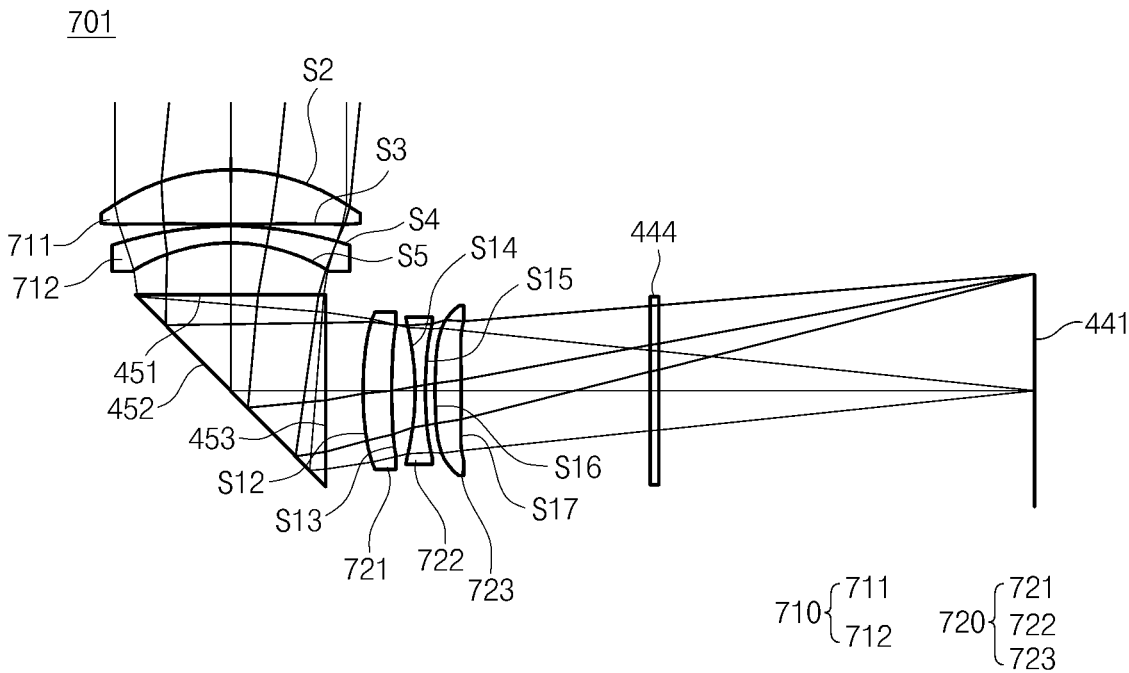
FIG. 9A is a view illustrating an optical system of a camera according to a third embodiment.
Figure 9B:
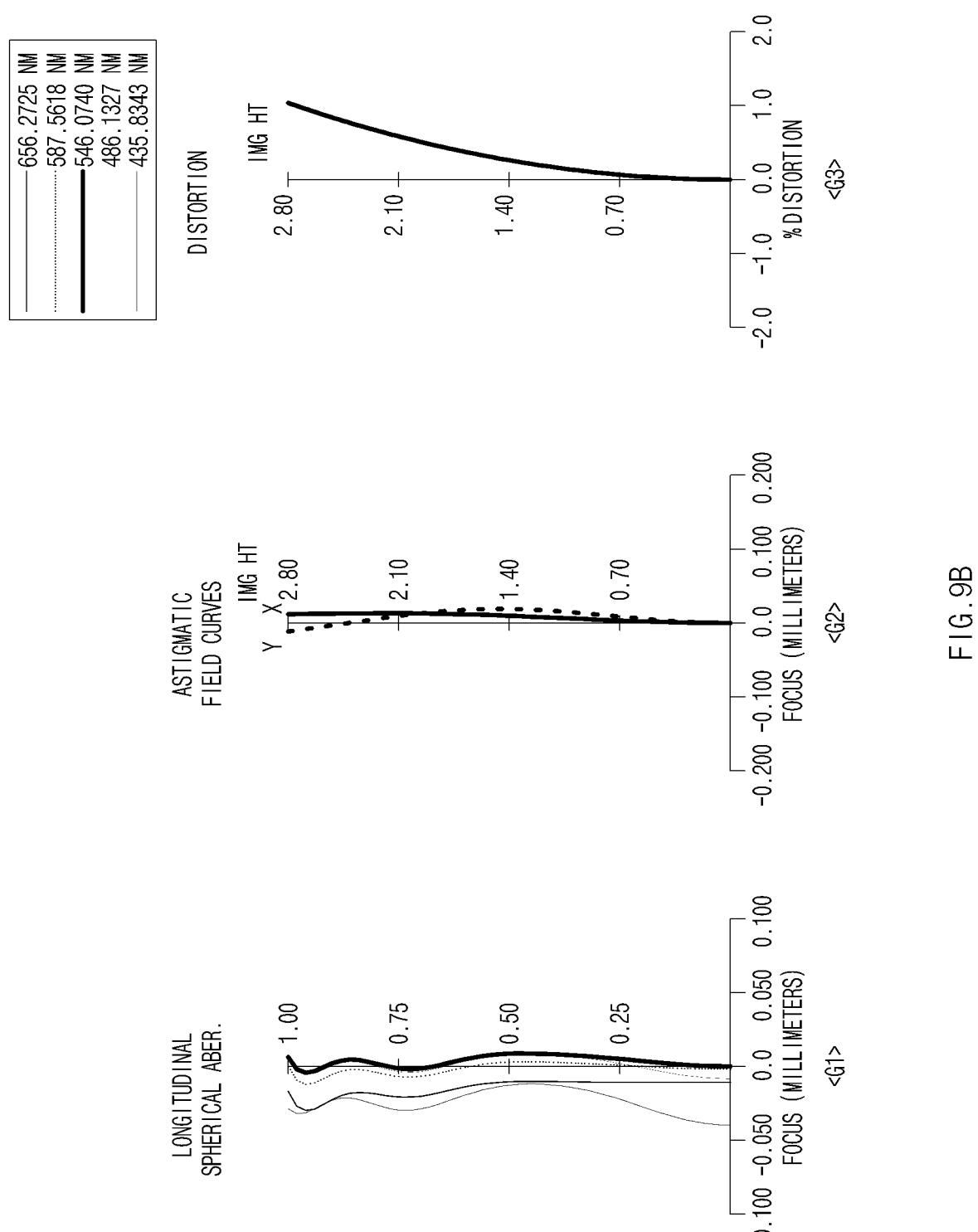
FIG. 9B is an aberration curve of the optical system of the camera according to the third embodiment.
Figure 9C:
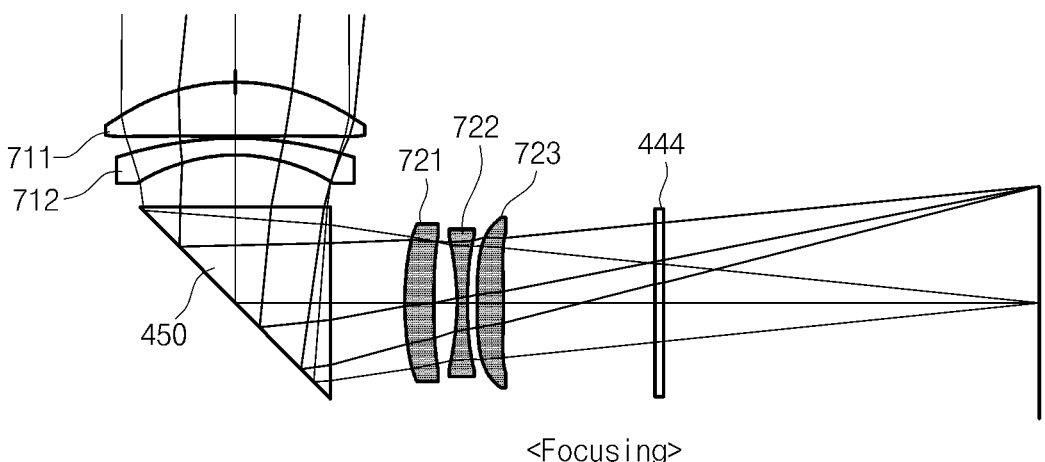
FIG. 9C is a view illustrating the optical system when the camera according to the third embodiment performs an auto focus function and an image stabilization function.
Figure 9C:
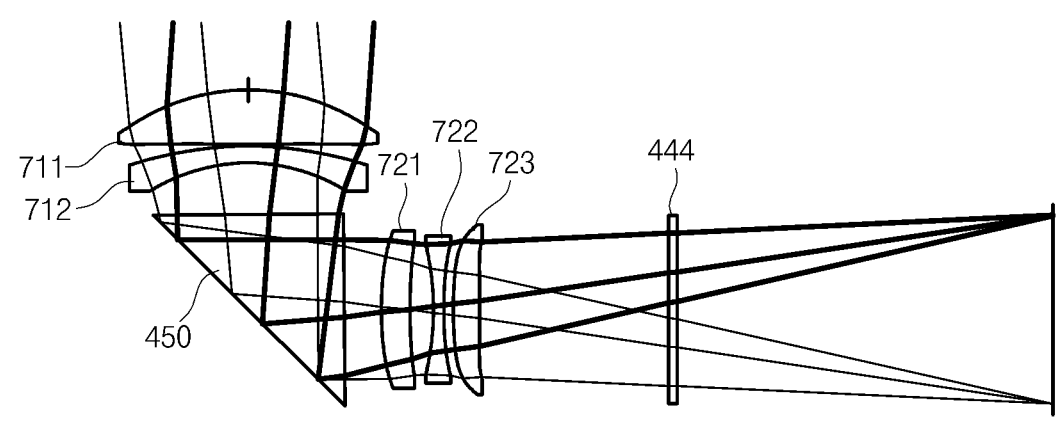
Figure 9C:
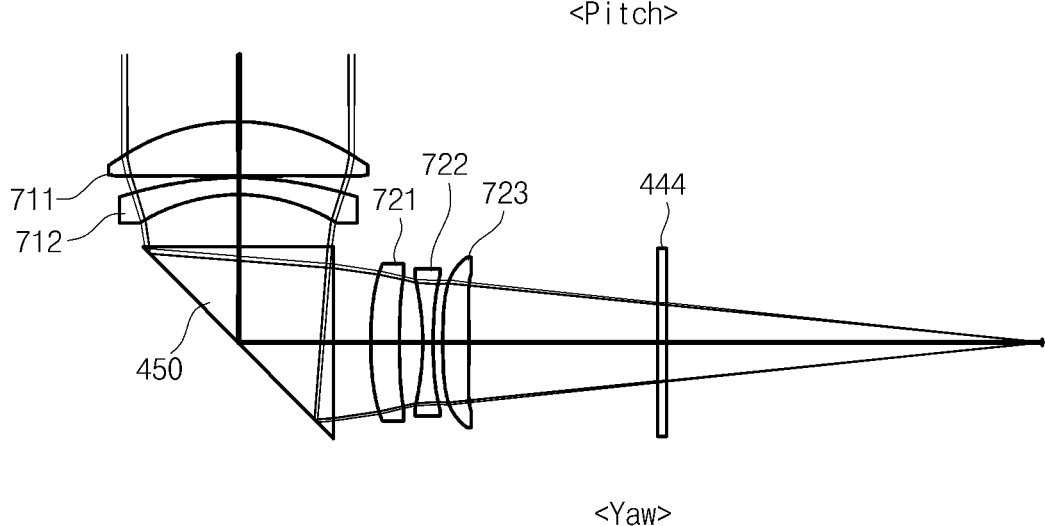

FIG. 9A is a view illustrating an optical system of a camera according to a third embodiment. FIG. 9B is an aberration curve of the optical system of the camera according to the third embodiment. FIG. 9C is a view illustrating the optical system when the camera according to the third embodiment performs an auto focus function and an image stabilization function.

Referring to FIG. 9A, the optical system 701 of the camera 400 according to the third embodiment may include a first one or more lenses 710, a second one or more lenses 720, a reflective member 450, an image sensor 441, and an optical filter 444. The second one or more lenses 720 may be disposed between the reflective member 450 and the image sensor 441 (or, the optical filter 444).

In the illustrated embodiment, the first one or more lenses 710 may have positive refractive power, and the second one or more lenses 720 may have negative refractive power.

In the illustrated embodiment, the first one or more lenses 710 may include a first lens 711 that is located on an object side and that has positive refractive power and a second lens 712 that is located on an upper side (e.g., on the reflective member 450 side) and that has negative refractive power. In the illustrated embodiment, the first one or more lenses 710 may satisfy Conditional expression 1 and Conditional expression 2. For example, in relation to Conditional expression 1, the ratio Fg1/Ft of the focal length Fg1 of the first one or more lenses 710 to the focal length of the entire optical system 701 may be 0.702. In relation to Conditional expression 2, the ratio Vd1/Vd2 of the Abbe number of the first lens 711 to the Abbe number of the second lens 712 may be 2.154.

In the illustrated embodiment, the second one or more lenses 720 may include a third lens 721 that is located on an object side (e.g., on the reflective member 450 side) and that has positive refractive power, a fourth lens 722 that is located on an upper side (e.g., on the image sensor 441 side) when compared to the third lens and that has negative refractive power, and a fifth lens 723 that is located on an upper side (e.g., on the image sensor 441 side) when compared to the fourth lens 722 and that has positive refractive power.

In the illustrated embodiment, the third lens 721 of the second one or more lenses 720 may satisfy Conditional expression 3. For example, in relation to Conditional expression 3, t/D of the third lens may be 0.0606.

In the illustrated embodiment, the second one or more lenses 720 may move along a second optical axis OA2 when the auto focus function of the camera 400 is performed. Accordingly, the focus position of the optical system may vary. Unlike in the first embodiment, the third lens 721, the fourth lens 722, and the fifth lens 723 may move together.

In the illustrated embodiment, the second one or more lenses 720 may satisfy Conditional expression 4. An aperture stopper may be included in the second one or more lenses 720, and the ratio Dmax/Da of the maximum effective diameter Dmax of the lenses included in the second one or more lenses 720 to the diameter Da of an aperture may be 1.02.

Referring to FIG. 9B, <G1> of FIG. 9B is a graph depicting spherical aberration of the optical system 701 according to the third embodiment, <G2> of FIG. 9B is a graph depicting astigmatism of the optical system 701 according to the third embodiment, and <G3> of FIG. 9B is a graph depicting distortion of the optical system 701 according to the third embodiment.

<G1> of FIG. 9B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 9B is a graph depicting astigmatism for light having a wavelength of 546.0740 nm and may reprelenses 720. The second one or more lenses 720 (e.g., the third lens 721, the fourth lens 722, and the fifth lens 723) having negative refractive power may move to an upper side when a close shot is taken and may move to an object side when a long shot is taken. For example, the second one or more lenses 720 may move toward the image sensor 441 when a close shot is taken and may move toward a light exit surface 453 of the reflective member 450 when a long shot is taken.

Referring to FIG. 9C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R1 perpendicular to a first optical axis OA1 and the second optical axis OA2. The reflective member 450 may perform a yaw operation of rotating about a second rotational axis R2 parallel to the first optical axis OA1.

Table 7 shows data of the optical system 701 according to the third

TABLE 7

| Surf | Note | Radius of curvature (mm) | Thickness/ Distance (mm) | Nd Refractive index | Vd Abbe number | H-Ape |
|------|------|------|------|------|------|------|
| OBJ | object | infinity | infinity | | | |
| 1 | dummy | infinity | 0.00000 | | | 2.93844 |
| S2* | first lens | 5.13119 | 1.29360 | 1.54397 | 55.930 | 2.85000 |
| S3* | | −172.32307 | 0.04803 | | | 2.75264 |
| S4* | second | 7.91225 | 0.40283 | 1.61443 | 25.960 | 2.60182 |
| S5* | lens | 4.18396 | 0.74035 | | | 2.37101 |
| 6 | dummy | infinity | 0.50000 | | | 2.36044 |
| 7 | dummy | infinity | 0.00000 | | | 2.27855 |
| S8 | light incident surface | infinity | 2.30000 | 1.83400 | 37.340 | 3.47131 |
| S9 | reflective surface | infinity | −2.30000 | 1.83400 | 37.340 | 4.16413 |
| S10 | light exit surface | infinity | −0.89952 | | | 3.47131 |
| 11 | dummy | infinity | D1 | | | 1.74523 |
| S12* | third lens | −8.10726 | −0.69664 | 1.67977 | 18.420 | 1.71160 |
| S13* (sto) | | −17.00773 | −0.56542 | | | 1.57844 |
| S14* | fourth | 5.98407 | −0.25000 | 1.58693 | 30.770 | 1.56797 |
| S15* | lens | −11.77003 | −0.23249 | | | 1.60280 |
| S16* | fifth lens | −14.17159 | −0.63509 | 1.58043 | 36.130 | 1.85000 |
| S17* | | 25.02666 | −4.56577 | | | 1.66029 |
| 18 | dummy | infinity | D2 | | | 2.03444 |
| S19 | optical | infinity | −0.21 | 1.51680 | 64.170 | 2.03444 |
| S20 | filter | infinity | −9.08531 | | | 2.04589 |
| IMG | image sensor | infinity | 0.00000 | | | 2.80028 | sent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 9B is a graph depicting a distortion factor for light having a wavelength of 546.0740 nm. An image taken through the optical system 701 according to the third embodiment may be somewhat distorted at a point out of the optical axis and may provide good optical characteristics with a distortion factor of less than about 2%.

Referring to FIG. 9C, the camera 400 may perform the auto focus function by moving the second one or more The positive thickness/distance in Table 7 means that it is located on the first optical axis OA1, and the negative thickness/distance means that it is located on the second optical axis OA2. In Table 7, "*" represents that an optical surface is formed of an aspheric surface. In Table 7, IMG means an image plane of the image sensor 441. In Table 7, S2 means an object-side surface of the first lens 711 included in the first one or more lenses 710, and S3 means an upper-side surface of the first lens 711. S4 means an object-side surface of the second lens 712 included in the first one or more lenses 710, and S5 means an upper-side surface of the second lens 712.

In Table 7, S12 means an object-side surface of the third lens 721 included in the second one or more lenses 720, and S13 (sto) means an upper-side surface of the third lens 721 and means that an aperture is formed in the upper-side surface of the third lens 721.

In Table 7, S14 means an object-side surface of the fourth lens 722 included in the second one or more lenses 720, and S15 means an upper-side surface of the fourth lens 722. S16 means an object-side surface of the fifth lens 723 included in the second one or more lenses 720, and S17 means an upper-side surface of the fifth lens 723.

In Table 7, S8, S9, and S10 mean a light incident surface 451, a reflective surface 452, and the light exit surface 453 included in the reflective member 450 (e.g., a prism).

In Table 7, S19 and S20 mean an object-side surface and an upper-side surface of the optical filter.

Aspheric coefficients of the lenses according to the third embodiment may be represented as in Table 8 below. The aspheric coefficients may be calculated based on Equation 1 described above.

a close shot is taken. Accordingly, the distance between the object-side surface S12 of the third lens 721 and the light exit surface S10 of the reflective member 450 may be increased, and the distance between the upper-side surface S17 of the fifth lens 723 and the optical filter 444 may be decreased. For example, when an image of a subject at infinity (e.g., a long shot) is taken, both D1 and D2 in Table 7 may be 0, and when an image of a subject at a distance of 800 mm (e.g., a close shot) is taken, D1 in Table 7 may be −0.90000, and D2 in Table 7 may be 0.90000. Accordingly, the distance between S10 and S12 is increased, and the distance between S17 and S19 is decreased. In the optical system 701 according to the third embodiment, the reflective surface 452 or S9 of the reflective member 450 may form an angle of 45 degrees together with the optical axes OA1 and OA2.

Figure 10A:
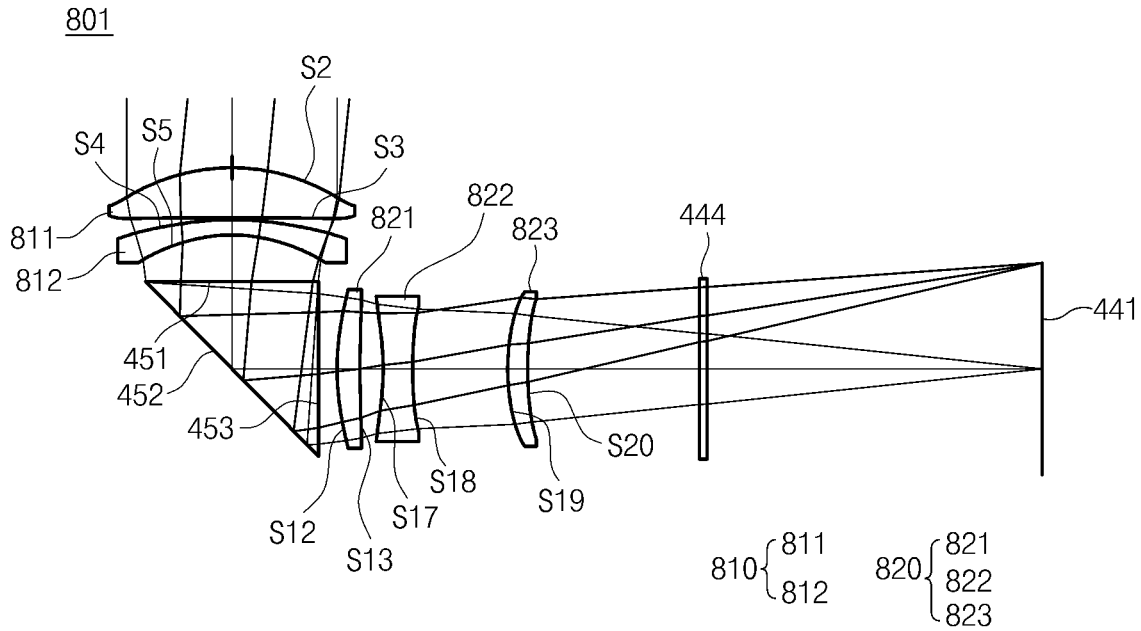
FIG. 10A is a view illustrating an optical system of a camera according to a fourth embodiment.
Figure 10B:
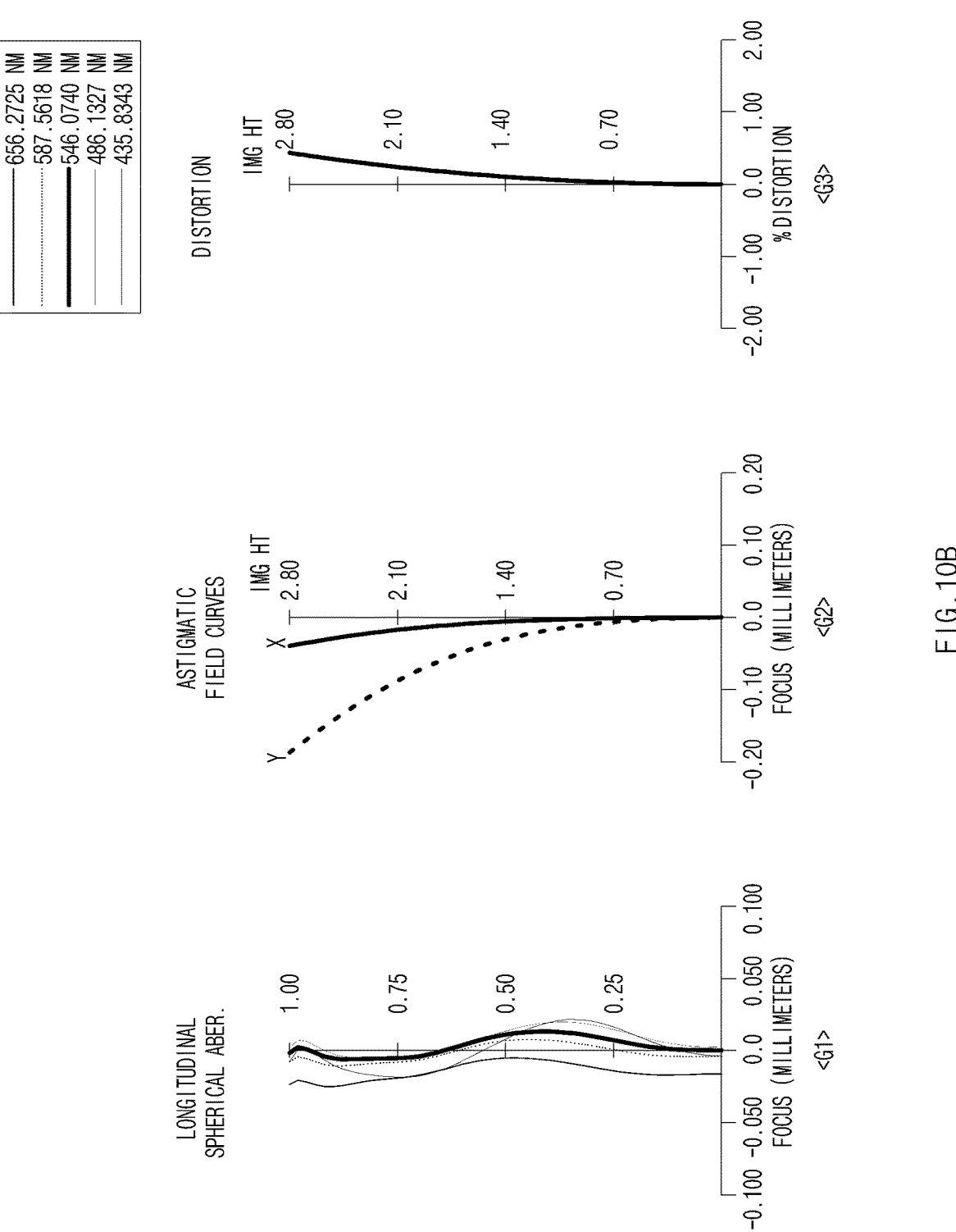
FIG. 10B is an aberration curve of the optical system of the camera according to the fourth embodiment.
Figure 10C:
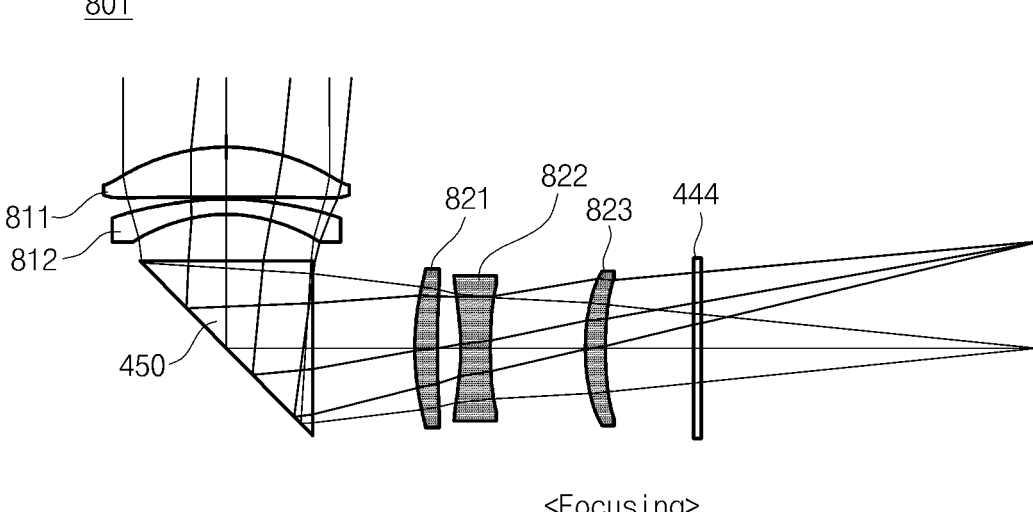
FIG. 10C is a view illustrating the optical system when the camera according to the fourth embodiment performs an auto focus function and an image stabilization function.
Figure 10C:
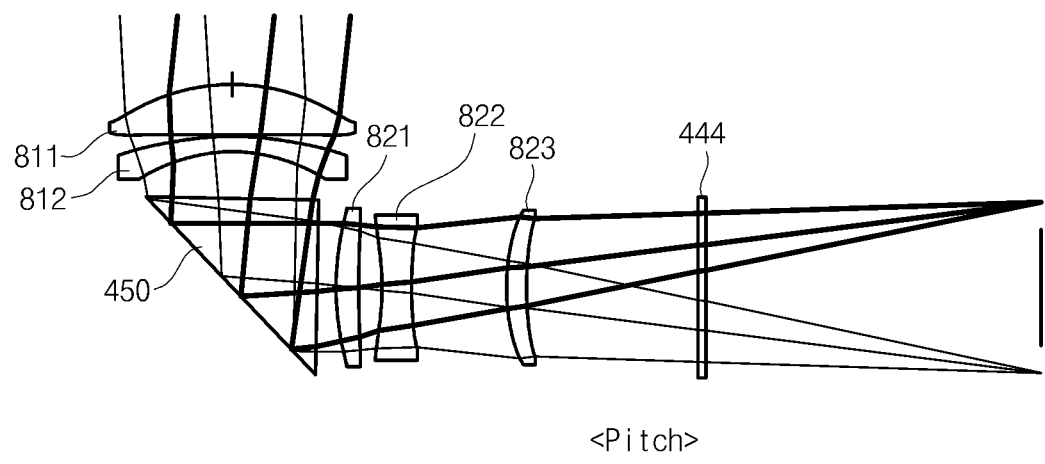
Figure 10C:
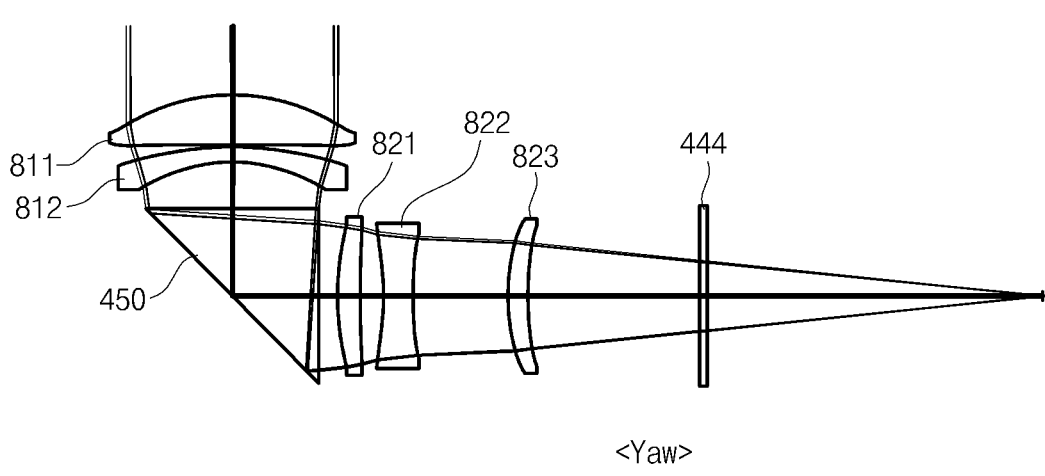

FIG. 10A is a view illustrating an optical system of a camera according to a fourth embodiment. FIG. 10B is an aberration curve of the optical system of the camera according to the fourth embodiment. FIG. 10C is a view illustrating

TABLE 8

| Surf | K (Conic) | A | B | C | D | E | F | G |
|---|---|---|---|---|---|---|---|---|
| S2* | −8.49046E−01 | 5.10042E−04 | 1.34005E−04 | −1.06023E−05 | 1.59547E−06 | −8.08798E−07 | 1.30702E−07 | −6.73532E−09 |
| S3* | 5.34815E−01 | 4.95581E−04 | 1.94612E−04 | −2.36900E−05 | −1.20277E−05 | 3.52434E−06 | −3.45724E−07 | 1.13291E−08 |
| S4* | −1.60258E+00 | −1.97578E−03 | −2.87554E−04 | 2.26777E−04 | −5.18784E−05 | 7.38476E−06 | −6.45601E−07 | 2.44596E−08 |
| S5* | 6.01961E−02 | −3.36286E−03 | −4.16413E−04 | 2.68556E−04 | −2.86183E−05 | −1.41006E−06 | 3.72227E−07 | −1.45141E−08 |
| S12* | 5.23407E+00 | 2.79859E−03 | −5.14025E−03 | 2.83230E−03 | −1.04575E−03 | 2.15130E−04 | −2.73082E−05 | 2.00564E−06 |
| S13* | −1.10551E+00 | 6.62745E−03 | −1.33945E−02 | 8.32971E−03 | −3.03814E−03 | 5.39700E−04 | −4.63170E−05 | 2.35923E−06 |
| S14* | −1.74410E+01 | 1.25027E−02 | −1.85065E−02 | 1.54854E−02 | −6.77128E−03 | 1.66441E−03 | −2.22575E−04 | 1.16845E−05 |
| S15* | 2.82062E−01 | −3.73144E−03 | −9.10081E−03 | 6.39241E−03 | −2.24028E−03 | 4.81276E−04 | −7.17515E−05 | 5.35590E−06 |
| S16* | −9.26586E−01 | −4.01916E−03 | −8.25492E−03 | 2.13381E−03 | −6.48556E−04 | 1.59005E−04 | −3.36027E−05 | 3.27411E−06 |
| S17* | −7.33403E−01 | −3.99159E−03 | −4.04719E−03 | 7.27154E−04 | −2.52423E−04 | 3.27320E−05 | −1.64339E−05 | 2.24176E−06 |

Auto focus and OIS data of the optical system 701 according to the third embodiment may be represented as in Table 9 below.

TABLE 9

| Auto-focus data | | |
|---|---|---|
| Object | infinity | 800 mm |
| D1 | 0 | −0.90000 |
| D2 | 0 | 0.90000 |

| Decenter data | |
|---|---|
| Decenter & Bend | Alpha |
| S9 | 45.000 |

| Pitch OIS 1.5 degree decenter data | | | |
|---|---|---|---|
| Basic | Alpha | Beta | Gamma |
| S7 | 1.010 | 0.000 | 0.000 |
| S11 | −1.010 | 0.000 | 0.000 |

| Yaw OIS 1.5 degree decenter data | | | |
|---|---|---|---|
| Basic | Alpha | Beta | Gamma |
| S7 | 0.000 | 0.000 | 2.112 |
| S11 | 0.000 | 2.112 | 0.000 |

Referring to Table 9, in the optical system 701 according to the third embodiment, the second one or more lenses 720 (e.g., the third lens 721, the fourth lens 722, and the fifth lens 723) may move away from the reflective member 450 when the optical system when the camera according to the fourth embodiment performs an auto focus function and an image stabilization function.

Referring to FIG. 10A, the optical system 801 of the camera 400 according to the fourth embodiment may include a first one or more lenses 810, a second one or more lenses 820, a reflective member 450, an image sensor 441, and an optical filter 444. The second one or more lenses 820 may be disposed between the reflective member 450 and the image sensor 441 (or, the optical filter 444).

In the illustrated embodiment, the first one or more lenses 810 may have positive refractive power, and the second one or more lenses 820 may have negative refractive power.

In the illustrated embodiment, the first one or more lenses 810 may include a first lens 811 that is located on an object side and that has positive refractive power and a second lens 812 that is located on an upper side (e.g., on the reflective member 450 side) and that has negative refractive power. In the illustrated embodiment, the first one or more lenses 810 may satisfy Conditional expression 1 and Conditional expression 2. For example, in relation to Conditional expression 1, the ratio Fg1/Ft of the focal length Fg1 of the first one or more lenses 810 to the focal length of the entire optical system 801 may be 0.84. In relation to Conditional expression 2, the ratio Vd1/Vd2 of the Abbe number of the first lens 811 to the Abbe number of the second lens 812 may be 2.154.

In the illustrated embodiment, the second one or more lenses 820 may include a third lens 821 that is located on an object side (e.g., on the reflective member 450 side) and that has positive refractive power, a fourth lens 822 that is located on an upper side (e.g., on the image sensor 441 side) when compared to the third lens and that has negative refractive power, and a fifth lens 823 that is located on an upper side (e.g., on the image sensor 441 side) when compared to the fourth lens 822 and that has positive refractive power.

In the illustrated embodiment, the third lens 821 of the second one or more lenses 820 may satisfy Conditional expression 3. For example, in relation to Conditional expression 3, t/D of the third lens 821 may be 0.0534.

In the illustrated embodiment, the second one or more lenses 820 may move along a second optical axis OA2 when the auto focus function of the camera 400 is performed. Accordingly, the focus position of the optical system 801 may vary. Unlike in the first embodiment, the third lens 821, the fourth lens 822, and the fifth lens 823 may move together.

In the illustrated embodiment, the second one or more lenses 820 may satisfy Conditional expression 4. An aperture stopper may be included in the second one or more lenses 820, and the ratio Dmax/Da of the maximum effective diameter Dmax of the lenses included in the second one or more lenses 820 to the diameter Da of an aperture may be 1.02.

Referring to FIG. 10B, <G1> of FIG. 10B is a graph depicting spherical aberration of the optical system 801 according to the fourth embodiment, <G2> of FIG. 10B is a graph depicting astigmatism of the optical system 801 according to the fourth embodiment, and <G3> of FIG. 10B is a graph depicting distortion of the optical system 801 according to the fourth embodiment.

<G1> of FIG. 10B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 10B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 10B is a graph depicting a distortion factor for light having a wavelength of 546.0740 nm. An image taken through the optical system 801 according to the fourth embodiment may be somewhat distorted at a point out of the optical axis and may provide good optical characteristics with a distortion factor of less than about 2%.

Referring to FIG. 10C, the camera 400 may perform the auto focus function by moving the second one or more lenses 820. The second one or more lenses 820 (e.g., the third lens 821, the fourth lens 822, and the fifth lens 823) having negative refractive power may move to an upper side when a close shot is taken and may move to an object side when a long shot is taken. For example, the second one or more lenses 820 may move toward the image sensor 441 when a close shot is taken and may move toward a light exit surface 453 of the reflective member 450 when a long shot is taken.

Referring to FIG. 10C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R1 perpendicular to a first optical axis OA1 and the second optical axis OA2. The reflective member 450 may perform a yaw operation of rotating about a second rotational axis R2 parallel to the first optical axis OA1.

Table 10 shows data of the optical system 801 according to the fourth

TABLE 10

| Surf | Note | Radius of curvature (mm) | Thickness/ Distance (mm) | Nd Refractive index | Vd Abbe number | H-Ape |
|---|---|---|---|---|---|---|
| OBJ | object | infinity | infinity | | | |
| 1 | dummy | infinity | 0.00000 | | | 2.93298 |
| S2* | first lens | 5.37675 | 1.31796 | 1.54397 | 55.930 | 2.85000 |
| S3* | | infinity | 0.05000 | | | 2.74147 |
| S4* | second | 7.78612 | 0.40043 | 1.61443 | 25.960 | 2.61103 |
| S5* | lens | 4.12415 | 0.73161 | | | 2.39240 |
| 6 | dummy | infinity | 0.50000 | | | 2.38411 |
| 7 | dummy | infinity | 0.00000 | | | 2.31471 |
| S8 | light incident surface | infinity | 2.30000 | 1.83400 | 37.340 | 3.47131 |
| S9 | reflective surface | infinity | −2.30000 | 1.83400 | 37.340 | 4.16413 |
| S10 | light exit surface | infinity | −0.50000 | | | 3.47131 |
| 11 | dummy | infinity | D1 | | | 1.91879 |
| S12* | third lens | −6.97253 | −0.60478 | 1.67977 | 18.420 | 1.88777 |
| S13* (sto) | | −26.08790 | −0.05786 | | | 1.81886 |
| 14 | dummy | infinity | −0.38413 | | | 1.81597 |
| 15 | dummy | infinity | 0.00000 | | | 1.74310 |
| 16 | dummy | infinity | −0.17708 | | | 1.74310 |
| S17* | fourth lens | 6.46291 | −0.78874 | 1.61443 | 25.960 | 1.74091 |
| S18* | | −15.14113 | −2.5229 | | | 1.66265 |
| S19* | fifth lens | −5.46837 | −0.53078 | 1.54397 | 55.930 | 1.85000 |
| S20* | | −8.89783 | −4.56401 | | | 1.81755 |
| 21 | dummy | infinity | D2 | | | 2.13534 |
| S22 | optical filter | infinity | −0.21000 | 1.51680 | 64.170 | 2.13534 |
| S23 | filter | infinity | −8.91511 | | | 2.14545 |
| IMG | image sensor | infinity | 0 | | | 2.80017 |

The positive thickness/distance in Table 10 means that it is located on the first optical axis OA1, and the negative thickness/distance means that it is located on the second optical axis OA2. In Table 10, "*" represents that an optical surface is formed of an aspheric surface. In Table 10, IMG means an image plane of the image sensor 441. In Table 10, S2 means an object-side surface of the first lens 811 included in the first one or more lenses 810, and S3 means an upper-side surface of the first lens 811. S4 means an object-side surface of the second lens 812 included in the first one or more lenses 810, and S5 means an upper-side surface of the second lens 812.

In Table 10, S12 means an object-side surface of the third lens 821 included in the second one or more lenses 820, and S13 (sto) means an upper-side surface of the third lens 821 and means that an aperture is formed in the upper-side surface of the third lens 821.

In Table 10, S17 means an object-side surface of the fourth lens 822 included in the second one or more lenses 820, and S18 means an upper-side surface of the fourth lens 822. S19 means an object-side surface of the fifth lens 823 included in the second one or more lenses 820, and S20 means an upper-side surface of the fifth lens 823.

In Table 10, S8, S9, and S10 mean a light incident surface 451, a reflective surface 452, and the light exit surface 453 included in the reflective member 450 (e.g., a prism).

In Table 10, S22 and S23 mean an object-side surface and an upper-side surface of the optical filter.

Aspheric coefficients of the lenses according to the fourth embodiment may be represented as in Table 11 below. The aspheric coefficients may be calculated based on Equation 1 described above.

TABLE 11

| Surf | K (Conic) | A | B | C | D | E | F | G |
|---|---|---|---|---|---|---|---|---|
| S2* | 3.07731E−02 | −2.95843E−04 | 8.66850E−05 | −8.61792E−06 | 1.66615E−06 | −8.09485E−07 | 1.28673E−07 | −6.73603E−09 |
| S3* | 4.09881E−07 | 8.79142E−05 | 2.12451E−04 | −2.10914E−05 | −1.19519E−05 | 3.50507E−06 | −3.44550E−07 | 1.10249E−08 |
| S4* | −4.16818E+00 | −1.81115E−03 | −3.61192E−04 | 2.27437E−04 | −5.09387E−05 | 7.51752E−06 | −6.46713E−07 | 2.30555E−08 |
| S5* | −1.82003E−02 | −3.58840E−03 | −5.79004E−04 | 2.64205E−04 | −2.65087E−05 | −1.46027E−06 | 4.75268E−07 | −2.59717E−08 |
| S12* | −2.97978E+00 | 2.62997E−03 | −4.46229E−03 | 2.94505E−03 | −1.02753E−03 | 2.15544E−04 | −2.75685E−05 | 1.75709E−06 |
| S13* | −9.54086E−01 | 1.00315E−02 | −1.29400E−02 | 8.58062E−03 | −2.94629E−03 | 5.37972E−04 | −4.85656E−05 | 1.71468E−06 |
| S17* | −1.32492E−01 | 2.26655E−03 | −1.97247E−02 | 1.56953E−02 | −6.71443E−03 | 1.64379E−03 | −2.18295E−04 | 1.22310E−05 |
| S18* | 2.67201E−01 | −3.36461E−03 | −8.73920E−03 | 6.03065E−03 | −2.21132E−03 | 4.80935E−04 | −6.47446E−05 | 4.35353E−06 |
| S19* | 3.33662E+00 | 8.03758E−03 | −5.17382E−03 | 2.32053E−03 | −7.53288E−04 | 1.74349E−04 | −2.60335E−05 | 1.60218E−06 |
| S20* | 1.43873E−01 | 3.57355E−03 | −4.29181E−03 | 1.34186E−03 | −2.29464E−04 | 7.06687E−06 | 1.38272E−06 | −3.12967E−07 |

Auto focus and OIS data of the optical system 801 according to the fourth embodiment may be represented as in Table 12 below.

TABLE 12

| Auto-focus data | | |
|---|---|---|
| Object | infinity | 500 mm |
| D1 | 0 | −2.21390 |
| D2 | 0 | 2.21390 |

| Decenter data | |
|---|---|
| Decenter & Bend | Alpha |
| S9 | 45.000 |

| Pitch OIS 1.5 degree decenter data | | | |
|---|---|---|---|
| Basic | Alpha | Beta | Gamma |
| S7 | 1.006 | 0.000 | 0.000 |
| S11 | −1.006 | 0.000 | 0.000 |

| Yaw OIS 1.5 degree decenter data | | | |
|---|---|---|---|
| Basic | Alpha | Beta | Gamma |
| S7 | 0.000 | 0.000 | 2.207 |
| S11 | 0.000 | 2.207 | 0.000 |

Referring to Table 12, in the optical system 801 according to the fourth embodiment, the second one or more lenses 820 (e.g., the third lens 821, the fourth lens 822, and the fifth lens 823) may move away from the reflective member 450 by a predetermined distance when a close shot is taken. Accordingly, the distance between the object-side surface S12 of the third lens 821 and the light exit surface S10 of the reflective member 450 may be increased, and the distance between the upper-side surface S20 of the fifth lens 823 and the optical filter 444 may be decreased. For example, when an image of a subject at infinity (e.g., a long shot) is taken, both D1 and D2 in Table 10 may be 0, and when an image of a subject at a distance of 500 mm (e.g., a close shot) is taken, D1 in Table 10 may be −2.21390, and D2 in Table 10 may be 2.21390. Accordingly, the distance between S10 and S12 is increased, and the distance between S20 and S22 is decreased. In the optical system 801 according to the fourth embodiment, the reflective surface 452 or S9 of the reflective member 450 may form an angle of 45 degrees together with the optical axes OA1 and OA2.

Figure 11A:
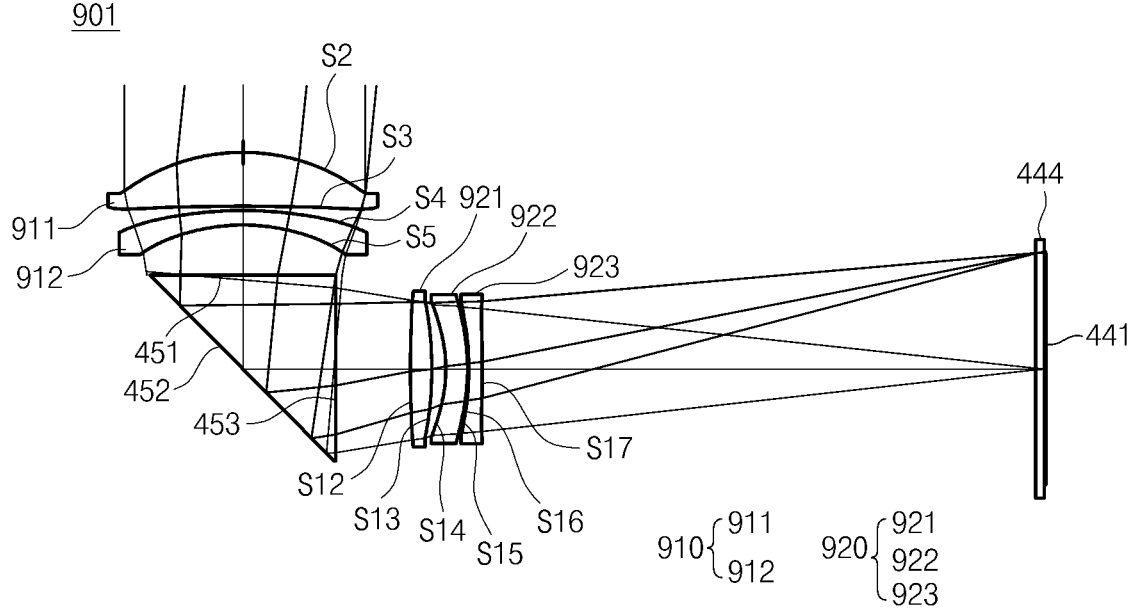
FIG. 11A is a view illustrating an optical system of a camera according to a fifth embodiment.
Figure 11B:
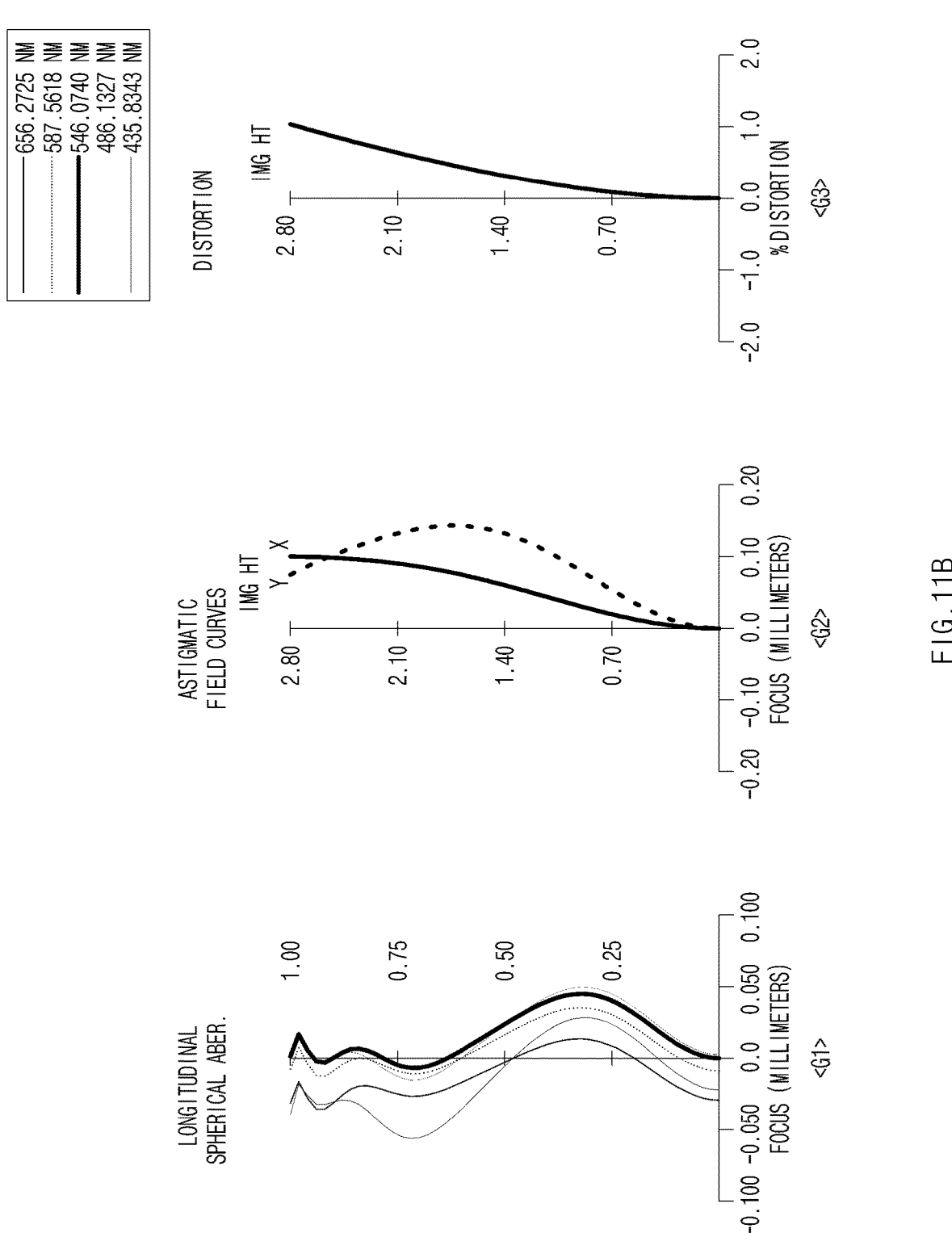
FIG. 11B is an aberration curve of the optical system of the camera according to the fifth embodiment.
Figure 11C:
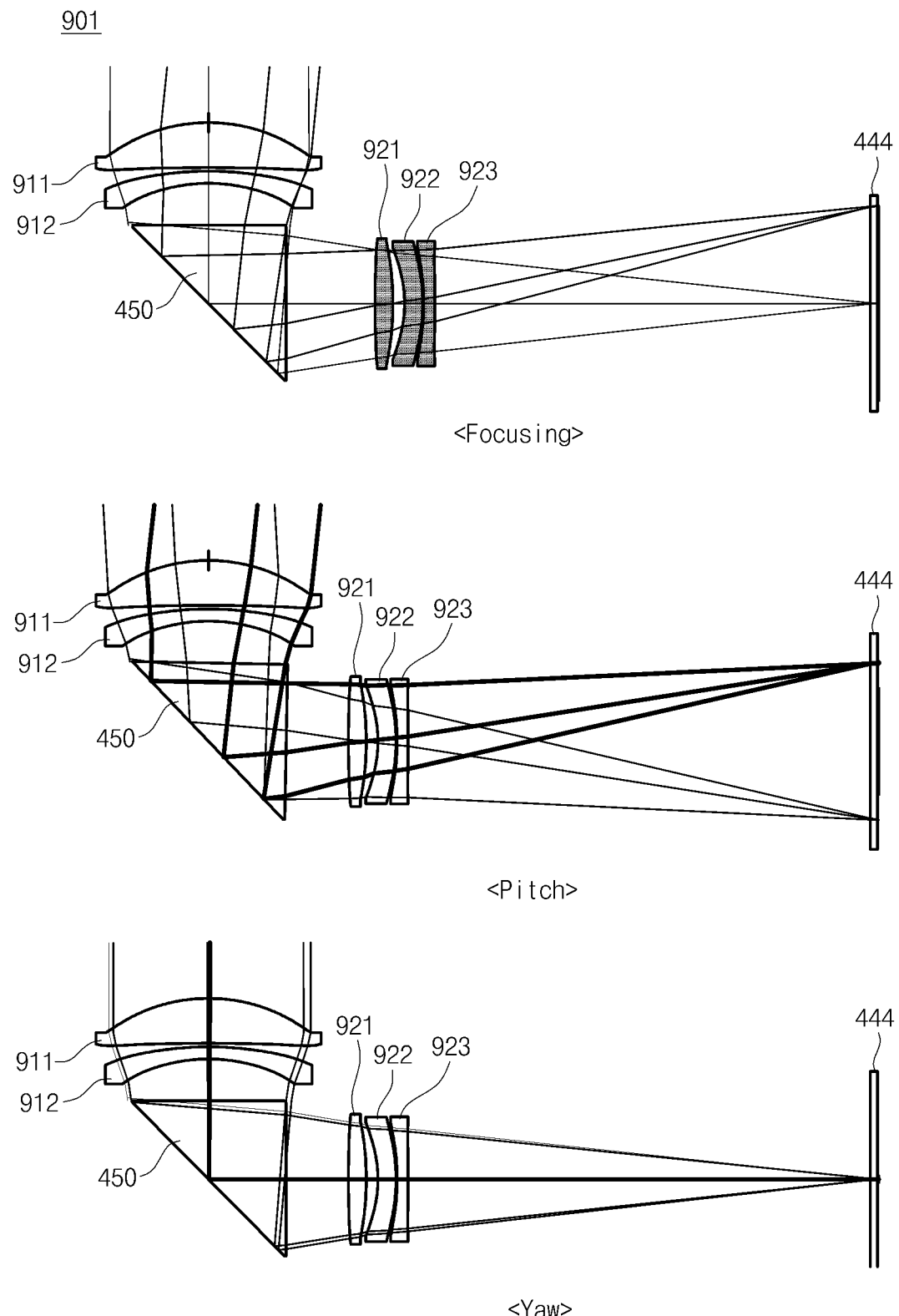
FIG. 11C is a view illustrating the optical system when the camera according to the fifth embodiment performs an auto focus function and an image stabilization function.

FIG. 11A is a view illustrating an optical system of a camera according to a fifth embodiment. FIG. 11B is an aberration curve of the optical system of the camera according to the fifth embodiment. FIG. 11C is a view illustrating the optical system when the camera according to the fifth embodiment performs an auto focus function and an image stabilization function.

Referring to FIG. 11A, the optical system 901 of the camera 400 according to the fifth embodiment may include a first one or more lenses 910, a second one or more lenses 920, a reflective member 450, an image sensor 441, and an optical filter 444. The second one or more lenses 920 may be disposed between the reflective member 450 and the image sensor 441 (or, the optical filter 444).

In the illustrated embodiment, the first one or more lenses 910 may have positive refractive power, and the second one or more lenses 920 may have negative refractive power.

In the illustrated embodiment, the first one or more lenses 910 may include a first lens 911 that is located on an object side and that has positive refractive power and a second lens 912 that is located on an upper side (e.g., on the reflective member 450 side) and that has negative refractive power. In the illustrated embodiment, the first one or more lenses 910 may satisfy Conditional expression 1 and Conditional expression 2. For example, in relation to Conditional expression 1, the ratio Fg1/Ft of the focal length Fg1 of the first one or more lenses 910 to the focal length of the entire optical system 901 may be 0.6845. In relation to Conditional expression 2, the ratio Vd1/Vd2 of the Abbe number of the first lens 911 to the Abbe number of the second lens 912 may be 2.154.

In the illustrated embodiment, the second one or more lenses 920 may include a third lens 921 that is located on an object side (e.g., on the reflective member 450 side) and that has positive refractive power, a fourth lens 922 that is located on an upper side (e.g., on the image sensor 441 side) when compared to the third lens 921 and that has negative refractive power, and a fifth lens 923 that is located on an upper side (e.g., on the image sensor 441 side) when compared to the fourth lens 922 and that has negative refractive power.

In the illustrated embodiment, the third lens 921 of the second one or more lenses 920 may satisfy Conditional expression 3. For example, in relation to Conditional expression 3, t/D of the third lens 921 may be 0.0277.

In the illustrated embodiment, the second one or more lenses 920 may move along a second optical axis OA2 when the auto focus function of the camera 400 is performed. Accordingly, the focus position of the optical system 901 may vary. Unlike in the first embodiment, the third lens 921, the fourth lens 922, and the fifth lens 923 may move together.

In the illustrated embodiment, the second one or more lenses 920 may satisfy Conditional expression 4. An aperture stopper may be included in the second one or more lenses 920, and the ratio Dmax/Da of the maximum effective diameter Dmax of the lenses included in the second one or more lenses 920 to the diameter Da of an aperture may be 1.0244.

Referring to FIG. 11B, <G1> of FIG. 11B is a graph depicting spherical aberration of the optical system 901 according to the fifth embodiment, <G2> of FIG. 11B is a graph depicting astigmatism of the optical system 901 according to the fifth embodiment, and <G3> of FIG. 11B is a graph depicting distortion of the optical system 901 according to the fifth embodiment.

<G1> of FIG. 11B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 11B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 11B is a graph depicting a distortion factor for light having a wavelength of 546.0740 nm. An image taken through the optical system 901 according to the fifth embodiment may be somewhat distorted at a point out of the optical axis and may provide good optical characteristics with a distortion factor of less than about 2%.

Referring to FIG. 11C, the camera 400 may perform the auto focus function by moving the second one or more lenses 920. The second one or more lenses 920 (e.g., the third lens 921, the fourth lens 922, and the fifth lens 923) having negative refractive power may move to an upper side when a close shot is taken and may move to an object side when a long shot is taken. For example, the second one or more lenses 920 may move toward the image sensor when a close shot is taken and may move toward a light exit surface 453 of the reflective member 450 when a long shot is taken.

Referring to FIG. 1C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R1 perpendicular to a first optical axis OA1 and the second optical axis OA2. The reflective member 450 may perform a yaw operation of rotating about a second rotational axis R2 parallel to the first optical axis OA1.

Table 13 shows data of the optical system 901 according to the fifth

TABLE 13

| Surf | Note | Radius of curvature (mm) | Thickness/ Distance (mm) | Nd Refractive index | Vd Abbe number | H-Ape |
|------|------|------|------|------|------|------|
| OBJ | object | infinity | infinity | | | |
| 1 | dummy | infinity | 0.00000 | | | 3.06557 |
| S2* | first lens | 4.98459 | 1.28700 | 1.54397 | 55.930 | 2.96500 |
| S3* | | 71.82191 | 0.10265 | | | 2.88185 |
| S4* | second | 9.15271 | 0.35016 | 1.61443 | 25.960 | 2.72244 |
| S5* | lens | 4.88461 | 0.73752 | | | 2.48537 |
| 6 | dummy | infinity | 0.46000 | | | 2.48062 |
| 7 | dummy | infinity | 0.00000 | | | 2.40434 |
| S8 | light incident surface | infinity | 2.25000 | 1.83400 | 37.340 | 3.67696 |
| S9 | reflective surface | infinity | −2.25000 | 1.83400 | 37.340 | 4.20119 |
| S10 | light exit surface | infinity | −1.80000 | | | 3.37380 |
| 11 | dummy | infinity | D1 | | | 1.70478 |
| S12* | third lens | −32.82811 | −0.51759 | 1.67075 | 19.240 | 1.69627 |
| S13* (sto) | | 9.09289 | −0.33932 | | | 1.65584 |
| S14* | fourth | 3.38676 | −0.52509 | 1.63916 | 23.520 | 1.61356 |
| S15* | lens | 4.90505 | −0.03000 | | | 1.61410 |
| S16* | fifth lens | 7.06888 | −0.3195 | 1.63916 | 23.520 | 1.60807 |
| S17* | | 45.15098 | −13.38769 | | | 1.62535 |
| 18 | dummy | infinity | D2 | | | 2.77325 |
| S19 | optical | infinity | −0.21 | 1.51680 | 64.170 | 2.77325 |
| S20 | filter | infinity | −0.04007 | | | 2.80573 |
| IMG | image sensor | infinity | 0.00000 | | | 2.81612 |

The positive thickness/distance in Table 13 means that it is located on the first optical axis OA1, and the negative thickness/distance means that it is located on the second optical axis OA2. In Table 13, "*" represents that an optical surface is formed of an aspheric surface. In Table 13, IMG means an image plane of the image sensor 441. In Table 13, S2 means an object-side surface of the first lens 911 included in the first one or more lenses 910, and S3 means an upper-side surface of the first lens 911. S4 means an object-side surface of the second lens 912 included in the first one or more lenses 910, and S5 means an upper-side surface of the second lens 912.

In Table 13, S12 means an object-side surface of the third lens 921 included in the second one or more lenses 920, and S13 (sto) means an upper-side surface of the third lens 921 and means that an aperture is formed in the upper-side surface of the third lens 921.

In Table 13, S14 means an object-side surface of the fourth lens 922 included in the second one or more lenses 920, and S15 means an upper-side surface of the fourth lens 922. S16 means an object-side surface of the fifth lens 923 included in the second one or more lenses 920, and S17 means an upper-side surface of the fifth lens 923.

In Table 13, S8, S9, and S10 mean a light incident surface 451, a reflective surface 452, and the light exit surface 453 included in the reflective member 450 (e.g., a prism).

In Table 13, S19 and S20 mean an object-side surface and an upper-side surface of the optical filter.

Aspheric coefficients of the lenses according to the fifth embodiment may be represented as in Table 14 below. The aspheric coefficients may be calculated based on Equation 1 described above.

TABLE 15-continued

| Pitch OIS 1.5 degree decenter data | | | |
|---|---|---|---|
| Basic | Alpha | Beta | Gamma |
| S7 | 1.026 | 0.000 | 0.000 |
| S11 | −1.026 | 0.000 | 0.000 |

| Yaw OIS 1.5 degree decenter data | | | |
|---|---|---|---|
| Basic | Alpha | Beta | Gamma |
| S7 | 0.000 | 0.000 | 1.095 |
| S11 | 0.000 | 1.095 | 0.000 |

Referring to Table 15, in the optical system 901 according to the fifth embodiment, the second one or more lenses 920 (e.g., the third lens 921, the fourth lens 922, and the fifth lens 923) may move away from the reflective member 450 by a predetermined distance when a close shot is taken. Accordingly, the distance between the object-side surface S12 of the third lens 921 and the light exit surface S10 of the reflective member 450 may be increased, and the distance between the upper-side surface S17 of the fifth lens 923 and the optical filter 444 may be decreased. For example, when an image of a subject at infinity (e.g., a long shot) is taken, both D1 and D2 in Table 13 may be 0, and when an image of a subject at a distance of 500 mm (e.g., a close shot) is taken, D1 in Table 13 may be −0.77240, and D2 in Table 13 may be 0.77240. Accordingly, the distance between S10 and S12 is increased, and the distance between S17 and S19 is decreased. In the optical system 901 according to the fifth embodiment, the reflective surface 452 or S9 of the reflec-

TABLE 14

| Surf | K (Conic) | A | B | C | D | E | F | G |
|---|---|---|---|---|---|---|---|---|
| S2* | 2.59905E−01 | −1.36886E−04 | 8.57487E−05 | −7.79027E−06 | 8.80293E−07 | −7.99472E−07 | 1.34069E−07 | −7.05296E−09 |
| S3* | 1.13057E+01 | 1.75978E−04 | 2.21275E−04 | −2.66777E−05 | −1.14452E−05 | 3.47785E−06 | −3.46750E−07 | 1.13749E−08 |
| S4* | −8.32077E−01 | −1.41810E−03 | −3.10494E−04 | 2.28309E−04 | −5.03485E−05 | 7.36475E−06 | −6.36596E−07 | 2.28669E−08 |
| S5* | 5.44822E−01 | −1.91322E−03 | −3.36759E−04 | 2.27713E−04 | −2.33161E−05 | −1.28035E−06 | 4.48434E−07 | −2.63677E−08 |
| S12* | −6.22057E−01 | 2.33636E−03 | −4.68294E−03 | 3.00961E−03 | −1.02684E−03 | 2.14223E−04 | −2.97596E−05 | 1.66458E−06 |
| S13* | −2.42770E+00 | 1.17574E−02 | −1.36032E−02 | 8.87662E−03 | −3.07482E−03 | 5.63742E−04 | −5.27796E−05 | 1.49462E−06 |
| S14* | −3.11957E−03 | 1.64506E−03 | −2.00208E−02 | 1.57128E−02 | −6.79140E−03 | 1.69076E−03 | −2.28307E−04 | 1.26958E−05 |
| S15* | 3.32345E+00 | −4.02912E−03 | −8.19625E−03 | 4.71056E−03 | −1.47414E−03 | 2.51848E−04 | −1.90874E−05 | −8.00446E−07 |
| S16* | 6.11250E−01 | 6.90581E−03 | −3.23745E−03 | −3.16349E−04 | 6.77945E−04 | −3.17293E−04 | 6.19841E−05 | −3.24973E−06 |
| S17* | 2.03870E+00 | 7.91488E−04 | −1.67759E−03 | −2.99502E−04 | 4.15184E−04 | −2.39757E−04 | 5.48942E−05 | −2.56285E−06 |

Auto focus and OIS data of the optical system 901 according to the fifth embodiment may be represented as in Table 15 below.

TABLE 15

| Auto-focus data | | |
|---|---|---|
| Object | infinity | 500 mm |
| D1 | 0 | −0.77240 |
| D2 | 0 | 0.77240 |

| Decenter data | |
|---|---|
| Decenter & Bend | Alpha |
| S9 | 45.000 | tive member 450 may form an angle of 45 degrees together with the optical axes OA1 and OA2.

Figure 12A:
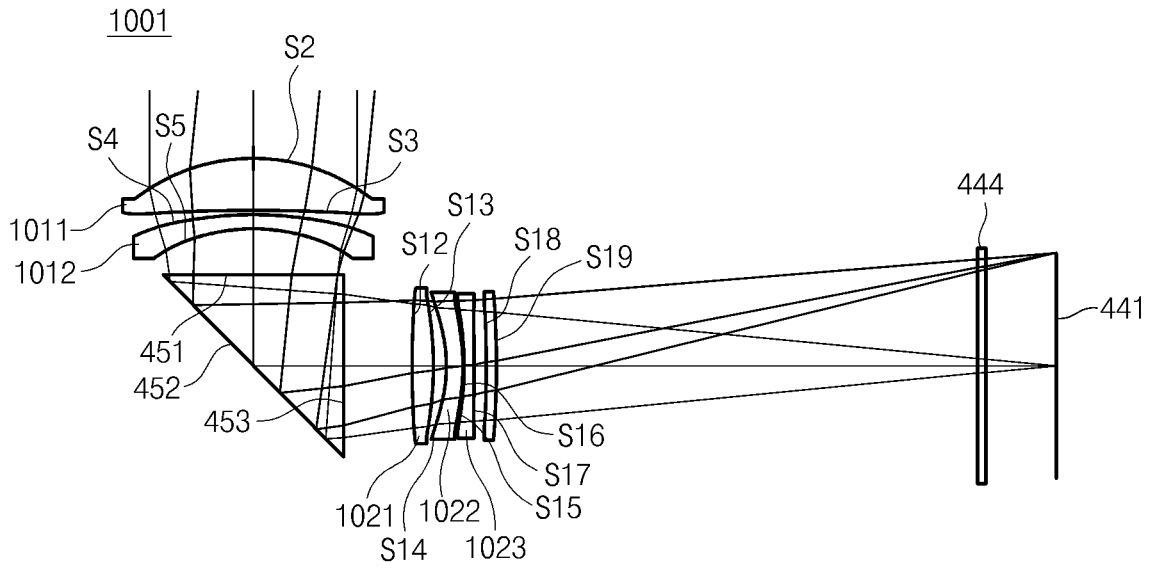
FIG. 12A is a view illustrating an optical system of a camera according to a sixth embodiment.
Figure 12B:
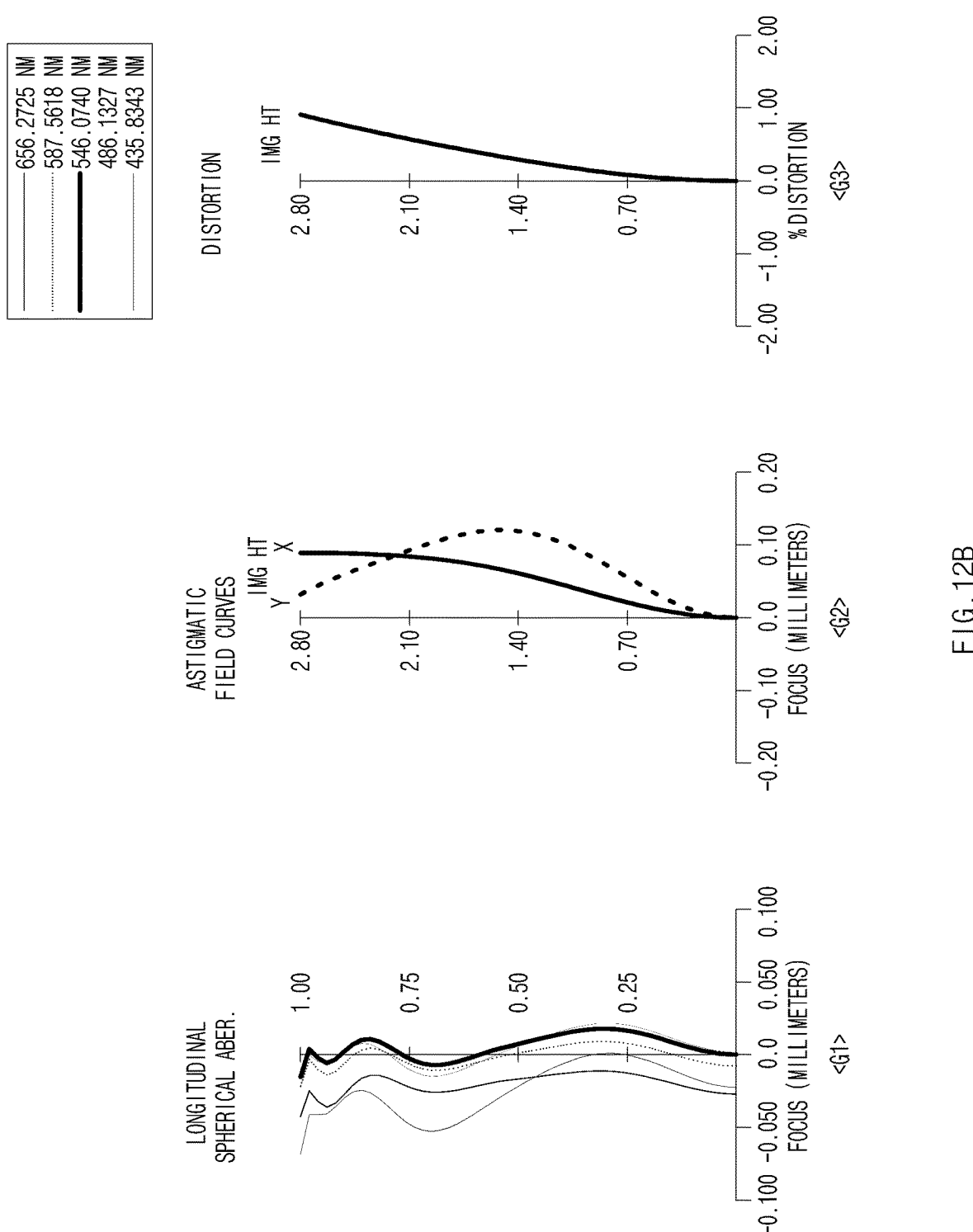
FIG. 12B is an aberration curve of the optical system of the camera according to the sixth embodiment.
Figure 12C:
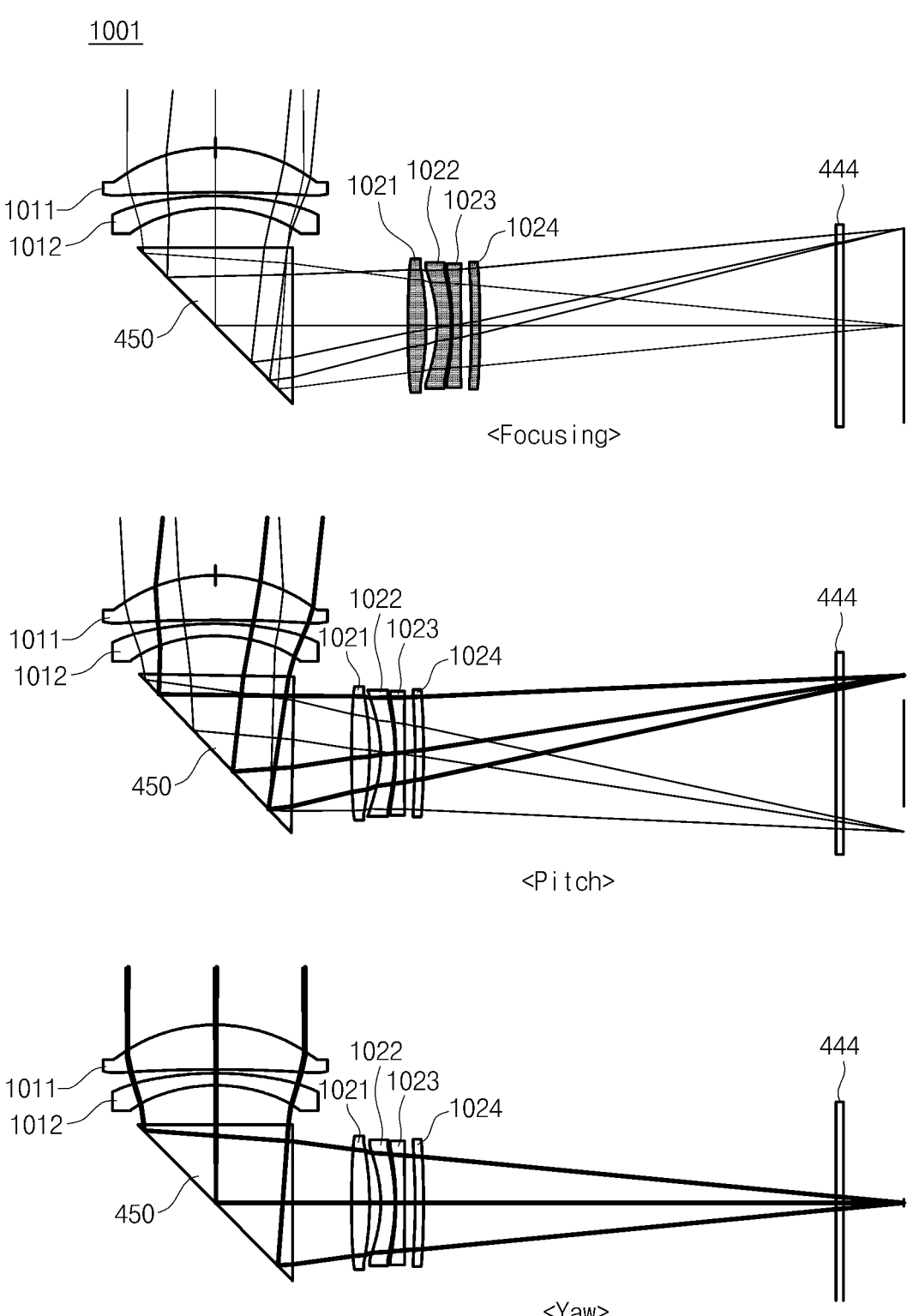
FIG. 12C is a view illustrating the optical system when the camera according to the sixth embodiment performs an auto focus function and an image stabilization function.

FIG. 12A is a view illustrating an optical system of a camera according to a sixth embodiment. FIG. 12B is an aberration curve of the optical system of the camera according to the sixth embodiment. FIG. 12C is a view illustrating the optical system when the camera according to the sixth embodiment performs an auto focus function and an image stabilization function.

Referring to FIG. 12A, the optical system 1001 of the camera 400 according to the sixth embodiment may include a first one or more lenses 1010, a second one or more lenses 1020, a reflective member 450, an image sensor 441, and an optical filter 444. The second one or more lenses 1020 may be disposed between the reflective member 450 and the image sensor 441 (or, the optical filter 444).

In the illustrated embodiment, the first one or more lenses 1010 may have positive refractive power, and the second one or more lenses 1020 may have negative refractive power.

In the illustrated embodiment, the first one or more lenses 1010 may include a first lens 1011 that is located on an object side and that has positive refractive power and a second lens 1012 that is located on an upper side (e.g., on the reflective member 450 side) and that has negative refractive power. In the illustrated embodiment, the first one or more lenses 1010 may satisfy Conditional expression 1 and Conditional expression 2. For example, in relation to Conditional expression 1, the ratio Fg1/Ft of the focal length Fg1 of the first one or more lenses 1010 to the focal length of the entire optical system 1001 may be 0.722. In relation to Conditional expression 2, the ratio Vd1/Vd2 of the Abbe number of the first lens 1011 to the Abbe number of the second lens 1012 may be 2.154.

In the illustrated embodiment, the second one or more lenses 1020 may include a third lens 1021 that is located on an object side (e.g., on the reflective member 450 side) and that has positive refractive power, a fourth lens 1022 that is located on an upper side (e.g., on the image sensor 441 side) when compared to the third lens 1021 and that has negative refractive power, a fifth lens 1023 that is located on an upper side (e.g., on the image sensor 441 side) when compared to the fourth lens 1022 and that has negative refractive power, and a sixth lens 1024 that is located on an upper side (e.g., on the image sensor 441 side) when compared to the fifth lens 1023 and that has positive refractive power.

In the illustrated embodiment, the third lens 1021 of the second one or more lenses 1020 may satisfy Conditional expression 3. For example, in relation to Conditional expression 3, t/D of the third lens 1021 may be 0.0313.

In the illustrated embodiment, the second one or more lenses 1020 may move along a second optical axis OA2 when the auto focus function of the camera 400 is performed. Accordingly, the focus position of the optical system 1001 may vary. Unlike in the first embodiment, the third lens 1021, the fourth lens 1022, the fifth lens 1023, and the sixth lens 1024 may move together.

In the illustrated embodiment, the second one or more lenses 1020 may satisfy Conditional expression 4. An aperture stopper may be included in the first one or more lenses 1010, and the ratio Dmax/Da of the maximum effective diameter Dmax of the lenses included in the second one or more lenses 1020 to the diameter Da of an aperture may be 0.5859.

Referring to FIG. 12B, <G1> of FIG. 12B is a graph depicting spherical aberration of the optical system 1001 according to the sixth embodiment, <G2> of FIG. 12B is a graph depicting astigmatism of the optical system 1001 according to the sixth embodiment, and <G3> of FIG. 12B is a graph depicting distortion of the optical system 1001 according to the sixth embodiment.

<G1> of FIG. 12B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 12B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 12B is a graph depicting a distortion factor for light having a wavelength of 546.0740 nm. An image taken through the optical system 1001 according to the sixth embodiment may be somewhat distorted at a point out of the optical axis and may provide good optical characteristics with a distortion factor of less than about 2%.

Referring to FIG. 12C, the camera 400 may perform the auto focus function by moving the second one or more lenses 1020. The second one or more lenses 1020 (e.g., the third lens 1021, the fourth lens 1022, the fifth lens 1023, and the sixth lens 1024) having negative refractive power may move to an upper side when a close shot is taken and may move to an object side when a long shot is taken. For example, the second one or more lenses 1020 may move toward the image sensor 441 when a close shot is taken and may move toward a light exit surface of the reflective member 450 when a long shot is taken.

Referring to FIG. 12C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis R1 perpendicular to a first optical axis OA1 and the second optical axis OA2. The reflective member 450 may perform a yaw operation of rotating about a second rotational axis R2 parallel to the first optical axis OA1.

Table 16 shows data of the optical system 1001 according to the sixth

TABLE 16

| Surf | Note | Radius of curvature (mm) | Thickness/ Distance (mm) | Nd Refractive index | Vd 아베수 | H-Ape |
|------|------|--------------------------|--------------------------|---------------------|----------|--------|
| OBJ | object | infinity | infinity | | | |
| 1 | dummy | infinity | 0.00000 | | | 2.93969 |
| S2* (sto) | first lens | 4.93272 | 1.28752 | 1.54397 | 55.930 | 2.93969 |
| S3* | | 54.67856 | 0.10271 | | | 2.84955 |
| S4* | second | 8.91134 | 0.35000 | 1.61443 | 25.960 | 2.69877 |
| S5* | lens | 4.72615 | 0.73651 | | | 2.46046 |
| 6 | dummy | infinity | 0.40000 | | | 2.45796 |
| 7 | dummy | infinity | 0.00000 | | | 2.39648 |
| S8 | light incident surface | infinity | 2.25000 | 1.83400 | 37.340 | 3.18904 |
| S9 | reflective surface | infinity | −2.25000 | 1.83400 | 37.340 | 3.69401 |

TABLE 16-continued

| Surf | Note | Radius of curvature (mm) | Thickness/ Distance (mm) | Nd Refractive index | Vd 아베수 | H-Ape |
|---|---|---|---|---|---|---|
| S10 | light exit surface | infinity | −1.71000 | | | 2.72641 |
| 11 | dummy | infinity | D1 | | | 1.76069 |
| S12* | third lens | −28.91313 | −0.52758 | 1.67075 | 19.240 | 1.75103 |
| S13* | | 9.76536 | −0.32344 | | | 1.71011 |
| S14* | fourth | 3.65121 | −0.41165 | 1.63916 | 23.520 | 1.64979 |
| S15* | lens | 5.38371 | −0.03000 | | | 1.61215 |
| S16* | fifth lens | 8.24772 | −0.25031 | 1.63916 | 23.520 | 1.60807 |
| S17* | | 69.86409 | −0.30622 | | | 1.62082 |
| S18* | sixth lens | 24.17136 | −0.25 | 1.54397 | 55.930 | 1.64088 |
| S19* | | 24.15255 | −12 | | | 1.65994 |
| 20 | dummy | infinity | D2 | | | 2.63379 |
| S21 | optical | infinity | −0.21000 | 1.51680 | 64.170 | 2.63379 |
| S22 | filter | infinity | −1.76075 | | | 2.64494 |
| IMG | image sensor | infinity | 0 | | | 2.80289 |

The positive thickness/distance in Table 16 means that it is located on the first optical axis, and the negative thickness/distance means that it is located on the second optical axis. In Table 16, "*" represents that an optical surface is formed of an aspheric surface. In Table 16, IMG means an image Aspheric coefficients of the lenses according to the sixth embodiment may be represented as in Table 17 below. The aspheric coefficients may be calculated based on Equation 1 described above.

TABLE 17

| Surf | K (Conic) | A | B | C | D | E | F | G |
|---|---|---|---|---|---|---|---|---|
| S2* | 2.60797E−01 | −1.33600E−04 | 8.61246E−05 | −7.83407E−06 | 8.77362E−07 | −7.99487E−07 | 1.34040E−07 | −7.04208E−09 |
| S3* | 5.74536E+00 | 1.69686E−04 | 2.20832E−04 | −2.65676E−05 | −1.14340E−05 | 3.47706E−06 | −3.46781E−07 | 1.13930E−08 |
| S4* | −7.98018E−01 | −1.41182E−03 | −3.08483E−04 | 2.28214E−04 | −5.03613E−05 | 7.36353E−06 | −6.36763E−07 | 2.29579E−08 |
| S5* | 5.38902E−01 | −1.92349E−03 | −3.42083E−04 | 2.28256E−04 | −2.32943E−05 | −1.27504E−06 | 4.49336E−07 | −2.66253E−08 |
| S12* | −5.33875E+00 | 2.32155E−03 | −4.70249E−03 | 3.01117E−03 | −1.02736E−03 | 2.14500E−04 | −2.95427E−05 | 1.66443E−06 |
| S13* | −2.45962E+00 | 1.17514E−02 | −1.35986E−02 | 8.87297E−03 | −3.07469E−03 | 5.63804E−04 | −5.28376E−05 | 1.54063E−06 |
| S14* | 2.89213E−03 | 1.67025E−03 | −2.00248E−02 | 1.57177E−02 | −6.79149E−03 | 1.69080E−03 | −2.28408E−04 | 1.26437E−05 |
| S15* | 3.31918E+00 | −4.04043E−03 | −8.18264E−03 | 4.70615E−03 | −1.47150E−03 | 2.52354E−04 | −1.89094E−05 | −7.20725E−07 |
| S16* | 4.96330E−01 | 6.88933E−03 | −3.28107E−03 | −3.11746E−04 | 6.75342E−04 | −3.17094E−04 | 6.19110E−05 | −3.16396E−06 |
| S17* | −8.03267E−02 | 8.32967E−04 | −1.61405E−03 | −2.88250E−04 | 4.18006E−04 | −2.38555E−04 | 5.54894E−05 | −2.84734E−06 |
| S18* | 0.00000E+00 | 2.09531E−05 | 1.44406E−06 | 2.89316E−06 | −9.18972E−07 | 0.00000E+00 | 0.00000E+00 | 0.00000E+00 |
| S19* | 0.00000E+00 | 6.22760E−06 | 1.11927E−05 | −1.01207E−06 | −3.99946E−07 | 0.00000E+00 | 0.00000E+00 | 0.00000E+00 | plane of the image sensor. In Table 16, S2 (sto) means an object-side surface of the first lens 1011 included in the first one or more lenses 1010 and means that an aperture is formed in the object-side surface of the first lens 1011. S3 means an upper-side surface of the first lens 1011. S4 means an object-side surface of the second lens 1012 included in the first one or more lenses 1010, and S5 means an upper-side surface of the second lens 1012.

In Table 16, S12 means an object-side surface of the third lens 1021 included in the second one or more lenses 1020, and S13 means an upper-side surface of the third lens 1021.

In Table 16, S14 means an object-side surface of the fourth lens 1022 included in the second one or more lenses 1020, and S15 means an upper-side surface of the fourth lens 1022. S16 means an object-side surface of the fifth lens 1023 included in the second one or more lenses 1020, and S17 means an upper-side surface of the fifth lens 1023. S18 means an object-side surface of the sixth lens 1024 included in the second one or more lenses 1020, and S19 means an upper-side surface of the sixth lens 1024.

In Table 16, S8, S9, and S10 mean a light incident surface 451, a reflective surface 452, and the light exit surface 453 included in the reflective member 450 (e.g., a prism).

In Table 16, S21 and S22 mean an object-side surface and an upper-side surface of the optical filter.

Auto focus and OIS data of the optical system 1001 according to the sixth embodiment may be represented as in Table 18 below.

TABLE 18

| Auto-focus data | | |
|---|---|---|
| Object | infinity | 500 mm |
| D1 | 0 | −1.64020 |
| D2 | 0 | 1.64020 |

| Decenter data | |
|---|---|
| Decenter & Bend | Alpha |
| S9 | 45.000 |

| Pitch OIS 1.5 degree decenter data | | | |
|---|---|---|---|
| Basic | Alpha | Beta | Gamma |
| S7 | 1.018 | 0.000 | 0.000 |
| S11 | −1.018 | 0.000 | 0.000 |

Yaw OIS 1.5 degree decenter data

TABLE 18-continued

| Basic | Alpha | Beta | Gamma |
|-------|-------|------|-------|
| S7 | 0.000 | 0.000 | 1.897 |
| S11 | 0.000 | 1.897 | 0.000 |

Referring to Table 18, in the optical system 1001 according to the sixth embodiment, the second one or more lenses 1020 (e.g., the third lens 1021, the fourth lens 1022, the fifth lens 1023, and the sixth lens 1024) may move away from the reflective member 450 by a predetermined distance when a close shot is taken. Accordingly, the distance between the object-side surface S12 of the third lens 1021 and the light exit surface S10 of the reflective member 450 may be increased, and the distance between the upper-side surface S19 of the sixth lens 1024 and the optical filter 444 may be decreased. For example, when an image of a subject at infinity (e.g., a long shot) is taken, both D1 and D2 in Table 13 may be 0, and when an image of a subject at a distance of 500 mm (e.g., a close shot) is taken, D1 in Table 16 may be −1.64020, and D2 in Table 16 may be 1.64020. Accordingly, the distance between S10 and S12 is increased, and the distance between S19 and S21 is decreased. In the optical system 1001 according to the sixth embodiment, the reflective surface 452 or S9 of the reflective member 450 may form an angle of 45 degrees together with the optical axes OA1 and OA2.

According to certain embodiments, a camera (e.g., the camera 400 of FIG. 4) may include an optical system having a structure and/or optical characteristics (or optical conditions) different from those of the optical systems 501, 601, 701, 801, 901, and 1001 according to the first to sixth embodiments described above. Hereinafter, optical systems of other embodiments will be described.

Figure 13A:
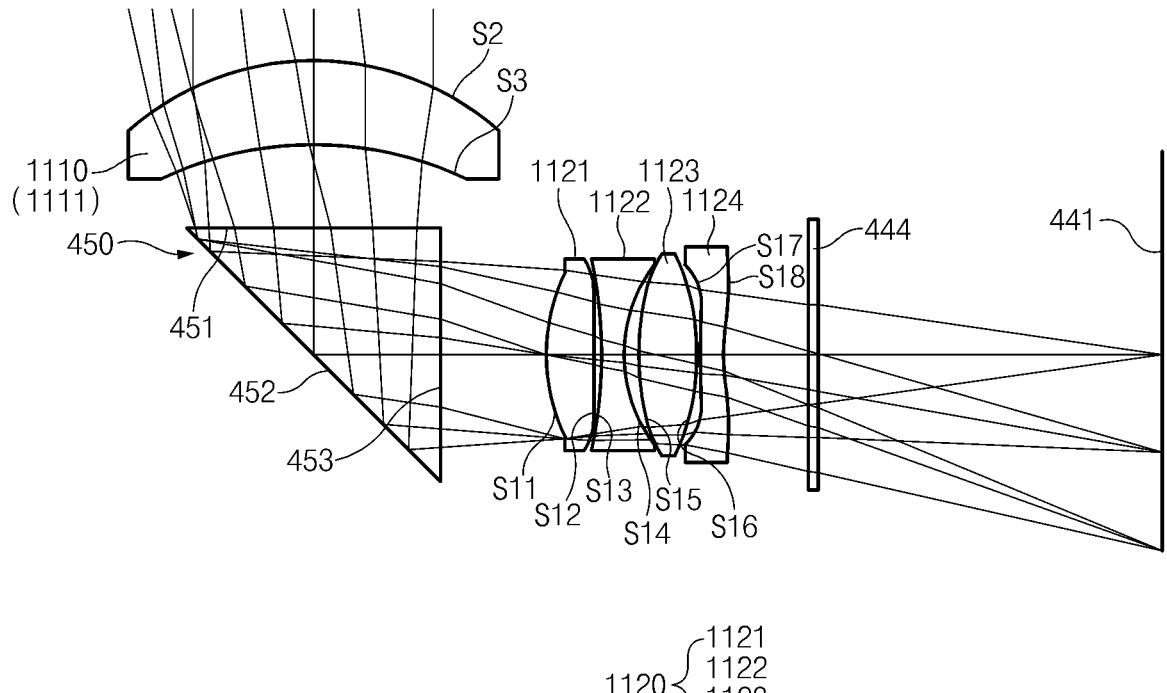
FIG. 13A is a view illustrating an optical system of a camera according to a seventh embodiment.
Figure 13B:
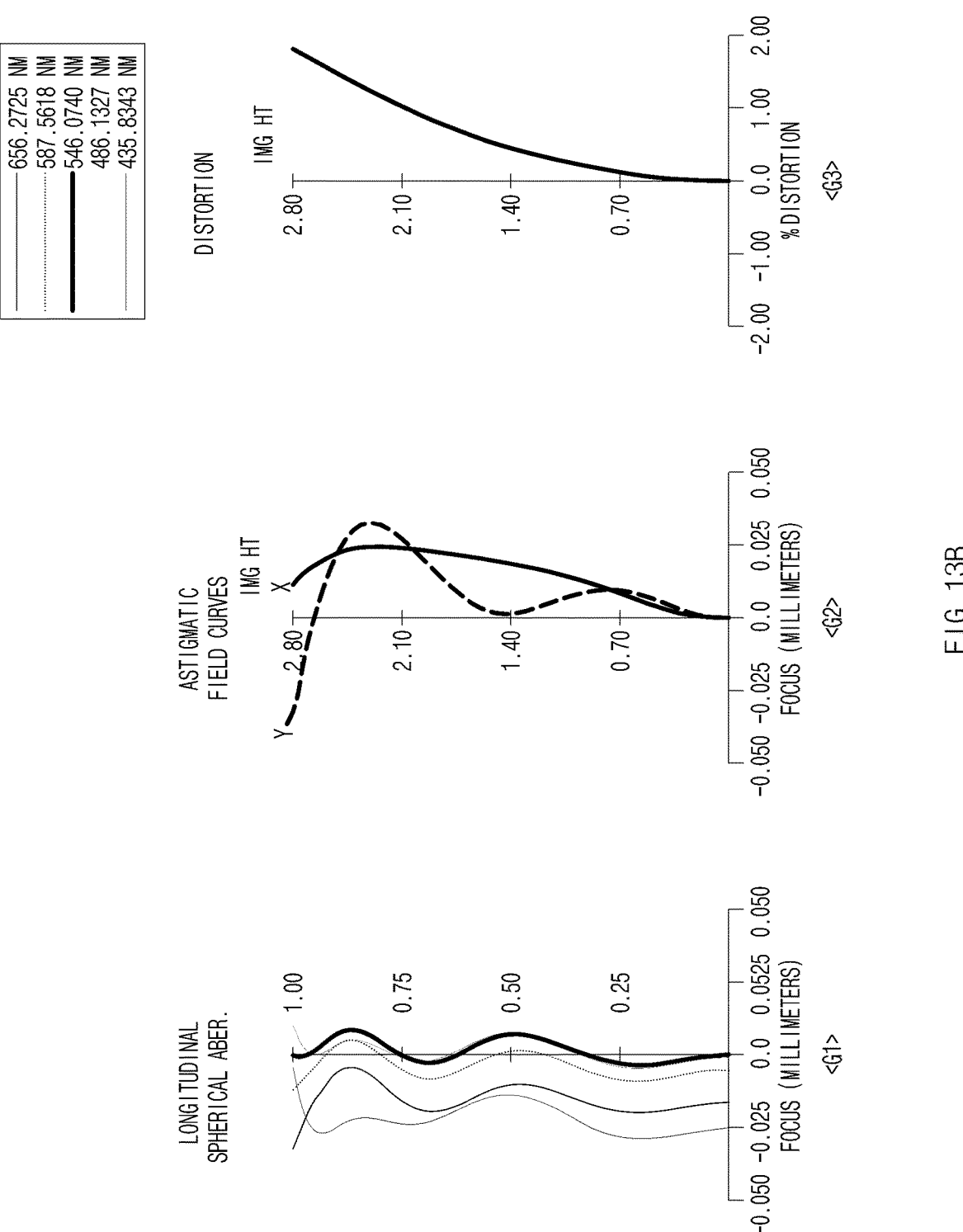
FIG. 13B is an aberration curve of the optical system of the camera according to the seventh embodiment.
Figure 13C:
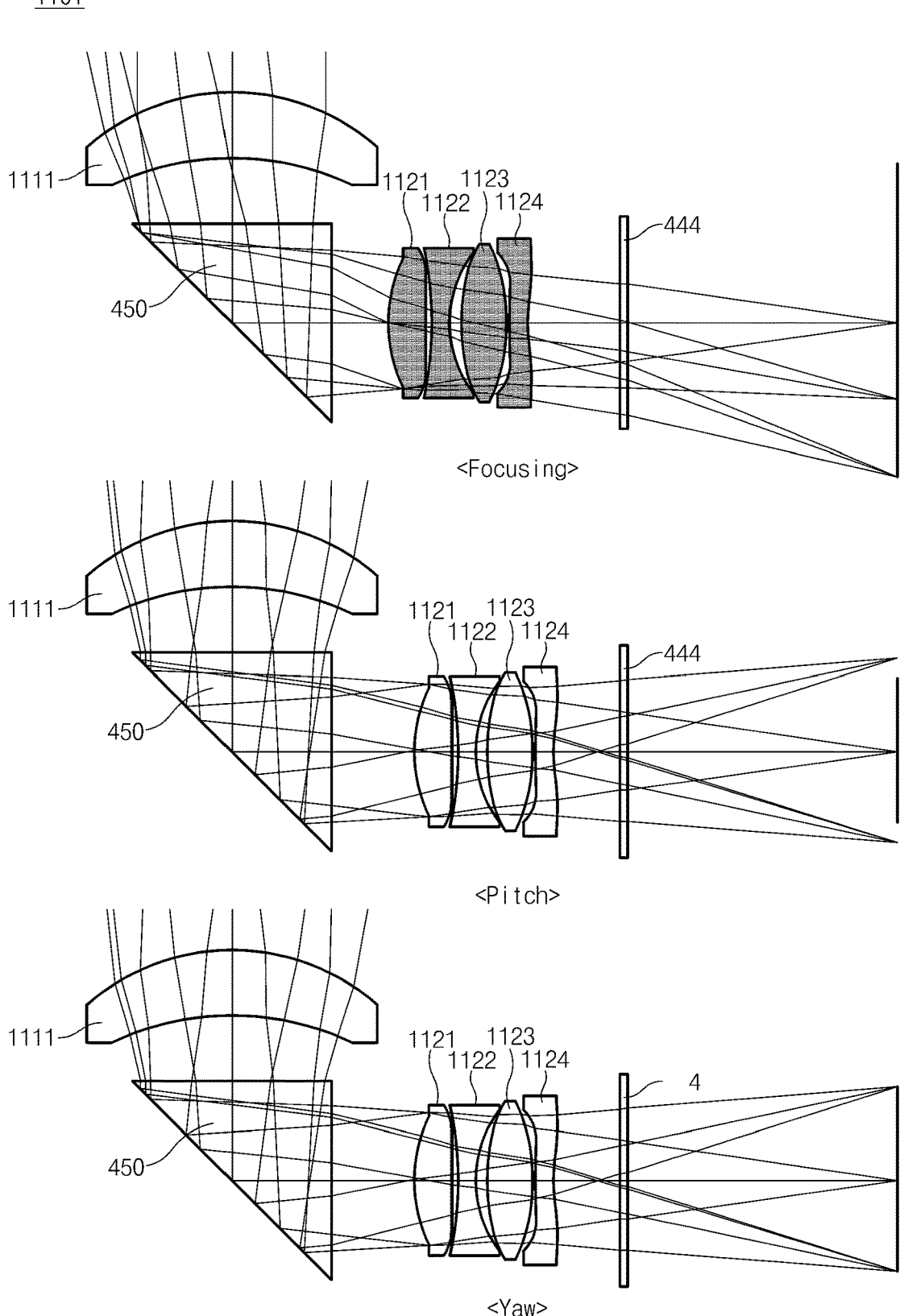
FIG. 13C is a view illustrating the optical system when the camera according to the seventh embodiment performs an auto focus function and an image stabilization function.

FIG. 13A is a view illustrating an optical system of a camera according to a seventh embodiment. FIG. 13B is an aberration curve of the optical system of the camera according to the seventh embodiment. FIG. 13C is a view illustrating the optical system when the camera according to the seventh embodiment performs an auto focus function and an image stabilization function.

Referring to FIG. 13A, the optical system 1101 of the camera according to the seventh embodiment may include a first one or more lenses 1110, a second one or more lenses 1120, a reflective member 450 (e.g., the reflective member 450 of FIG. 5), an image sensor 441 (e.g., the image sensor 441 of FIG. 5), and an optical filter (e.g., the optical filter 444 of FIG. 5).

In an embodiment, the first one or more lenses 1110 may include a first lens 1111 having positive refractive power. For example, unlike the optical systems 501, 601, 701, 801, 901, and 1001 of the first to sixth embodiments, the optical system 1101 according to the seventh embodiment may include the first one or more lenses 1110 constituted by one lens.

In an embodiment, the second one or more lenses 1120 may have positive refractive power. The second one or more lenses 1120 may be disposed between the reflective member 450 and the image sensor 441 (or, the optical filter 444). The second one or more lenses 1120 may include a second lens 1121, a third lens 1122, a fourth lens 1123, and a fifth lens 1124 sequentially disposed from the reflective member 450 side. For example, the second one or more lenses 1120 may be configured such that the second lens 1121 is disposed closest to the reflective member 450, the fifth lens 1124 is disposed closest to the image sensor 441, and the third lend

1122 and the fourth lens 1123 are disposed between the second lens 1121 and the fifth lens 1124.

The second one or more lenses 1120 of the optical system 1101 according to the seventh embodiment may include the second lens 1121 having positive refractive power, the third lens 1122 having negative refractive power, the fourth lens 1123 having positive refractive power, and the fifth lens 1124 having negative refractive power.

In certain embodiments, the camera 400 may be configured to adjust a focus position by moving the second one or more lenses 1120 or at least a part of the lenses included in the second one or more lenses 1120 in the direction of a second optical axis (e.g., the second optical axis OA2 of FIGS. 5 and 6). For example, the second one or more lenses 1120 may be entirely moved, or the separate lenses included in the second one or more lenses 1120 may be moved.

In an embodiment, the first one or more lenses 1110 may be configured to satisfy Conditional expression 5 below.

$$1 \le Fg1/Ft \le 5 \qquad \text{[Conditional expression 5]}$$

Here, Fg1 may be defined as the focal length of the first lens 1111 included in the first one or more lenses 1110, and Ft may be defined as the focal length (e.g., the composite focal length) of the entire optical system 1101. According to Conditional expression 5, as the refractive power of the first one or more lenses 1111 with respect to the refractive power of the entire optical system 110 is limited to a predetermined range, the sizes of the reflective member 450 and another one or more lenses (e.g., the second one or more lenses 1120) disposed on the second optical axis OA2 may be reduced. In addition, a movement distance of a lens or one or more lenses (e.g., the second one or more lenses 1120) that moves to adjust a focus may be limited within a specified range Conditional expression 5 is related to Conditional expression 1 described above, and it may be understood that the upper and lower limits are set to be different from those in Conditional expression 1 as the structure of the optical system 1101 is changed.

In an embodiment, the second one or more lenses 1120 may be configured such that the lens 1121 closest to an object side (e.g., the reflective member 450) satisfies a predetermined optical condition. For example, among the lenses included in the second one or more lenses 1120, the second lens 1121 closest to the reflective member 450 may be configured such that an object-side lens surface S11 (e.g., a lens surface facing the reflective member 450) satisfies Conditional expression 6 below.

$$t/D \le 0.35 \qquad \text{[Conditional expression 6]}$$

Here, "D" may be defined as the effective diameter of the second lens 1121. "t" may be defined as the maximum height difference of the object-side lens surface S11 of the second lens 1121. For example, the second lens 1121 may have positive refractive power, and the object-side lens surface S11 may be provided in a convex shape. For example, "t" may be defined as the maximum value of a height difference measured in the direction of the second optical axis OA2 from the periphery of the object-side lens surface S11 of the second lens 1121 to the apex (or, the center point) of the object-side lens surface S11 of the second lens 1121. Conditional expression 6 is related to Conditional expression 3 described above, and it may be understood that the upper and lower limits are set to be different from those in Conditional expression 3 as the structure of the optical system 1101 is changed.

In an embodiment, the optical system 1101 may include an aperture disposed on the second optical axis OA2, and the second one or more lenses 1120 may be configured to satisfy Conditional expression 7 below.

$$0.5 \le D\text{max}/Da \le 1.3 \qquad \text{[Conditional expression 7]}$$

Here, "Dmax" may be defined as the maximum effective diameter of the lenses (e.g., the second lens 1121, the third lens 1122, the fourth lens 1123, and the fifth lens 1124) of the second one or more lenses 1120 disposed on the second optical axis OA2, and "Da" may be defined as the diameter of the aperture. Conditional expression 7 is related to Conditional expression 4 described above, and it may be understood that the upper limit is set to be different from that in Conditional expression 4 as the structure of the optical system 1101 is changed.

The optical system 1101 according to the seventh embodiment may satisfy Conditional expression 5, Conditional expression 6, and/or Conditional expression 7. For example, in the optical system 1101 according to the seventh embodiment, the optical condition of the first lens 1111 calculated based on Conditional expression 5 may be "Fg1/Ft=1.977". In the optical system 1101 according to the seventh embodiment, the optical condition of the second lens 1121 calculated based on Conditional expression 6 may be "t/D=0.11". In the optical system 1101 according to the seventh embodiment, the optical condition of the second one or more lenses 1120 calculated based on Conditional expression 7 may be "Dmax/Da=1.162".

Referring to FIG. 13B, <G1> of FIG. 13B is a graph depicting spherical aberration of the optical system 1101 according to the seventh embodiment, <G2> of FIG. 13B is a graph depicting astigmatism of the optical system 1101 according to the seventh embodiment, and <G3> of FIG. 13B is a graph depicting distortion of the optical system 1101 according to the seventh embodiment.

<G1> of FIG. 13B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 13B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 13B is a graph depicting a distortion factor for light having a wavelength of 546.0740 nm. An image taken through the optical system 1101 according to the seventh embodiment may be somewhat distorted at a point out of the optical axis and may provide good optical characteristics with a distortion factor of less than about 2%.

Referring to FIG. 13C, the camera 400 may perform the auto focus function by moving all of the lenses included in the second one or more lenses 1120. The second one or more lenses 1120 (e.g., the second lens 1121, the third lens 1122, the fourth lens 1123, and the fifth lens 1124) having positive refractive power may move to an object side when a close shot is taken and may move to an upper side when a long shot is taken. For example, the second one or more lenses 1120 may move toward a light exit surface 453 of the reflective member 450 when a close shot is taken and may move toward the image sensor 441 when a long shot is taken.

Referring to FIG. 13C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA1.

Table 19 shows data of the optical system 1101 according to the seventh

TABLE 19

| Surf | Note | Radius of curvature (mm) | Thickness/ Distance (mm) | Nd Refractive index | Vd Abbe number | H-Ape |
|---|---|---|---|---|---|---|
| OBJ | object | infinity | infinity | | | |
| 1 | dummy | infinity | 0.0000 | | | 3.23208 |
| S2* | first lens | 5.59737 | 1.5000 | 1.54397 | 55.93 | 3.00000 |
| S3* | | 7.72600 | 1.0000 | | | 2.58255 |
| 4 | dummy | infinity | 0.5000 | | | 2.45453 |
| 5 | dummy | infinity | 0.0000 | | | 2.32297 |
| S6 | light incident surface | infinity | 2.2500 | 1.83400 | 37.34 | 2.32297 |
| S7 | reflective surface | infinity | −2.25 | 1.83400 | 37.34 | 2.03454 |
| S8 | light exit surface | infinity | 0 | | | 1.78766 |
| 9 | dummy | infinity | −1.9 | | | 1.78766 |
| 10 | dummy | infinity | D1 | | | 1.53804 |
| S11* (sto) | second lens | −2.97905 | −0.8580 | 1.54397 | 55.93 | 1.50246 |
| S12* | | −417.65018 | −0.1376 | | | 1.53823 |
| S13* | third lens | 7.49956 | −0.4000 | 1.67075 | 19.24 | 1.52810 |
| S14* | | −2.47404 | −0.2663 | | | 1.52558 |
| S15* | fourth lens | −5.77296 | −1.0295 | 1.67075 | 19.24 | 1.59653 |
| S16* | | 4.48654 | −0.0521 | | | 1.62189 |

TABLE 19-continued

| Surf | Note | Radius of curvature (mm) | Thickness/ Distance (mm) | Nd Refractive index | Vd Abbe number | H-Ape |
|------|------|--------------------------|--------------------------|---------------------|----------------|-------|
| S17* | fifth lens | −3.80291 | −0.4000 | 1.54397 | 55.93 | 1.60173 |
| S18* | | −2.31131 | D2 | | | 1.74918 |
| 19 | dummy | infinity | −1.5 | | | 1.72894 |
| S20 | optical | infinity | −0.21 | 1.51680 | 64.20000 | 2.07E+00 |
| S21 | filter | infinity | −6.1245 | | | 2.10E+00 |
| IMG | image sensor | infinity | 0 | | | 3.50E+00 |

The positive thickness/distance in Table 19 means that it is located on the first optical axis, and the negative thickness/distance means that it is located on the second optical axis perpendicular to the first optical axis. In Table 19, "*k" represents that an optical surface is formed of an aspheric surface. In Table 19, IMG means an image plane of the image sensor. In Table 19, S2 means an object-side surface of the first lens 1111I included in the first one or more lenses 1110. S3 means an upper-side surface (e.g., a surface facing toward the reflective member 450) of the first lens 1111.

In Table 19, S11 (sto) means the object-side surface (e.g., the surface facing toward the reflective member 450) of the second lens 1121 included in the second one or more lenses 1120 and means that an aperture is formed in the object-side surface of the second lens 1121. S12 means an upper-side surface (e.g., a surface facing toward the image sensor 441) of the second lens 1121. S13 means an object-side surface of the third lens 1122 included in the second one or more lenses 1120, and S14 means an upper-side surface of the third lens 1122. S15 means an object-side surface of the fourth lens 1123 included in the second one or more lenses 1120, and S16 means an upper-side surface of the fourth lens 1123. S17 means an object-side surface of the fifth lens 1124 included in the second one or more lenses 1120, and S18 means an upper-side surface of the fifth lens 1124.

In Table 19, S6, S7, and S8 mean a light incident surface 451, a reflective surface 452, and the light exit surface 453 included in the reflective member 450 (e.g., a prism).

In Table 19, S20 and S21 mean an object-side surface and an upper-side surface of the optical filter.

Aspheric coefficients of the lenses according to the seventh embodiment may be represented as in Table 20 below. The aspheric coefficients may be calculated based on Equation 1 described above.

TABLE 20

| Surf | K (Conic) | A | B | C | D | E |
|------|-----------|---|---|---|---|---|
| S2* | −3.70864E+00 | 3.25034E−03 | −9.92096E−05 | 2.30739E−05 | −2.03205E−06 | 9.82278E−08 |
| S3* | −6.98544E−01 | 1.36898E−03 | −4.48491E−05 | 4.57374E−05 | −6.00718E−06 | 3.87051E−07 |
| S11* | 3.77357E−01 | −6.94516E−03 | −2.31391E−04 | −3.16482E−03 | 1.43891E−03 | −4.11637E−04 |
| S12* | 2.52119E−06 | 8.49653E−03 | −1.38500E−02 | 9.58184E−04 | 1.42269E−04 | −4.95336E−05 |
| S13* | −7.13787E+00 | −9.48104E−04 | 2.42723E−03 | −1.79367E−03 | 3.52738E−04 | 3.38393E−05 |
| S14* | −5.00534E+00 | 9.62566E−03 | −1.40911E−04 | 3.20772E−03 | −4.18655E−04 | −1.24593E−04 |
| S15* | 7.70913E+00 | 1.26520E−02 | −1.71857E−02 | 7.09980E−03 | −2.89639E−04 | −1.81427E−04 |
| S16* | −8.22204E+00 | 7.32178E−05 | −1.14550E−02 | 2.98116E−03 | 5.21898E−04 | −2.03475E−04 |
| S17* | 3.56302E+00 | −1.34098E−01 | 1.40035E−02 | −2.48343E−03 | 1.47811E−03 | −4.90547E−04 |
| S18* | −7.51057E+00 | −6.84565E−02 | 1.29425E−02 | 7.90378E−04 | −8.61475E−04 | 1.26046E−04 |

Auto focus and OIS data of the optical system 1101 according to the seventh embodiment may be represented as in Table 21 below.

TABLE 21

Auto-focus data

| Object | infinity | 500 mm |
|--------|----------|--------|
| D1 | 0 | 0.61081 |
| D2 | 0 | −0.61081 |

Decenter data

| Decenter & Bend | Alpha |
|-----------------|-------|
| S7 | 45.000 |

Pitch OIS 1.5 degree decenter data

| Basic | Alpha | Beta | Gamma |
|-------|-------|------|-------|
| S5 | 0.885 | 0.000 | 0.000 |
| S9 | −0.885 | 0.000 | 0.000 |

Yaw OIS 1.5 degree decenter data

| Basic | Alpha | Beta | Gamma |
|-------|-------|------|-------|
| S5 | 0.000 | 0.000 | 1.78 |
| S9 | 0.000 | 1.78 | 0.000 |

Referring to Table 21, in the optical system 1101 according to the seventh embodiment, the second one or more lenses 1120 (e.g., the second lens 1121, the third lens 1122, the fourth lens 1123, and the fifth lens 1124) may move toward the reflective member 450 by a predetermined distance when a close shot is taken. Accordingly, the distance between the object-side surface S11 of the second lens 1121 and the light exit surface S8 of the reflective member 450 may be decreased, and the distance between the upper-side surface S18 of the fifth lens 1124 and the optical filter 444 may be increased. For example, when an image of a subject at infinity (e.g., a long shot) is taken, both D1 and D2 in Table 19 may be 0, and when an image of a subject at a distance of 500 mm (e.g., a close shot) is taken, D1 in Table 19 may be 0.61081, and D2 in Table 19 may be −0.61081. Accordingly, the distance between S8 and S11 is decreased, and the distance between S18 and S20 is increased. In the optical system 1101 according to the seventh embodiment, the reflective surface 452 or S7 of the reflective member 450 may form an angle of 45 degrees together with the optical axes OA1 and OA2.

Figure 14A:
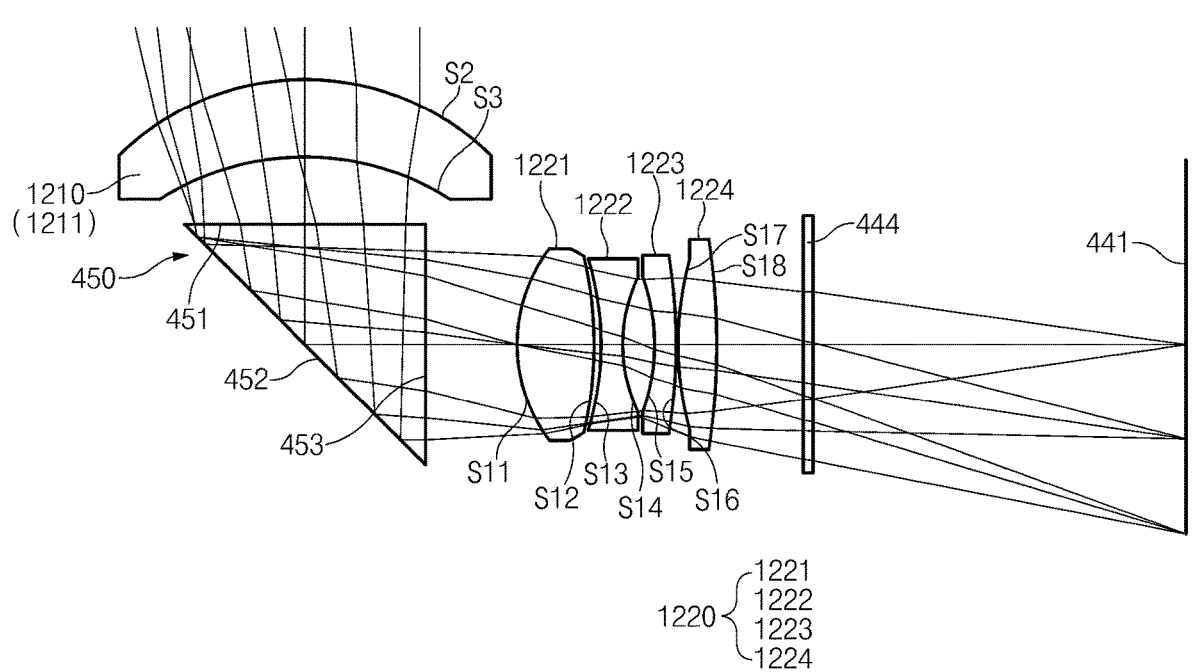
FIG. 14A is a view illustrating an optical system of a camera according to an eighth embodiment.
Figure 14B:
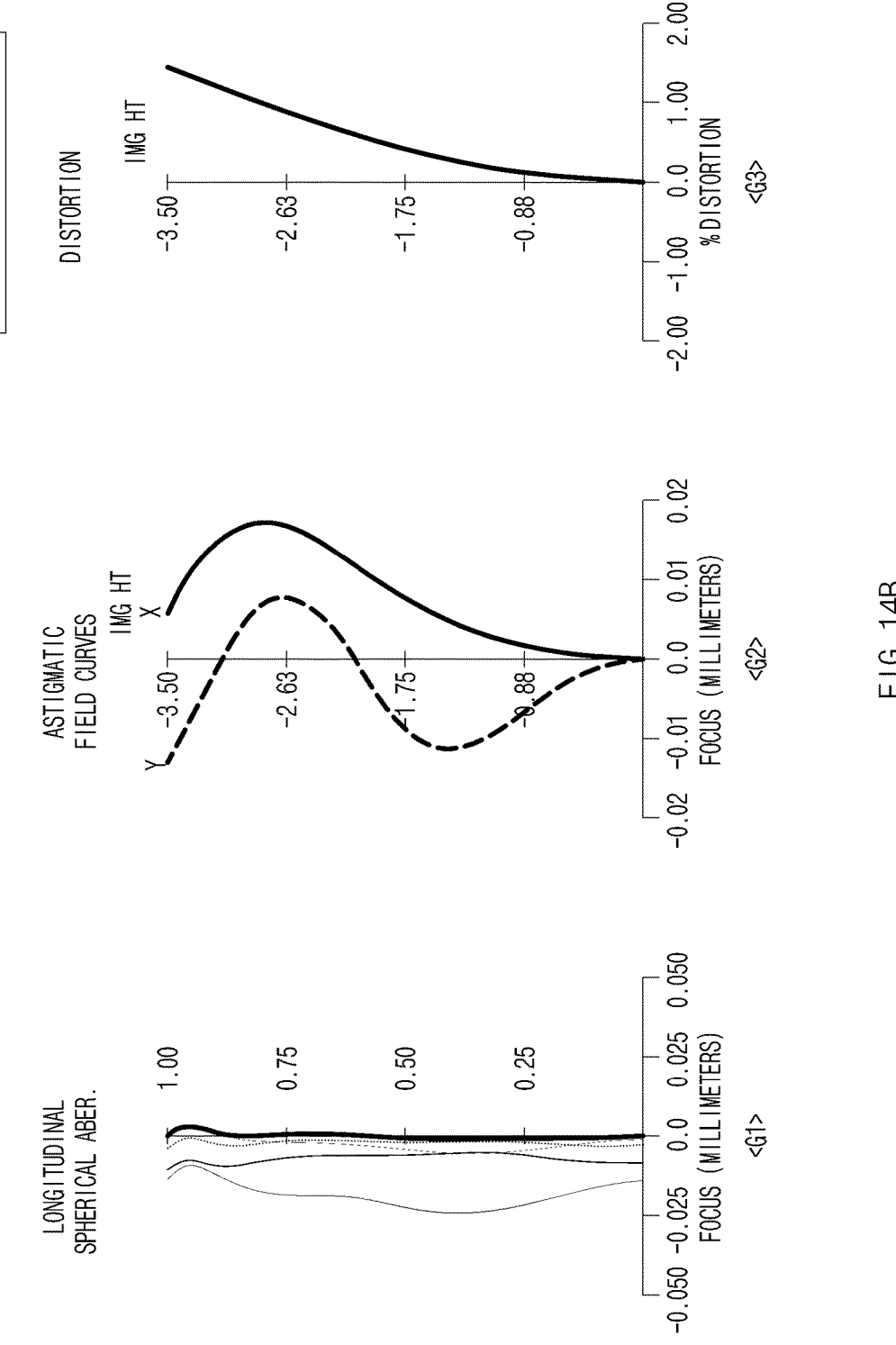
FIG. 14B is an aberration curve of the optical system of the camera according to the eighth embodiment.
Figure 14C:
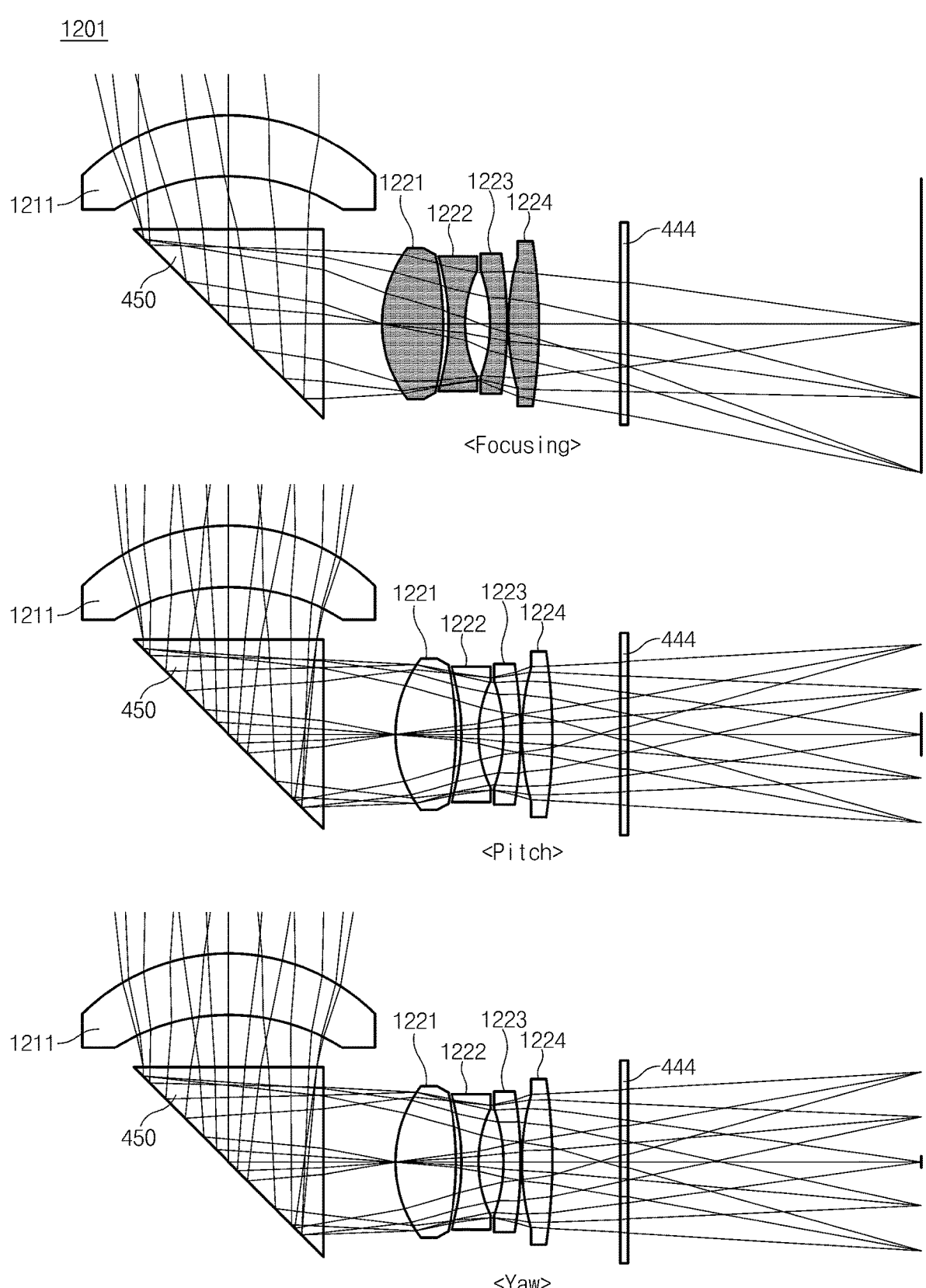
FIG. 14C is a view illustrating the optical system when the camera according to the eighth embodiment performs an auto focus function and an image stabilization function.

FIG. 14A is a view illustrating an optical system of a camera according to an eighth embodiment. FIG. 14B is an aberration curve of the optical system of the camera according to the eighth embodiment. FIG. 14C is a view illustrating the optical system when the camera according to the eighth embodiment performs an auto focus function and an image stabilization function.

Referring to FIG. 14A, the optical system 1201 of the camera according to the eighth embodiment may include a first one or more lenses 1210 (e.g., the first one or more lenses 1110 of FIG. 13A), a second one or more lenses 1220 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1201 according to the eighth embodiment may be configured such that lenses included in the second one or more lenses 1220 have different refractive powers (e.g., positive refractive power or negative refractive power).

In an embodiment, the first one or more lenses 1210 may include a first lens 1211 having positive refractive power.

In an embodiment, the second one or more lenses 1220 may have positive refractive power. The second one or more lenses 1220 may be disposed between the reflective member 450 and the image sensor 441 (or, the optical filter 444). The second one or more lenses 1220 may include a second lens 1221, a third lens 1222, a fourth lens 1223, and a fifth lens 1224 sequentially disposed from the reflective member 450 side. For example, the second one or more lenses 1220 may be configured such that the second lens 1221 is disposed closest to the reflective member 450, the fifth lens 1224 is disposed closest to the image sensor 441, and the third lend 1222 and the fourth lens 1223 are disposed between the second lens 1221 and the fifth lens 1224.

The second one or more lenses 1220 of the optical system 1201 according to the eighth embodiment may include the second lens 1221 having positive refractive power, the third lens 1222 having negative refractive power, the fourth lens 1223 having negative refractive power, and the fifth lens 1224 having positive refractive power.

In certain embodiments, the camera 400 may be configured to adjust a focus position by moving the second one or more lenses 1220 or at least a part of the lenses included in the second one or more lenses 1220 in the direction of a second optical axis (e.g., the second optical axis OA2 of FIGS. 5 and 6). For example, the second one or more lenses 1220 may be entirely moved, or the separate lenses included in the second one or more lenses 1220 may be moved.

Likewise to the optical system 1201 according to the seventh embodiment, the optical system 1201 according to the eighth embodiment may satisfy Conditional expression 5, Conditional expression 6, and/or Conditional expression 7 described above. For example, in the optical system 1201 according to the eighth embodiment, the optical condition of the first lens 1211 calculated based on Conditional expression may be "Fg1/Ft=2.94". In the optical system 1201 according to the eighth embodiment, the optical condition of the second lens 1221 calculated based on Conditional expression 6 may be "t/D=0.145". In the optical system 1201 according to the eighth embodiment, the optical condition of the second one or more lenses 1220 calculated based on Conditional expression 7 may be "Dmax/Da=1.088".

Referring to FIG. 14B, <G1> of FIG. 14B is a graph depicting spherical aberration of the optical system 1201 according to the eighth embodiment, <G2> of FIG. 14B is a graph depicting astigmatism of the optical system 1201 according to the eighth embodiment, and <G3> of FIG. 14B is a graph depicting distortion of the optical system 1201 according to the eighth embodiment.

<G1> of FIG. 14B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 14B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 14B is a graph depicting a distortion factor for light having a wavelength of 546.0740 nm. An image taken through the optical system 1201 according to the eighth embodiment may be somewhat distorted at a point out of the optical axis and may provide good optical characteristics with a distortion factor of less than about 2%.

Referring to FIG. 14C, the camera 400 may perform the auto focus function by moving all of the lenses included in the second one or more lenses 1220. The second one or more lenses 1220 (e.g., the second lens 1221, the third lens 1222, the fourth lens 1223, and the fifth lens 1224) having positive refractive power may move to an object side when a close shot is taken and may move to an upper side when a long shot is taken. For example, the second one or more lenses 1220 may move toward a light exit surface 453 of the reflective member 450 when a close shot is taken and may move toward the image sensor 441 when a long shot is taken.

Referring to FIG. 14C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OAT.

Table 22 shows data of the optical system 1201 according to the eighth

TABLE 22

| Surf | Note | Radius of curvature (mm) | Thickness/ Distance (mm) | Nd Refractive index | Vd Abbe number | H-Ape |
|---|---|---|---|---|---|---|
| OBJ | object | infinity | infinity | | | |
| 1 | dummy | infinity | 0.00000 | | | 2.90831 |
| S2* | first lens | 5.43526 | 1.49759 | 1.54397 | 55.930 | 3.11839 |
| S3* | | 6.31471 | 0.71005 | | | 2.36482 |
| 4 | dummy | infinity | 0.50000 | | | 2.32336 |
| 5 | dummy | infinity | 0.00000 | | | 2.22001 |
| S6 | light incident surface | infinity | 2.25000 | 1.83400 | 37.340 | 7.23561 |
| S7 | reflective surface | infinity | −2.25000 | 1.83400 | 37.340 | 1.99814 |
| S8 | light exit surface | infinity | 0.00000 | | | 1.81874 |
| 9 | dummy | infinity | −1.70000 | | | 1.81874 |
| 10 | dummy | infinity | D1 | | | 1.68210 |
| S11* (sto) | second lens | −3.07405 | −1.42457 | 1.54397 | 55.930 | 1.64454 |
| S12* | | 6.36783 | −0.12023 | | | 1.49441 |
| S13* | third lens | 4.41913 | −0.40000 | 1.60821 | 26.230 | 1.46386 |
| S14* | | −2.84202 | −0.58808 | | | 1.32121 |
| S15* | fourth lens | 4.53681 | −0.40571 | 1.54397 | 55.930 | 1.34426 |
| S16* | | 8.1579894 | −0.03 | | | 1.52672 |
| S17* | fifth lens | −5.77951 | −0.744146 | 1.64076 | 23.280 | 1.71152 |
| S18* | | 16.430568 | D2 | | | 1.79002 |
| 19 | dummy | infinity | −1.561305 | | | 1.81219 |
| S20 | optical filter | infinity | −0.21000 | 1.51680 | 64.200 | 2.11799 |
| S21 | | infinity | −6.90689 | | | 2.14479 |
| IMG | image sensor | infinity | 0.00000 | | | 3.50097 |

The positive thickness/distance in Table 22 means that it is located on the first optical axis OA1, and the negative thickness/distance means that it is located on the second optical axis OA2 perpendicular to the first optical axis. In Table 22, "*" represents that an optical surface is formed of an aspheric surface. In Table 22, IMG means an image plane of the image sensor. In Table 22, S2 means an object-side surface of the first lens 1211 included in the first one or more lenses 1210. S3 means an upper-side surface (e.g., a surface facing toward the reflective member 450) of the first lens 1211.

In Table 22, S11 (sto) means an object-side surface (e.g., a surface facing toward the reflective member 450) of the second lens 1221 included in the second one or more lenses 1220 and means that an aperture is formed in the object-side surface of the second lens 1221. S12 means an upper-side surface (e.g., a surface facing toward the image sensor 441)

of the second lens 1221. S13 means an object-side surface of the third lens 1222 included in the second one or more lenses 1220, and S14 means an upper-side surface of the third lens 1222. S15 means an object-side surface of the fourth lens 1223 included in the second one or more lenses 1220, and S16 means an upper-side surface of the fourth lens 1223. S17 means an object-side surface of the fifth lens 1224 included in the second one or more lenses 1220, and S18 means an upper-side surface of the fifth lens 1224.

In Table 22, S6, S7, and S8 mean a light incident surface 451, a reflective surface 452, and the light exit surface 453 included in the reflective member 450 (e.g., a prism).

In Table 22, S20 and S21 mean an object-side surface and an upper-side surface of the optical filter.

Aspheric coefficients of the lenses according to the eighth embodiment may be represented as in Tables 23 and 24 below. The aspheric coefficients may be calculated based on Equation 1 described above.

TABLE 23

| Surf | K (Conic) | A | B | C | D |
|---|---|---|---|---|---|
| S2* | −4.12522E+00 | 3.79604E−03 | −1.28862E−04 | 4.12988E−05 | −1.20237E−05 |
| S3* | −6.44836E−01 | 1.51234E−03 | −3.14820E−05 | 1.09106E−04 | −5.31673E−05 |
| S11* | 1.52560E+00 | −6.94975E−03 | −3.51867E−04 | −2.19804E−03 | 3.29784E−03 |
| S12* | −1.24300E+00 | −1.68288E−02 | 6.53727E−02 | −8.29733E−02 | 6.02767E−02 |
| S13* | −4.08463E+00 | −3.84756E−02 | 1.33574E−01 | −1.94710E−01 | 1.68254E−01 |
| S14* | −1.77067E+00 | −2.94066E−02 | 8.61153E−02 | −1.39420E−01 | 1.57404E−01 |
| S15* | −3.26686E+00 | −1.58339E−02 | 1.34824E−02 | −2.49541E−02 | 6.00138E−02 |
| S16* | 1.44390E−01 | 4.19069E−03 | −1.36932E−03 | 4.40367E−03 | 5.84541E−03 |
| S17* | 1.90608E−05 | −1.63858E−03 | −1.78954E−03 | 1.26837E−03 | −2.90364E−04 |
| S18* | −8.22873E−01 | −1.45039E−04 | 1.50917E−03 | −3.82927E−03 | 3.85697E−03 |

TABLE 24

| Surf | E | F | G | H | J |
|------|------|------|------|------|------|
| S2* | 2.76834E−06 | −4.17833E−07 | 3.95700E−08 | −2.11027E−09 | 4.81935E−11 |
| S3* | 1.73459E−05 | −3.62148E−06 | 4.71348E−07 | −3.45088E−08 | 1.08045E−09 |
| S11* | −3.25107E−03 | 1.84606E−03 | −6.18297E−04 | 1.12737E−04 | −8.83390E−06 |
| S12* | −3.15325E−02 | 1.51978E−02 | −6.32070E−03 | 1.62360E−03 | −1.74225E−04 |
| S13* | −9.64281E−02 | 4.06638E−02 | −1.30982E−02 | 2.81655E−03 | −2.80435E−04 |
| S14* | −1.40260E−01 | 9.70379E−02 | −4.51814E−02 | 1.18805E−02 | −1.30164E−03 |
| S15* | −9.59933E−02 | 8.39906E−02 | −3.92297E−02 | 9.01768E−03 | −7.68650E−04 |
| S16* | −1.88383E−02 | 1.90120E−02 | −9.48028E−03 | 2.35963E−03 | −2.34790E−04 |
| S17* | 0.00000E+00 | 0.00000E+00 | 0.00000E+00 | 0.00000E+00 | 0.00000E+00 |
| S18* | −2.27218E−03 | 8.30363E−04 | −1.84302E−04 | 2.21413E−05 | −1.08479E−06 |

Auto focus and OIS data of the optical system 1201 according to the eighth embodiment may be represented as in Table 25 below.

TABLE 25

| Auto-focus data | | |
|------|------|------|
| Object | infinity | 1000 mm |
| D1 | 0 | 0.26000 |
| D2 | 0 | −0.26000 |

| Decenter data | |
|------|------|
| Decenter & Bend | Alpha |
| S7 | 45.000 |

| Pitch OIS 1.5 degree decenter data | | | | |
|------|------|------|------|------|
| Basic | Alpha | Beta | Gamma | Z-offset |
| S5 | 0.9000 | 0.000 | 0.000 | 2.250 |
| S9 | −0.9000 | 0.000 | 0.000 | 2.250 |

| Yaw OIS 1.5 degree decenter data | | | | |
|------|------|------|------|------|
| Basic | Alpha | Beta | Gamma | Z-offset |
| S5 | 0.000 | 0.000 | 1.750 | 2.250 |
| S9 | 0.000 | 1.750 | 0.000 | 2.250 |

Referring to Table 25, in the optical system 1201 according to the eighth embodiment, the second one or more lenses 1220 (e.g., the second lens 1221, the third lens 1222, the fourth lens 1223, and the fifth lens 1224) may move toward the reflective member 450 by a predetermined distance when a close shot is taken. Accordingly, the distance between the object-side surface S11 of the second lens 1221 and the light exit surface S8 of the reflective member 450 may be decreased, and the distance between the upper-side surface S18 of the fifth lens 1224 and the optical filter 444 may be increased. For example, when an image of a subject at infinity (e.g., a long shot) is taken, both D1 and D2 in Table 22 may be 0, and when an image of a subject at a distance of 1000 mm (e.g., a close shot) is taken, D1 in Table 22 may be 0.26000, and D2 in Table 22 may be −0.26000. Accordingly, the distance between S8 and S11 is decreased, and the distance between S18 and S20 is increased. In the optical system 1201 according to the eighth embodiment, the reflective surface 452 or S7 of the reflective member 450 may form an angle of 45 degrees together with the optical axes OA1 and OA2.

Figure 15A:
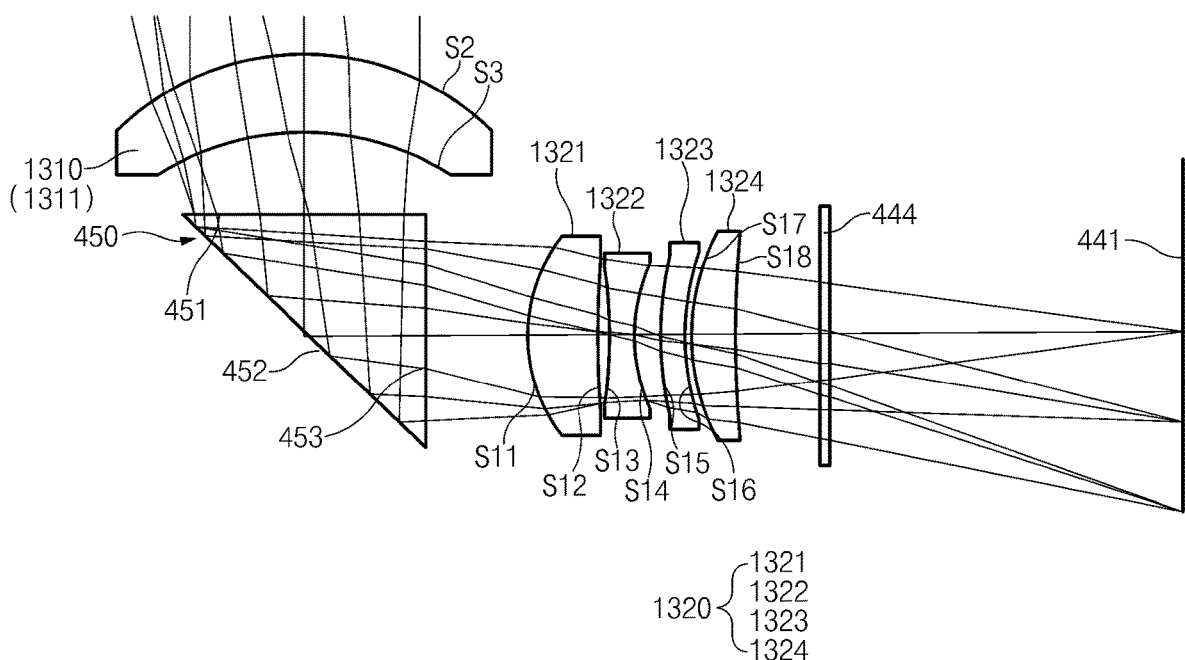
FIG. 15A is a view illustrating an optical system of a camera according to a ninth embodiment.
Figure 15B:
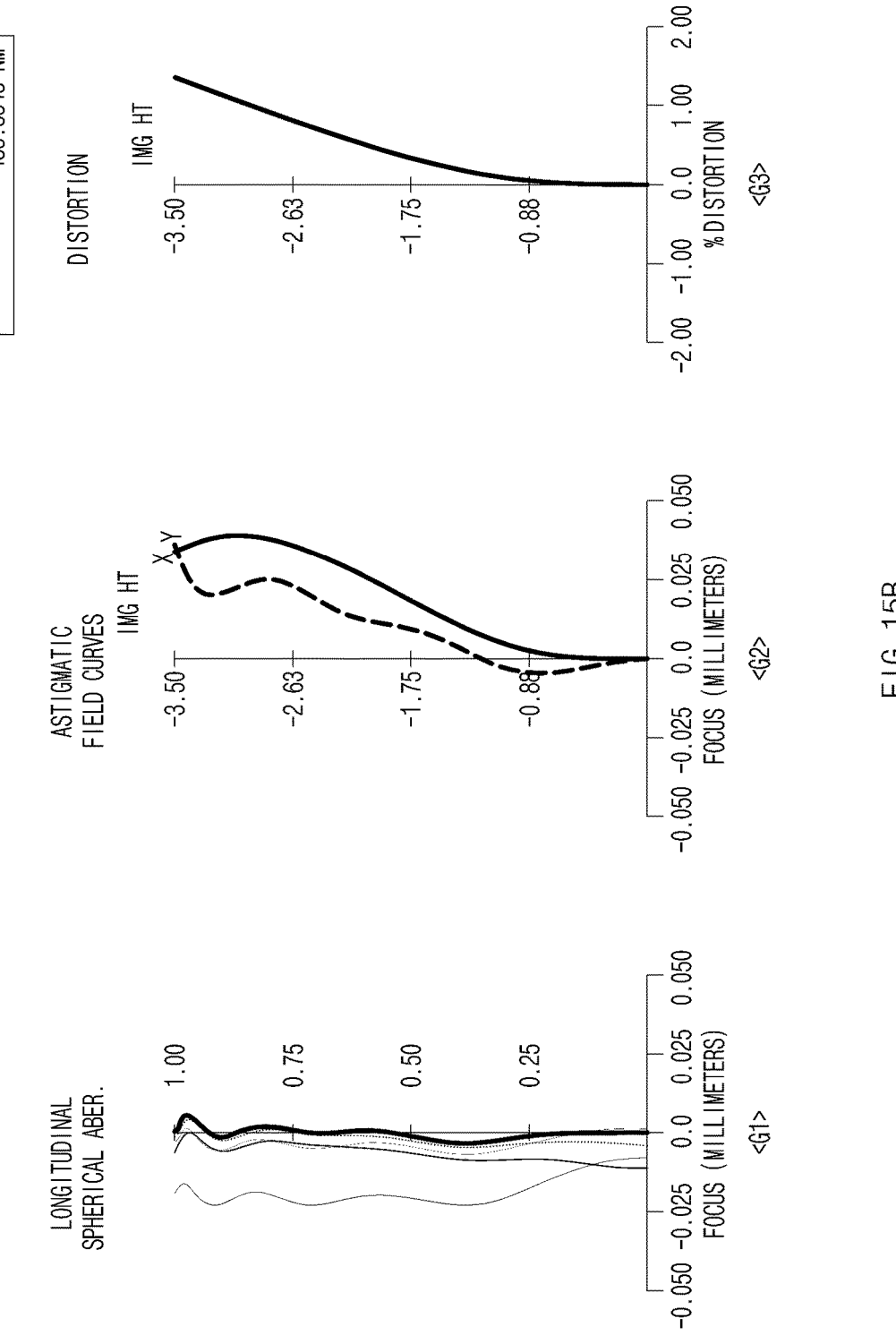
FIG. 15B is an aberration curve of the optical system of the camera according to the ninth embodiment.
Figure 15C:
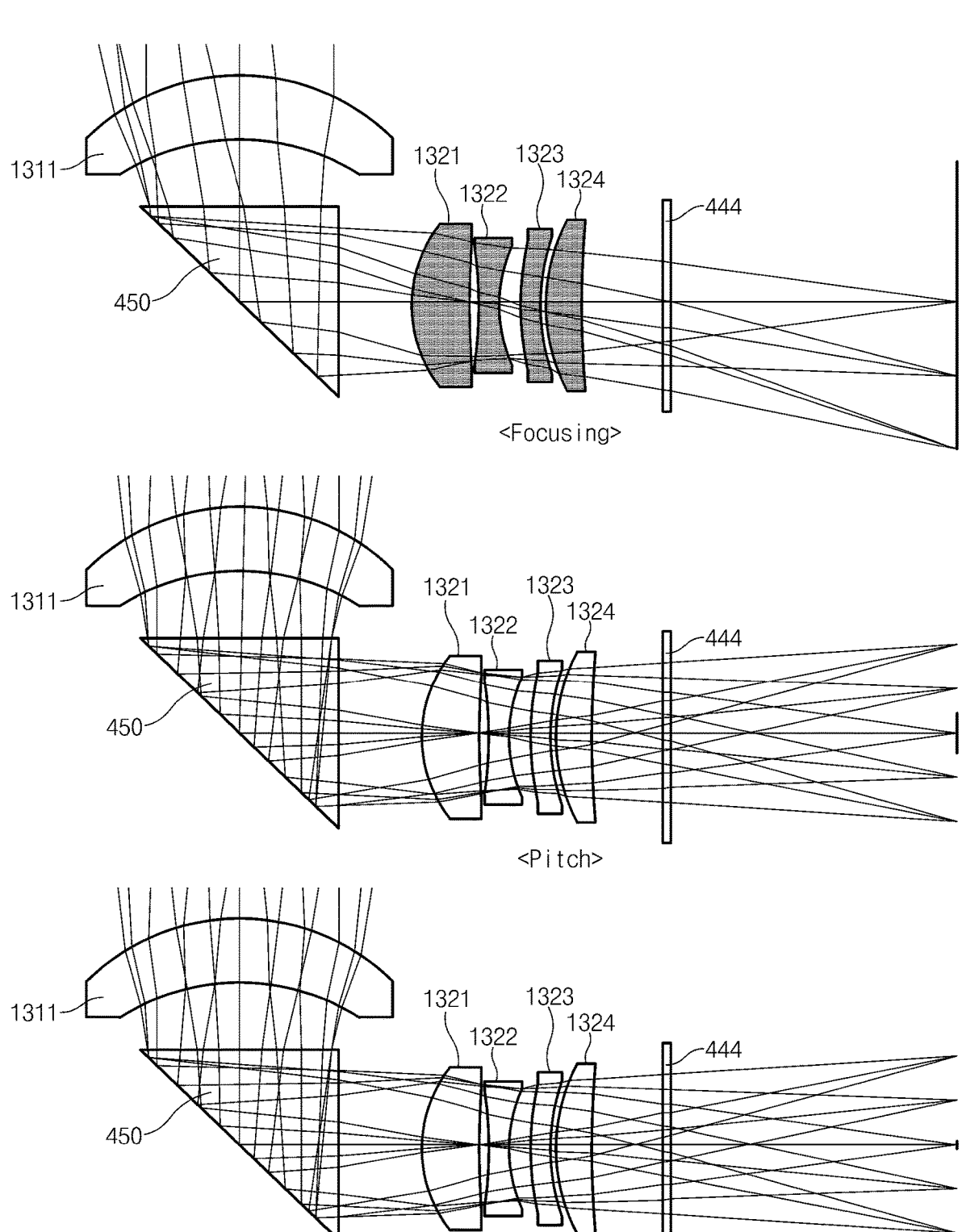
FIG. 15C is a view illustrating the optical system when the camera according to the ninth embodiment performs an auto focus function and an image stabilization function.

FIG. 15A is a view illustrating an optical system of a camera according to a ninth embodiment. FIG. 15B is an aberration curve of the optical system of the camera according to the ninth embodiment. FIG. 15C is a view illustrating the optical system when the camera according to the ninth embodiment performs an auto focus function and an image stabilization function.

Referring to FIG. 15A, the optical system 1301 of the camera according to the ninth embodiment may include a first one or more lenses 1310 (e.g., the first one or more lenses 1110 of FIG. 13A), a second one or more lenses 1320 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1301 according to the ninth embodiment may be configured such that lenses included in the second one or more lenses 1320 have different refractive powers (e.g., positive refractive power or negative refractive power).

In an embodiment, the first one or more lenses 1310 may include a first lens 1311 having positive refractive power.

In an embodiment, the second one or more lenses 1320 may have positive refractive power. The second one or more lenses 1320 may be disposed between the reflective member 450 and the image sensor 441 (or, the optical filter 444). The second one or more lenses 1320 may include a second lens 1321, a third lens 1322, a fourth lens 1323, and a fifth lens 1324 sequentially disposed from the reflective member 450 side. For example, the second one or more lenses 1320 may be configured such that the second lens 1321 is disposed closest to the reflective member 450, the fifth lens 1324 is disposed closest to the image sensor 441, and the third lend 1322 and the fourth lens 1323 are disposed between the second lens 1321 and the fifth lens 1324.

The second one or more lenses 1320 of the optical system 1301 according to the ninth embodiment may include the second lens 1321 having positive refractive power, the third lens 1322 having negative refractive power, the fourth lens 1323 having positive refractive power, and the fifth lens 1324 having positive refractive power.

In certain embodiments, the camera 400 may be configured to adjust a focus position by moving the second one or more lenses 1320 or at least a part of the lenses included in the second one or more lenses 1320 in the direction of a second optical axis (e.g., the second optical axis OA2 of FIGS. 5 and 6). For example, the second one or more lenses 1320 may be entirely moved, or the separate lenses included in the second one or more lenses 1320 may be moved.

Likewise to the optical system 1101 according to the seventh embodiment, the optical system 1301 according to the ninth embodiment may satisfy Conditional expression 5, Conditional expression 6, and/or Conditional expression 7 described above. For example, in the optical system 1301 according to the ninth embodiment, the optical condition of the first lens 1311 calculated based on Conditional expression 5 may be "Fg1/Ft=2.95". In the optical system 1301 according to the ninth embodiment, the optical condition of the second lens 1321 calculated based on Conditional expression 6 may be "t/D=0.144". In the optical system 1301 according to the ninth embodiment, the optical condition of the second one or more lenses 1320 calculated based on Conditional expression 7 may be "Dmax/Da=1.256".

Referring to FIG. 15B, <G1> of FIG. 15B is a graph depicting spherical aberration of the optical system 1301 according to the ninth embodiment, <G2> of FIG. 15B is a graph depicting astigmatism of the optical system 1301 according to the ninth embodiment, and <G3> of FIG. 15B is a graph depicting distortion of the optical system 1301 according to the ninth embodiment.

<G1> of FIG. 15B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1327 nm, and light having a wavelength of 435.8343 nm.

<G2> of FIG. 15B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 15B is a graph depicting a distortion factor for light having a wavelength of 546.0740 nm. An image taken through the optical system 1301 according to the ninth embodiment may be somewhat distorted at a point out of the optical axis and may provide good optical characteristics with a distortion factor of less than about 2%.

Referring to FIG. 15C, the camera 400 may perform the auto focus function by moving all of the lenses included in the second one or more lenses 1320. The second one or more lenses 1320 (e.g., the second lens 1321, the third lens 1322, the fourth lens 1323, and the fifth lens 1324) having positive refractive power may move to an object side when a close shot is taken and may move to an upper side when a long shot is taken. For example, the second one or more lenses 1320 may move toward a light exit surface 453 of the reflective member 450 when a close shot is taken and may move toward the image sensor 441 when a long shot is taken.

Referring to FIG. 15C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA1.

Table 26 shows data of the optical system 1301 according to the ninth

TABLE 26

| Surf | Note | Radius of curvature (mm) | Thickness/ Distance (mm) | Nd Refractive index | Vd Abbe number | H-Ape |
|---|---|---|---|---|---|---|
| OBJ | object | infinity | infinity | | | |
| 1 | dummy | infinity | 0.00000 | | | 3.15686 |
| S2* | first lens | 5.39972 | 1.50000 | 1.54397 | 55.930 | 2.98159 |
| S3* | | 6.25047 | 0.99887 | | | 2.56517 |
| 4 | dummy | infinity | 0.50000 | | | 2.48278 |
| 5 | dummy | infinity | 0.00000 | | | 2.37492 |
| S6 | light incident surface | infinity | 2.25000 | 1.83400 | 37.340 | 7.23561 |
| S7 | reflective surface | infinity | −2.25000 | 1.83400 | 37.340 | 2.13402 |
| S8 | light exit surface | infinity | 0.00000 | | | 1.92209 |
| 9 | dummy | infinity | −1.92126 | | | 1.92209 |
| 10 | dummy | infinity | D1 | | | 1.67186 |
| S11* | second | −3.00742 | −1.29593 | 1.54397 | 55.930 | 1.63346 |
| S12* (sto) | lens | −35.33458 | −0.21537 | | | 1.40530 |
| S13* | third lens | 8.17029 | −0.44120 | 1.63759 | 22.280 | 1.39098 |
| S14* | | −2.69578 | −0.48151 | | | 1.33373 |
| S15* | fourth | −5.56306 | −0.45467 | 1.56657 | 41.530 | 1.48251 |
| S16* | lens | −6.572002 | −0.102342 | | | 1.58428 |
| S17* | fifth lens | −3.7561 | −0.803946 | 1.67074 | 19.300 | 1.72357 |
| S18* | | −21.27484 | D2 | | | 1.76558 |
| 19 | dummy | infinity | −1.561305 | | | 1.75197 |
| S20 | optical | infinity | −0.21000 | 1.51680 | 64.200 | 2.08277 |
| S21 | filter | infinity | −6.53005 | | | 2.11171 |
| IMG | image sensor | infinity | 0.00000 | | | 3.50237 |

The positive thickness/distance in Table 26 means that it is located on the first optical axis OA1, and the negative thickness/distance means that it is located on the second optical axis OA2 perpendicular to the first optical axis OA1. In Table 26, "*" represents that an optical surface is formed of an aspheric surface. In Table 26, IMG means an image plane of the image sensor. In Table 26, S2 means an object-side surface of the first lens 1311 included in the first one or more lenses 1310. S3 means an upper-side surface (e.g., a surface facing toward the reflective member 450) of the first lens 1311.

In Table 26, S11 means an object-side surface (e.g., a surface facing toward the reflective member 450) of the second lens 1321 included in the second one or more lenses 1320. S12 (sto) means an upper-side surface (e.g., a surface facing toward the image sensor 441) of the second lens 1321 and means that an aperture is formed in the upper-side surface of the second lens 1321. S13 means an object-side surface of the third lens 1322 included in the second one or more lenses 1320, and S14 means an upper-side surface of the third lens 1322. S15 means an object-side surface of the fourth lens 1323 included in the second one or more lenses 1320, and S16 means an upper-side surface of the fourth lens 1323. S17 means an object-side surface of the fifth lens 1324 included in the second one or more lenses 1320, and S18 means an upper-side surface of the fifth lens 1324.

In Table 26, S6, S7, and S8 mean a light incident surface 451, a reflective surface 452, and the light exit surface 453 included in the reflective member 450 (e.g., a prism).

In Table 26, S20 and S21 mean an object-side surface and an upper-side surface of the optical filter.

Aspheric coefficients of the lenses according to the ninth embodiment may be represented as in Tables 27-1 and 27-2 below. The aspheric coefficients may be calculated based on Equation 1 described above.

TABLE 27-3

| Auto-focus data | | |
| --- | --- | --- |
| Object | infinity | 1000 mm |
| D1 | 0 | 0.26500 |
| D2 | 0 | −0.26500 |

| Decenter data | |
| --- | --- |
| Decenter & Bend | Alpha |
| S7 | 45.000 |

| Pitch OIS 1.5 degree decenter data | | | | |
| --- | --- | --- | --- | --- |
| Basic | Alpha | Beta | Gamma | Z-offset |
| S5 | 0.9000 | 0.000 | 0.000 | 2.250 |
| S9 | −0.9000 | 0.000 | 0.000 | 2.250 |

| Yaw OIS 1.5 degree decenter data | | | | |
| --- | --- | --- | --- | --- |
| Basic | Alpha | Beta | Gamma | Z-offset |
| S5 | 0.000 | 0.000 | 1.750 | 2.250 |
| S9 | 0.000 | 1.750 | 0.000 | 2.250 |

Referring to Table 27-3, in the optical system 1301 according to the ninth embodiment, the second one or more lenses 1320 (e.g., the second lens 1321, the third lens 1322, the fourth lens 1323, and the fifth lens 1324) may move toward the reflective member 450 by a predetermined distance when a close shot is taken. Accordingly, the distance between the object-side surface S11 of the second lens 1321 and the light exit surface S8 of the reflective member 450 may be decreased, and the distance between the upper-side surface S18 of the fifth lens 1324 and the optical filter 444 may be increased. For example, when an image of a subject

TABLE 27-1

| Surf | K (Conic) | A | B | C | D |
| --- | --- | --- | --- | --- | --- |
| S2* | −4.29095E+00 | 3.76417E−03 | −9.41815E−05 | 2.68846E−05 | −1.00881E−05 |
| S3* | −1.42412E+00 | 1.52042E−03 | 8.04544E−05 | 5.89859E−05 | −4.04676E−05 |
| S11* | 1.49359E+00 | −7.70126E−03 | −5.00216E−03 | 1.08770E−02 | −1.53623E−02 |
| S12* | 2.73677E+00 | −1.46604E−02 | 4.13852E−02 | −3.63084E−03 | −1.12514E−01 |
| S13* | −3.32996E+00 | −4.64099E−02 | 1.62740E−01 | −2.70295E−01 | 2.39105E−01 |
| S14* | −3.06435E+00 | −5.02392E−02 | 1.48358E−01 | −2.88759E−01 | 3.38174E−01 |
| S15* | 3.24516E+00 | −2.05283E−02 | 2.61748E−02 | −3.56119E−02 | 7.63644E−03 |
| S16* | −8.51939E+00 | 1.06084E−02 | 1.08460E−02 | −2.33301E−02 | 1.89531E−02 |
| S17* | 1.91908E−05 | −3.56998E−03 | −1.05341E−03 | 6.13610E−04 | −1.02240E−04 |
| S18* | −1.98598E−01 | 8.55908E−06 | −3.57715E−03 | 6.90025E−03 | −8.11171E−03 |

TABLE 27-2

| Surf | E | F | G | H | J |
| --- | --- | --- | --- | --- | --- |
| S2* | 2.98257E−06 | −5.20302E−07 | 5.28116E−08 | −2.87106E−09 | 6.46599E−11 |
| S3* | 1.62024E−05 | −3.77445E−06 | 5.14740E−07 | −3.78223E−08 | 1.15486E−09 |
| S11* | 1.17997E−02 | −5.34336E−03 | 1.38768E−03 | −1.87534E−04 | 9.57750E−06 |
| S12* | 1.86026E−01 | −1.42112E−01 | 5.84141E−02 | −1.24495E−02 | 1.07569E−03 |
| S13* | −9.57968E−02 | −4.61349E−03 | 1.90790E−02 | −6.52920E−03 | 7.30459E−04 |
| S14* | −2.33469E−01 | 9.24346E−02 | −1.87810E−02 | 1.28496E−03 | 5.89770E−05 |
| S15* | 3.00829E−02 | −3.41025E−02 | 1.59797E−02 | −3.52543E−03 | 2.95237E−04 |
| S16* | −2.78788E−03 | −5.00184E−03 | 3.23760E−03 | −7.67870E−04 | 6.42065E−05 |
| S17* | 0.00000E+00 | 0.00000E+00 | 0.00000E+00 | 0.00000E+00 | 0.00000E+00 |
| S18* | 5.55293E−03 | −2.28515E−03 | 5.72254E−04 | −8.22853E−05 | 5.32015E−06 |

Auto focus and OIS data of the optical system 1301 according to the ninth embodiment may be represented as in Table 27-3 below.

at infinity (e.g., a long shot) is taken, both D1 and D2 in Table 26 may be 0, and when an image of a subject at a distance of 1000 mm (e.g., a close shot) is taken, D1 in Table 26 may be 0.26500, and D2 in Table 26 may be –0.26500. Accordingly, the distance between S8 and S11 is decreased, and the distance between S18 and S20 is increased. In the optical system 1301 according to the ninth embodiment, the reflective surface 452 or S7 of the reflective member 450 may form an angle of 45 degrees together with the optical axes OA1 and OA2.

Figure 16A:
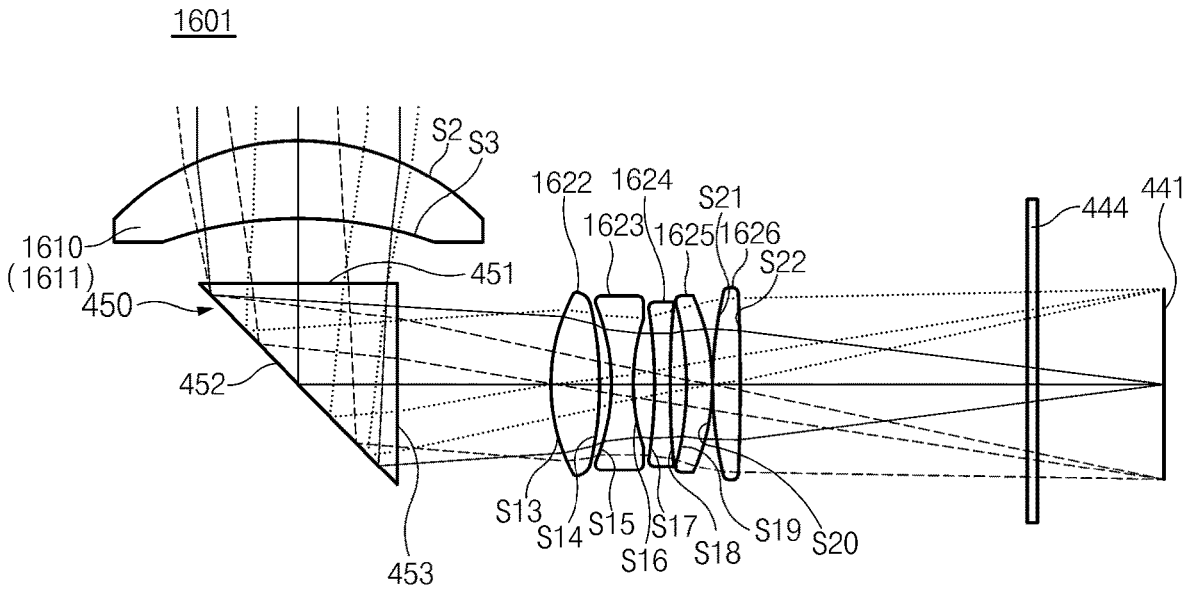
FIG. 16A is a view illustrating an optical system of a camera according to a tenth embodiment.
Figure 16B:
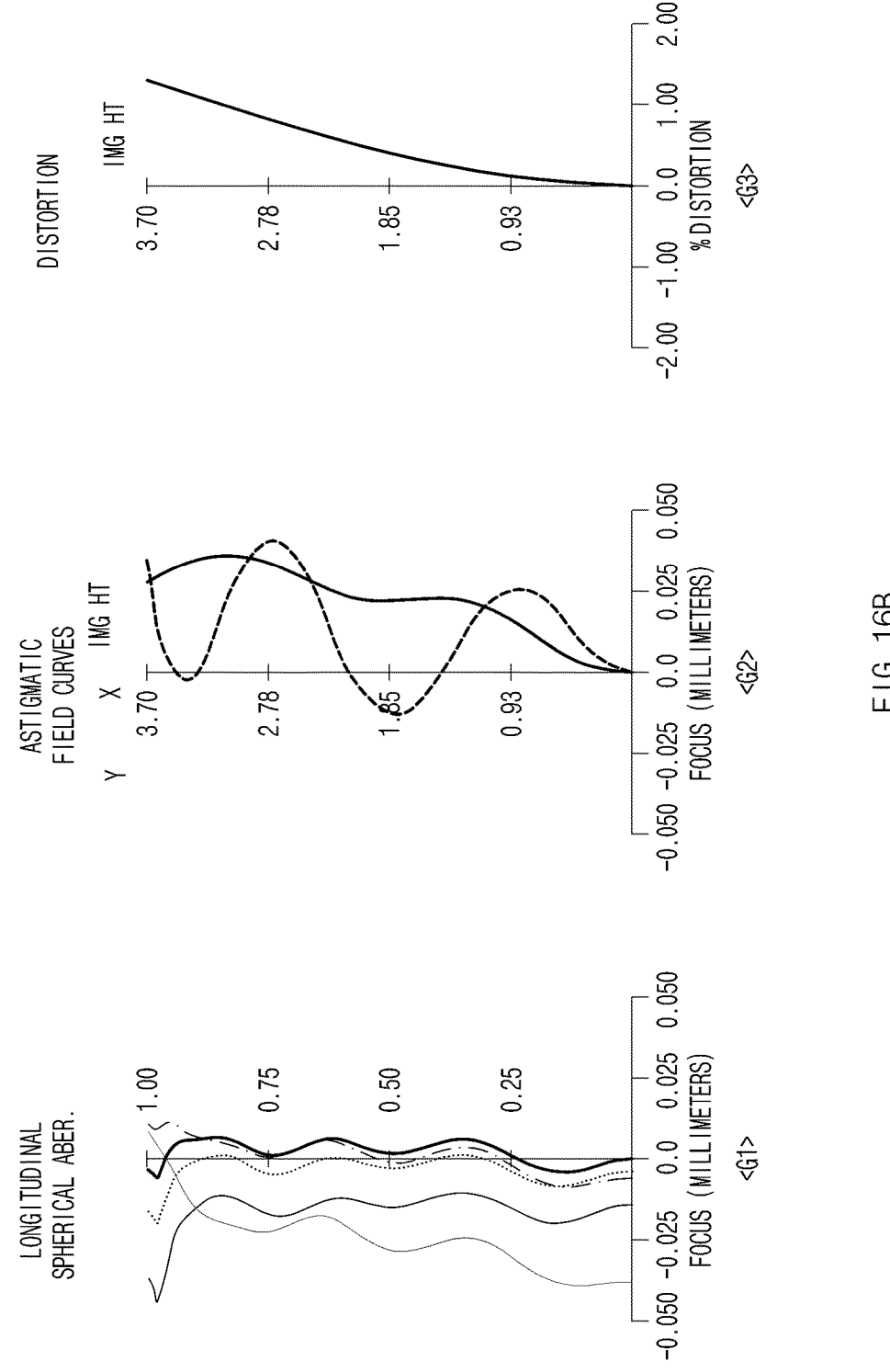
FIG. 16B is an aberration curve of the optical system of the camera according to the tenth embodiment.
Figure 16C:
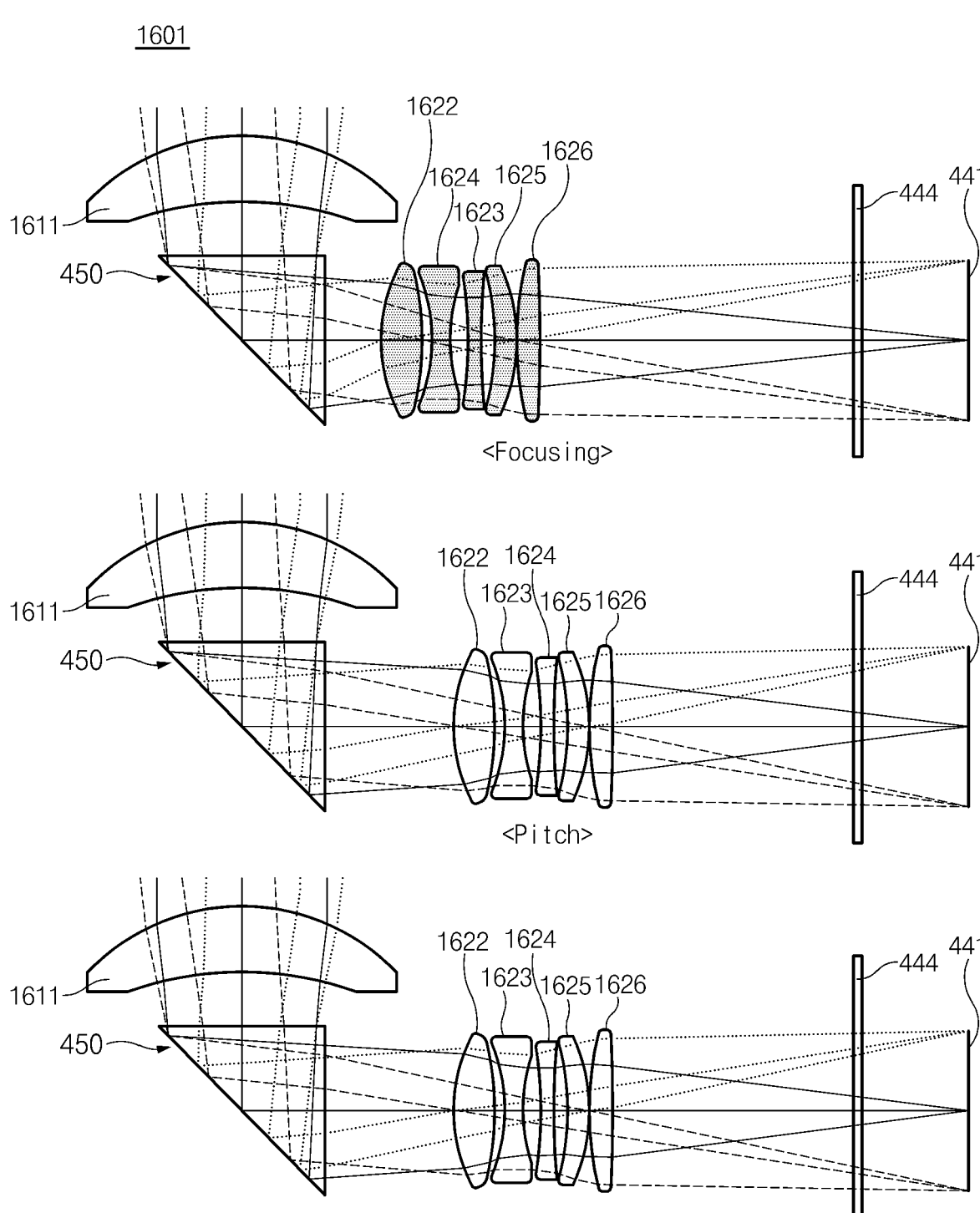
FIG. 16C is a view illustrating the optical system when the camera according to the tenth embodiment performs an auto focus function and an image stabilization function.

FIG. 16A is a view illustrating an optical system of a camera according to a tenth embodiment. FIG. 16B is an aberration curve of the optical system of the camera according to the tenth embodiment. FIG. 16C is a view illustrating the optical system when the camera according to the tenth embodiment performs an auto focus function and an image stabilization function.

Referring to FIG. 16A, the optical system 1601 of the camera according to the tenth embodiment may include a first one or more lenses 1610 (e.g., the first one or more lenses 1110 of FIG. 13A), a second one or more lenses 1620 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1601 according to the tenth embodiment may be configured such that lenses included in the second one or more lenses 1620 have different refractive powers (e.g., positive refractive power or negative refractive power).

In an embodiment, the first one or more lenses 1610 may include a first lens 1611 having positive refractive power.

In an embodiment, the second one or more lenses 1620 may have positive refractive power. The second one or more lenses 1620 may be disposed between the reflective member 450 and the image sensor 441 (or, the optical filter 444). The second one or more lenses 1620 may include a second lens 1622, a third lens 1623, a fourth lens 1624, a fifth lens 1625, and a sixth lens 1626 sequentially disposed from the reflective member 450 side. For example, the second one or more lenses 1620 may be configured such that the second lens 1622 is disposed closest to the reflective member 450 and the sixth lens 1626 is disposed closest to the image sensor 441. The third lens 1623, the fourth lens 1624, and the fifth lens 1625 may be disposed between the second lens 1622 and the sixth lens 1626.

The second one or more lenses 1620 of the optical system 1601 according to the tenth embodiment may include the second lens 1622 having positive refractive power, the third lens 1623 having negative refractive power, the fourth lens 1624 having negative refractive power, the fifth lens 1625 having negative refractive power, and the sixth lens 1626 having positive refractive power.

In certain embodiments, the camera 400 may be configured to adjust a focus position by moving the second one or more lenses 1620 or at least a part of the lenses included in the second one or more lenses 1620 in the direction of a second optical axis (e.g., the second optical axis OA2 of FIGS. 5 and 6). For example, the second one or more lenses 1620 may be entirely moved, or the separate lenses included in the second one or more lenses 1620 may be moved.

Likewise to the optical system 1101 according to the seventh embodiment, the optical system 1601 according to the tenth embodiment may satisfy Conditional expression 5, Conditional expression 6, and/or Conditional expression 7 described above. For example, in the optical system 1601 according to the tenth embodiment, the optical condition of the first lens 1611 calculated based on Conditional expression 5 may be "Fg1/Ft=1.477". In the optical system 1601 according to the tenth embodiment, the optical condition of the second lens 1621 calculated based on Conditional expression 6 may be "t/D=0.115". In the optical system 1601 according to the tenth embodiment, the optical condition of the second one or more lenses 1620 calculated based on Conditional expression 7 may be "Dmax/Da=1.00".

Referring to FIG. 16B, <G1> of FIG. 16B is a graph depicting spherical aberration of the optical system 1601 according to the tenth embodiment, <G2> of FIG. 16B is a graph depicting astigmatism of the optical system 1601 according to the tenth embodiment, and <G3> of FIG. 16B is a graph depicting distortion of the optical system 1601 according to the tenth embodiment.

<G1> of FIG. 16B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1427 nm, and light having a wavelength of 435.8343 nm.

<G2> of FIG. 16B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 16B is a graph depicting a distortion factor for light having a wavelength of 546.0740 nm. An image taken through the optical system 1601 according to the tenth embodiment may be somewhat distorted at a point out of the optical axis and may provide good optical characteristics with a distortion factor of less than about 2%.

Referring to FIG. 16C, the camera 400 may perform the auto focus function by moving all of the lenses included in the second one or more lenses 1620. The second one or more lenses 1620 (e.g., the second lens 1622, the third lens 1623, the fourth lens 1624, the fifth lens 1625, and the sixth lens 1626) having positive refractive power may move to an object side when a close shot is taken and may move to an upper side when a long shot is taken. For example, the second one or more lenses 1620 may move toward a light exit surface 453 of the reflective member 450 when a close shot is taken and may move toward the image sensor 441 when a long shot is taken.

Referring to FIG. 16C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA0.

Table 28 shows data of the optical system 1601 according to the tenth

TABLE 28

| Surf | Note | Radius of curvature (mm) | Thickness/ Distance (mm) | Nd Refractive index | Vd Abbe number | H-Ape |
|---|---|---|---|---|---|---|
| obj | object | infinity | infinity | | | |
| S1 | dummy | infinity | 0.00000 | | | 3.83837 |
| S2* | first lens | 7.21109 | 1.70000 | 1.54397 | 55.93 | 3.75000 |
| S3* | | 12.72537 | 1.12725 | | | 3.28779 |
| S4 | dummy | infinity | 0.29275 | | | 3.15555 |
| S5 | dummy | infinity | 0.00000 | | | 3.08062 |
| S6 | dummy | infinity | 0.00000 | | | 3.08062 |
| S7 | light incident surface | infinity | 2.25000 | 1.83400 | 37.34 | 3.94462 |
| S8 | reflective surface | infinity | −2.25000 | 1.83400 | 37.34 | 3.66231 |
| S9 | light exit surface | infinity | 0.00000 | | | 3.94462 |
| S10 | dummy | infinity | 0.00000 | | | 2.51519 |
| S11 | dummy | infinity | −3.43500 | | | 2.51519 |
| S12 | dummy | infinity | D1 | | | 1.91973 |
| S13* (sto) | second lens | −4.53765 | −1.10949 | 1.54397 | 55.93 | 1.86956 |
| S14* | | 7.20858 | −0.25908 | | | 1.74018 |
| S15* | third lens | 4.53742 | −0.50571 | 1.63916 | 23.52 | 1.66690 |
| S16* | | −4.79443 | −0.51158 | | | 1.55000 |
| S17* | fourth | 17.17669 | −0.36209 | 1.5348 | 55.71 | 1.56329 |
| S18* | lens | −24.52908 | −0.34305 | | | 1.65166 |
| S19* | fifth lens | 4.15227 | −0.56673 | 1.66075 | 20.38 | 1.67008 |
| S20* | | 4.72161 | −0.03 | | | 1.78474 |
| S21* | sixth lens | −5.00511 | −0.58751 | 1.63916 | 23.52 | 1.88453 |
| S22* | | 177.61206 | D2 | | | 1.9 |
| S23 | dummy | infinity | −6.49528 | | | 1.90667 |
| S24 | optical | infinity | −0.21 | 1.5168 | 64.2 | 2.99578 |
| S25 | filter | infinity | −2.87213 | | | 3.01878 |
| IMG | image sensor | infinity | 0 | | | 3.50042 |

The positive thickness/distance in Table 28 means that it is located on the first optical axis OA1, and the negative thickness/distance means that it is located on the second optical axis OA2 perpendicular to the first optical axis OAT. In Table 28, "*" represents that an optical surface is formed of an aspheric surface. In Table 28, IMG means an image plane of the image sensor.

In Table 28, S2 means an object-side surface of the first lens 1611 included in the first one or more lenses 1610. S3 means an upper-side surface (e.g., a surface facing toward the reflective member 450) of the first lens 1611.

In Table 28, S13 (sto) means an object-side surface (e.g., a surface facing toward the reflective member 450) of the second lens 1622 included in the second one or more lenses 1620 and means that an aperture is formed in the object-side surface of the second lens 1622. S14 means an upper-side surface (e.g., a surface facing toward the image sensor 441) of the second lens 1622. S15 means an object-side surface of the third lens 1623 included in the second one or more lenses 1620, and S16 means an upper-side surface of the third lens 1623. S17 means an object-side surface of the fourth lens 1624 included in the second one or more lenses 1620, and S18 means an upper-side surface of the fourth lens 1624. S19 means an object-side surface of the fifth lens 1625 included in the second one or more lenses 1620, and S20 means an upper-side surface of the fifth lens 1625. S21 means an object-side surface of the sixth lens 1626 included in the second one or more lenses 1620, and S22 means an upper-side surface of the sixth lens 1626.

In Table 28, S7, S8, and S9 mean a light incident surface 451, a reflective surface 452, and the light exit surface 453 included in the reflective member 450 (e.g., a prism). In Table 28, S24 and S25 mean an object-side surface and an upper-side surface of the optical filter.

Aspheric coefficients of the lenses according to the tenth embodiment may be represented as in Tables 29-1 and 29-2 below. The aspheric coefficients may be calculated based on Equation 1 described above.

TABLE 29-1

| Surf | K (Conic) | A | B | C | D |
|---|---|---|---|---|---|
| S2* | −4.12383E+00 | 2.24574E−03 | −1.61944E−04 | 4.22269E−05 | −6.06998E−06 |
| S3* | 6.38780E+00 | 1.07873E−03 | −2.86937E−04 | 1.05669E−04 | −2.03935E−05 |
| S13* | 2.18349E+00 | −1.33601E−03 | 2.35986E−05 | 2.99104E−03 | −4.86466E−03 |
| S14* | −2.98180E+00 | −1.86151E−02 | 3.06316E−02 | −2.93836E−02 | 1.66424E−02 |
| S15* | −2.07104E+00 | −1.27722E−02 | 4.08873E−02 | −3.64705E−02 | 8.86139E−03 |
| S16* | −3.33994E+00 | −1.62711E−03 | 5.85785E−03 | 1.26035E−02 | −1.59920E−02 |
| S17* | −1.06944E−02 | 1.24730E−02 | −2.49927E−02 | 4.48945E−02 | 4.56973E−03 |
| S18* | −9.90000E+01 | 4.96691E−03 | −9.80009E−03 | 2.02168E−02 | −1.22339E−02 |
| S19* | −1.57790E+01 | −6.17897E−03 | 1.77919E−02 | −1.07701E−02 | −2.27937E−02 |
| S20* | −1.43154E+00 | −9.09484E−03 | 1.63293E−02 | −9.06088E−03 | −3.47958E−03 |

TABLE 29-1-continued

| Surf | K (Conic) | A | B | C | D |
|---|---|---|---|---|---|
| S21* | −1.43861E+01 | 6.81641E−05 | 2.03714E−03 | −2.49692E−03 | 5.14971E−03 |
| S22* | 0.00000E+00 | 2.09644E−03 | −5.76620E−03 | 7.13275E−03 | −3.52105E−03 |

TABLE 29-2

| Surf | E | F | G | H | J |
|---|---|---|---|---|---|
| S2* | 4.94960E−07 | −1.66203E−08 | −3.45067E−10 | 4.26275E−11 | −8.93806E−13 |
| S3* | 2.17097E−06 | −9.48891E−08 | −2.73833E−09 | 4.32020E−10 | −1.20114E−11 |
| S13* | 3.90738E−03 | −1.80787E−03 | 4.90479E−04 | −7.26062E−05 | 4.51843E−06 |
| S14* | −5.88927E−03 | 1.30742E−03 | −1.50104E−04 | −2.98567E−06 | 2.08642E−06 |
| S15* | 5.26922E−03 | −4.07281E−03 | 1.03875E−03 | −1.07457E−04 | 2.99568E−06 |
| S16* | −4.92934E−03 | 1.37054E−02 | −7.08582E−03 | 1.48424E−03 | −1.07319E−04 |
| S17* | −6.16161E−02 | 5.43573E−02 | −2.07429E−02 | 3.64594E−03 | −2.30797E−04 |
| S18* | −1.66444E−03 | 4.37519E−03 | −1.69035E−03 | 2.56081E−04 | −1.23480E−05 |
| S19* | 4.52140E−02 | −3.34245E−02 | 1.24866E−02 | −2.35240E−03 | 1.77995E−04 |
| S20* | 9.52669E−03 | −6.45577E−03 | 2.11447E−03 | −3.44305E−04 | 2.23782E−05 |
| S21* | −4.35842E−03 | 1.80404E−03 | −4.00512E−04 | 4.62049E−05 | −2.18770E−06 |
| S22* | 8.25565E−04 | −7.66084E−05 | −1.99260E−06 | 6.48217E−07 | −1.11448E−08 |

Auto focus and OIS data of the optical system 1601 according to the tenth embodiment may be represented as in Table 30 below.

TABLE 30

| Auto-focus data | | |
|---|---|---|
| Object | infinity | 300 mm |
| D1 | 0 | 1.97000 |
| D2 | 0 | −1.97000 |

| Decenter data | |
|---|---|
| Decenter & Bend | Alpha |
| S8 | 45.000 |

| Global coordinates | | reference surface S5 |
|---|---|---|
| | Y | Z | Alpha |
| S11 | −2.25000 | 2.25000 | 90.000 |

| Pitch OIS 1.5 degree decenter data | | | | |
|---|---|---|---|---|
| Basic | Alpha | Beta | Gamma | z-offset |
| S5 | 0.950 | 0.000 | 0.000 | 2.250 |

| Yaw OIS 1.5 degree decenter data | | | | |
|---|---|---|---|---|
| Basic | Alpha | Beta | Gamma | z-offset |
| S5 | 0.000 | 0.000 | 1.750 | 2.250 |

Referring to Table 30, in the optical system 1601 according to the tenth embodiment, the second one or more lenses 1620 (e.g., the second lens 1622, the third lens 1623, the fourth lens 1624, the fifth lens 1625, and the sixth lens 1626) may move toward the reflective member 450 by a predetermined distance when a close shot is taken. Accordingly, the distance between the object-side surface S13 of the second lens 1622 and the light exit surface S9 of the reflective member 450 may be decreased, and the distance between the upper-side surface S22 of the sixth lens 1626 and the optical filter 444 may be increased. For example, when an image of a subject at infinity (e.g., a long shot) is taken, both D1 and D2 in Table 28 may be 0, and when an image of a subject at a distance of 300 mm (e.g., a close shot) is taken, D1 in Table 28 may be 1.97000, and D2 in Table 28 may be −1.97000. Accordingly, the distance between S9 and S13 is decreased, and the distance between S22 and S24 is increased. In the optical system 1601 according to the tenth embodiment, the reflective surface 452 or S8 of the reflective member 450 may form an angle of 45 degrees together with the optical axes OA1 and OA2.

Figure 17A:
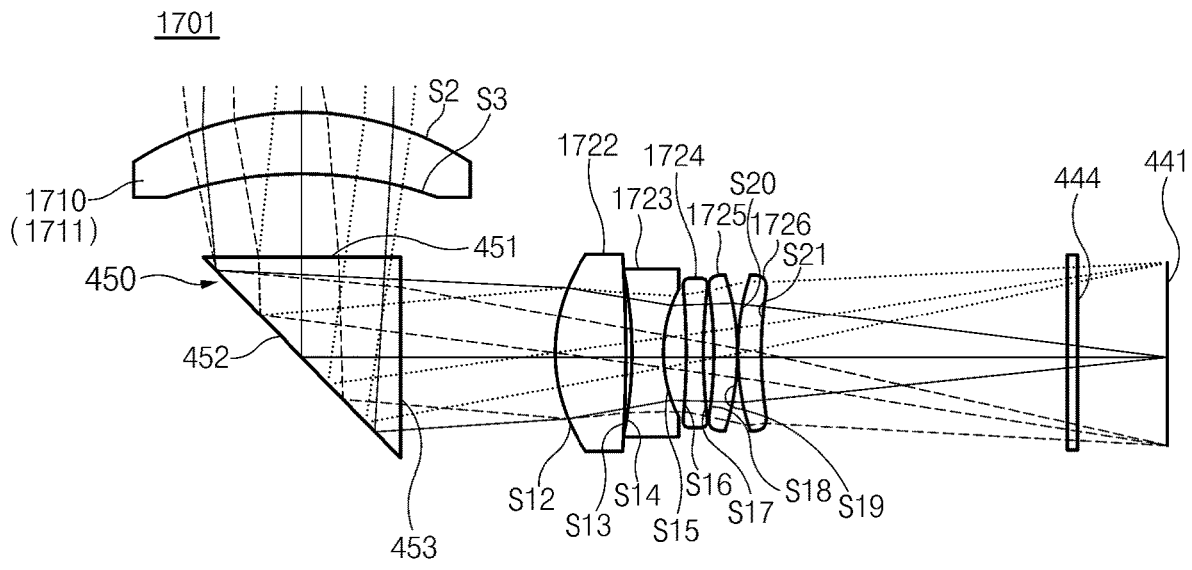
FIG. 17A is a view illustrating an optical system of a camera according to an eleventh embodiment.
Figure 17B:
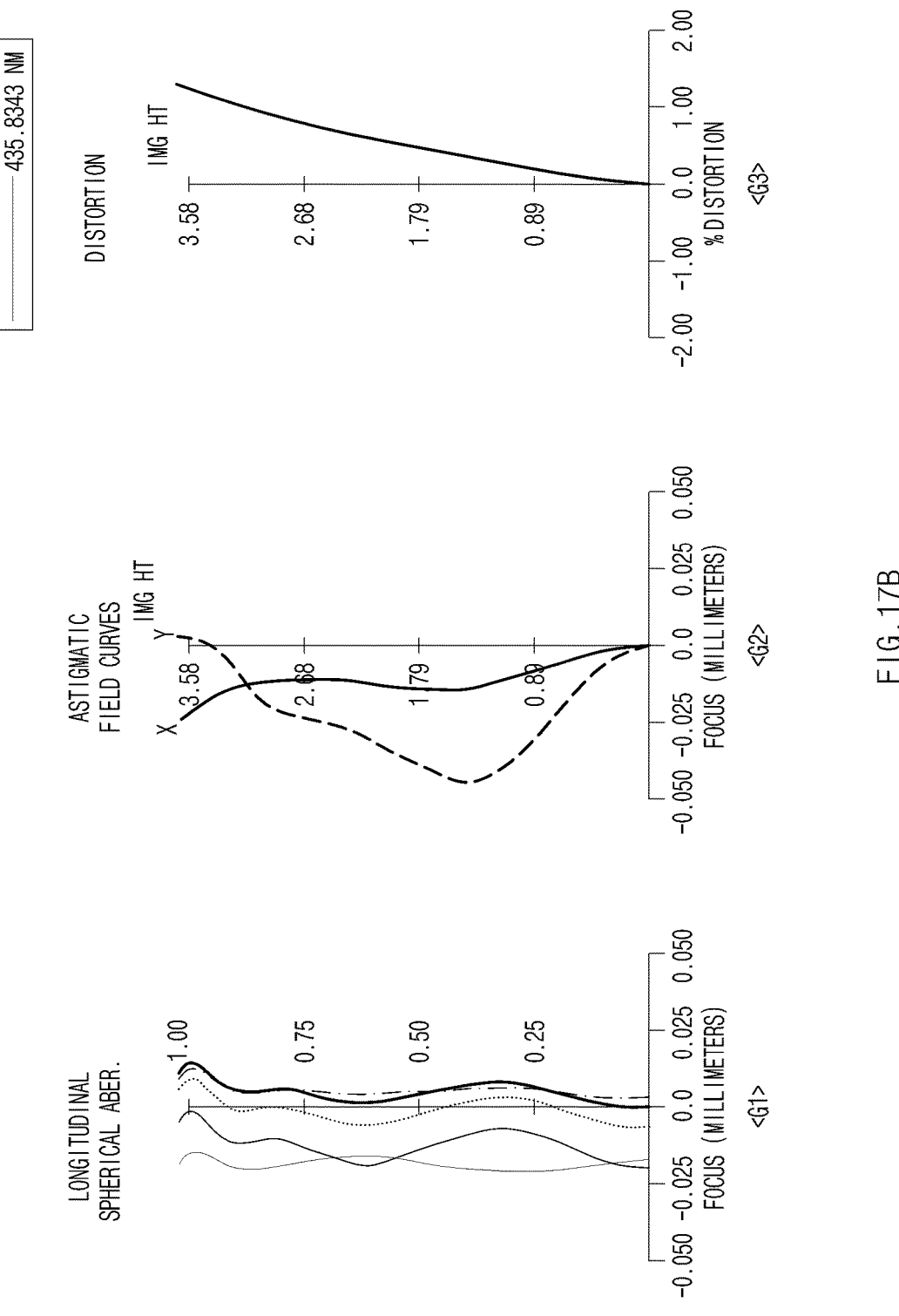
FIG. 17B is an aberration curve of the optical system of the camera according to the eleventh embodiment.
Figure 17C:
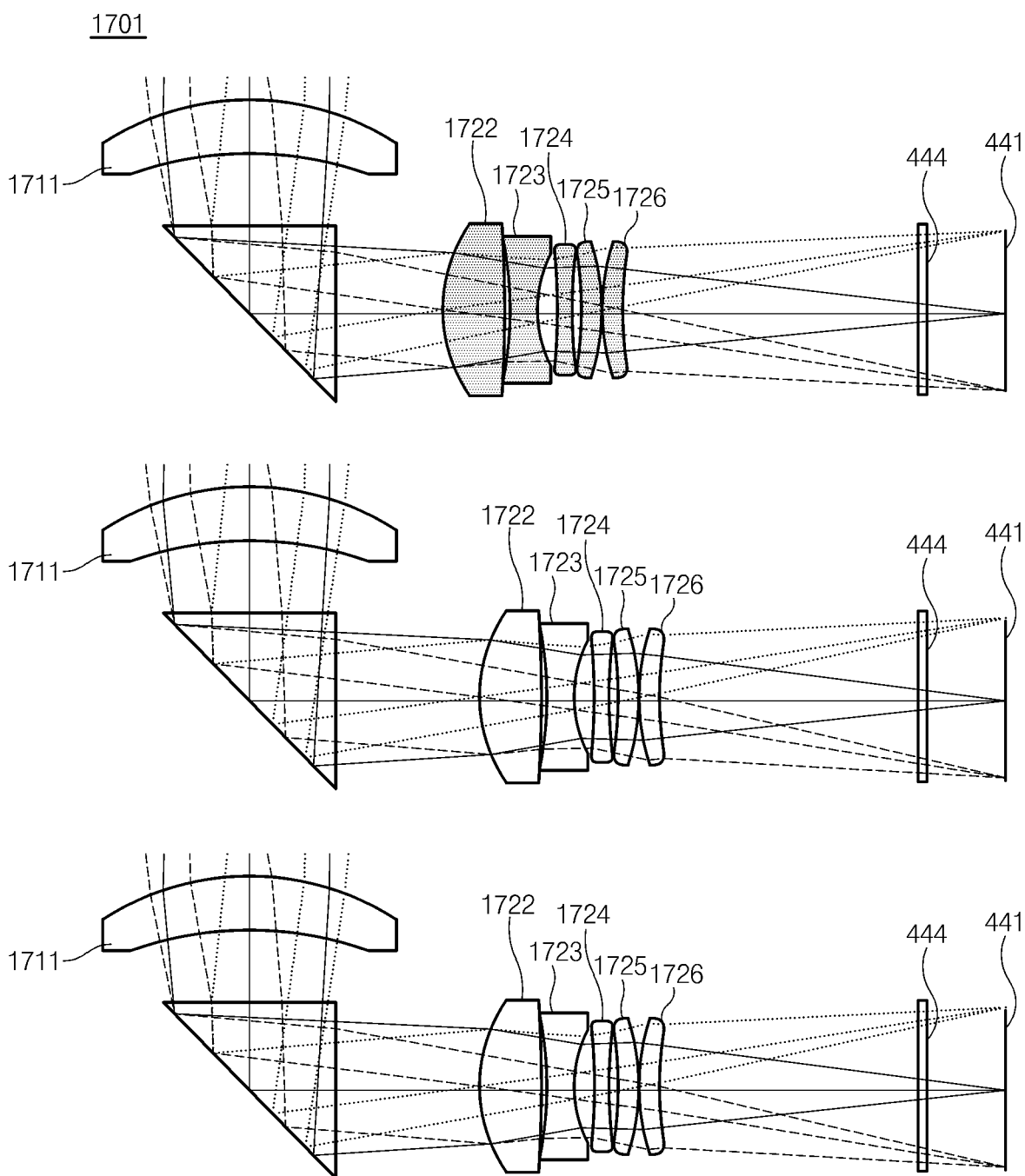
FIG. 17C is a view illustrating the optical system when the camera according to the eleventh embodiment performs an auto focus function and an image stabilization function.

FIG. 17A is a view illustrating an optical system of a camera according to an eleventh embodiment. FIG. 17B is an aberration curve of the optical system of the camera according to the eleventh embodiment. FIG. 17C is a view illustrating the optical system when the camera according to the eleventh embodiment performs an auto focus function and an image stabilization function.

Referring to FIG. 17A, the optical system 1701 of the camera according to the eleventh embodiment may include a first one or more lenses 1710 (e.g., the first one or more lenses 1110 of FIG. 13A), a second one or more lenses 1720 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1701 according to the eleventh embodiment may be configured such that lenses included in the second one or more lenses 1720 have different refractive powers (e.g., positive refractive power or negative refractive power).

In an embodiment, the first one or more lenses 1710 may include a first lens 1711 having positive refractive power.

In an embodiment, the second one or more lenses 1720 may have positive refractive power. The second one or more lenses 1720 may be disposed between the reflective member 450 and the image sensor 441 (or, the optical filter 444). The second one or more lenses 1720 may include a second lens 1722, a third lens 1723, a fourth lens 1724, a fifth lens 1725, and a sixth lens 1726 sequentially disposed from the reflective member 450 side. For example, the second one or more lenses 1720 may be configured such that the second lens 1722 is disposed closest to the reflective member 450, the sixth lens 1726 is disposed closest to the image sensor 441, and the third lend 1723, the fourth lens 1724, and the fifth lens 1725 are disposed between the second lens 1722 and the sixth lens 1726.

The second one or more lenses 1720 of the optical system 1701 according to the eleventh embodiment may include the second lens 1722 having positive refractive power, the third lens 1723 having negative refractive power, the fourth lens 1724 having negative refractive power, the fifth lens 1725 having positive refractive power, and the sixth lens 1726 having positive refractive power.

In certain embodiments, the camera 400 may be configured to adjust a focus position by moving the second one or more lenses 1720 or at least a part of the lenses included in the second one or more lenses 1720 in the direction of a second optical axis (e.g., the second optical axis OA2 of FIGS. 5 and 6). For example, the second one or more lenses 1720 may be entirely moved, or the separate lenses included in the second one or more lenses 1720 may be moved.

Likewise to the optical system 1101 according to the seventh embodiment, the optical system 1701 according to the eleventh embodiment may satisfy Conditional expression 5, Conditional expression 6, and/or Conditional expression 7 described above. For example, in the optical system 1701 according to the eleventh embodiment, the optical condition of the first lens 1711 calculated based on Conditional expression 8 may be "Fg1/Ft=1.939". In the optical system 1701 according to the eleventh embodiment, the optical condition of the second lens 1721 calculated based on Conditional expression 9 may be "t/D=0.145". In the optical system 1701 according to the eleventh embodiment, the optical condition of the second one or more lenses 1720 calculated based on Conditional expression 10 may be "Dmax/Da=1.00".

Referring to FIG. 7B, <G1> of FIG. 17B is a graph depicting spherical aberration of the optical system 1701 according to the eleventh embodiment, <G2> of FIG. 17B is a graph depicting astigmatism of the optical system 1701 according to the eleventh embodiment, and <G3> of FIG. 17B is a graph depicting distortion of the optical system 1701 according to the eleventh embodiment.

<G1> of FIG. 17B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1427 nm, and light having a wavelength of 435.8343 nm.

<G2> of FIG. 17B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 17B is a graph depicting a distortion factor for light having a wavelength of 546.0740 nm. An image taken through the optical system 1701 according to the eleventh embodiment may be somewhat distorted at a point out of the optical axis and may provide good optical characteristics with a distortion factor of less than about 2%.

Referring to FIG. 17C, the camera 400 may perform the auto focus function by moving all of the lenses included in the second one or more lenses 1720. The second one or more lenses 1720 (e.g., the second lens 1722, the third lens 1723, the fourth lens 1724, the fifth lens 1725, and the sixth lens 1726) having positive refractive power may move to an object side when a close shot is taken and may move to an upper side when a long shot is taken. For example, the second one or more lenses 1720 may move toward a light exit surface 453 of the reflective member 450 when a close shot is taken and may move toward the image sensor 441 when a long shot is taken.

Referring to FIG. 17C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA1.

Table 31 shows data of the optical system 1701 according to the eleventh embodiment.

TABLE 31

| Surf | Note | Radius of curvature (mm) | Thickness/ Distance (mm) | Nd Refractive index | Vd Abbe number | H-Ape |
|---|---|---|---|---|---|---|
| obj | object | infinity | infinity | | | |
| S1 | dummy | infinity | 0.00000 | | | 3.55929 |
| S2* | first lens | 8.25610 | 1.50512 | 1.53480 | 55.71 | 3.59985 |
| S3* | | 13.46880 | 1.69000 | | | 3.13529 |
| S4 | dummy | infinity | 0.19488 | | | 2.90310 |
| S5 | dummy | infinity | 0.00000 | | | 2.86947 |
| S6 | dummy | infinity | 0.00000 | | | 2.86947 |
| S7 | light incident surface | infinity | 2.25000 | 1.78472 | 25.72 | 5.38516 |
| S8 | reflective surface | infinity | −2.25000 | 1.78472 | 25.72 | 2.75060 |
| S9 | light exit surface | infinity | 0.00000 | | | 3.23749 |
| S10 | dummy | infinity | −3.60000 | | | 2.50119 |
| S11 | dummy | infinity | D1 | | | 2.14410 |
| S12* (sto) | second lens | −4.00326 | −1.65984 | 1.54397 | 55.93 | 2.09266 |
| S13* | | 13.79095 | −0.16023 | | | 1.83301 |

TABLE 31-continued

| Surf | Note | Radius of curvature (mm) | Thickness/ Distance (mm) | Nd Refractive index | Vd Abbe number | H-Ape |
|------|------|------|------|------|------|------|
| S14* | third lens | 9.93625 | −0.73569 | 1.63916 | 23.52 | 1.78830 |
| S15* | | −3.08611 | −0.52572 | | | 1.53482 |
| S16* | fourth | 30.13121 | −0.45085 | 1.54397 | 55.93 | 1.53241 |
| S17* | lens | −18.28929 | −0.22074 | | | 1.56009 |
| S18* | fifth lens | 18.29382 | −0.51105 | 1.66075 | 20.38 | 1.57440 |
| S19* | | 8.64404 | −0.03 | | | 1.63399 |
| S20* | sixth lens | −5.08997 | −0.57774 | 1.63916 | 23.52 | 1.68323 |
| S21* | | −20.3951 | D2 | | | 1.70002 |
| S22 | dummy | infinity | −7 | | | 1.69118 |
| S23 | optical | infinity | −0.21 | 1.5168 | 64.2 | 3.12283 |
| S24 | filter | infinity | −2.06823 | | | 3.15089 |
| IMG | image sensor | infinity | 0 | | | 3.5755 |

The positive thickness/distance in Table 31 means that it is located on the first optical axis OA1, and the negative thickness/distance means that it is located on the second optical axis OA2 perpendicular to the first optical axis OA1. In Table 31, "*" represents that an optical surface is formed of an aspheric surface. In Table 31, IMG means an image plane of the image sensor.

In Table 31, S2 means an object-side surface of the first lens 1711 included in the first one or more lenses 1710. S3 means an upper-side surface (e.g., a surface facing toward the reflective member 450) of the first lens 1711.

In Table 31, S12 (sto) means an object-side surface (e.g., a surface facing toward the reflective member 450) of the second lens 1722 included in the second one or more lenses 1720 and means that an aperture is formed in the object-side surface of the second lens 1722. S13 means an upper-side surface (e.g., a surface facing toward the image sensor 441) of the second lens 1722. S14 means an object-side surface of the third lens 1723 included in the second one or more lenses 1720, and S15 means an upper-side surface of the third lens 1723. S16 means an object-side surface of the fourth lens 1724 included in the second one or more lenses 1720, and S17 means an upper-side surface of the fourth lens 1724. S18 means an object-side surface of the fifth lens 1725 included in the second one or more lenses 1720, and S19 means an upper-side surface of the fifth lens 1725. S20 means an object-side surface of the sixth lens 1726 included in the second one or more lenses 1720, and S21 means an upper-side surface of the sixth lens 1726.

In Table 31, S7, S8, and S9 mean a light incident surface 451, a reflective surface 452, and the light exit surface 453 included in the reflective member 450 (e.g., a prism). In Table 31, S23 and S24 mean an object-side surface and an upper-side surface of the optical filter.

Aspheric coefficients of the lenses according to the eleventh embodiment may be represented as in Tables 32-1 and 32-2 below. The aspheric coefficients may be calculated based on Equation 1 described above.

TABLE 32-1

| Surf | K (Conic) | A | B | C | D |
|------|------|------|------|------|------|
| S2* | −5.51993E+00 | 1.99699E−03 | −3.06028E−04 | 1.11323E−04 | −2.54775E−05 |
| S3* | 6.85010E+00 | 7.63779E−04 | −4.67683E−04 | 2.23646E−04 | −6.34574E−05 |
| S12* | 1.15175E+00 | 5.28648E−04 | 2.09141E−03 | −1.99907E−03 | 1.40804E−03 |
| S13* | −1.97179E+01 | −1.61740E−02 | 3.03970E−02 | −3.74175E−02 | 2.56075E−02 |
| S14* | −9.16437E+00 | −5.78392E−03 | 3.63932E−02 | −6.17599E−02 | 5.18771E−02 |
| S15* | −1.92258E+00 | 1.20889E−02 | 8.89399E−03 | −2.63230E−02 | 1.16884E−02 |
| S16* | −2.29831E+00 | 2.29414E−02 | −4.14180E−02 | 8.67766E−02 | −1.14506E−01 |
| S17* | −4.59063E−01 | 5.91247E−02 | −1.36672E−01 | 1.64010E−01 | −1.03329E−01 |
| S18* | −4.64220E−01 | 6.79655E−02 | −1.20921E−01 | 7.42127E−02 | 3.09164E−02 |
| S19* | 2.68846E+00 | 6.76386E−02 | −1.11918E−01 | 8.08018E−02 | −1.06418E−02 |
| S20* | −4.92502E+00 | 2.76715E−02 | −6.07407E−02 | 6.70681E−02 | −4.35003E−02 |
| S21* | 0.00000E+00 | −1.22980E−02 | 2.49253E−02 | −2.80766E−02 | 2.10422E−02 |

TABLE 32-2

| Surf | E | F | G | H | J |
|------|------|------|------|------|------|
| S2* | 3.75234E−06 | −3.51915E−07 | 2.03407E−08 | −6.59770E−10 | 9.18853E−12 |
| S3* | 1.14360E−05 | −1.30787E−06 | 9.19297E−08 | −3.61857E−09 | 6.10410E−11 |
| S12* | −6.44401E−04 | 1.92378E−04 | −3.56284E−05 | 3.67967E−06 | −1.59755E−07 |
| S13* | −9.95579E−03 | 2.15292E−03 | −2.32470E−04 | 8.16619E−06 | 2.19011E−07 |
| S14* | −2.51492E−02 | 7.30960E−03 | −1.25403E−03 | 1.17097E−04 | −4.59561E−06 |
| S15* | 6.60200E−03 | −8.65640E−03 | 3.52748E−03 | −6.48955E−04 | 4.55155E−05 |
| S16* | 8.65022E−02 | −3.75764E−02 | 9.07853E−03 | −1.07863E−03 | 4.33877E−05 |
| S17* | 2.59516E−02 | 5.45203E−03 | −5.13206E−03 | 1.19568E−03 | −9.65366E−05 |
| S18* | −7.63034E−02 | 4.97032E−02 | −1.60142E−02 | 2.59333E−03 | −1.67663E−04 |
| S19* | −2.42827E−02 | 1.85158E−02 | −6.07189E−03 | 9.80998E−04 | −6.37949E−05 |

TABLE 32-2-continued

| Surf | E | F | G | H | J |
|------|------|------|------|------|------|
| S20* | 1.72557E−02 | −4.16666E−03 | 5.84244E−04 | −4.23136E−05 | 1.14409E−06 |
| S21* | −1.04399E−02 | 3.33760E−03 | −6.53927E−04 | 7.06613E−05 | −3.19992E−06 |

Auto focus and OIS data of the optical system 1701 according to the eleventh embodiment may be represented as in Table 33 below.

TABLE 33

| Auto-focus data | | |
|------|------|------|
| Object | infinity | 500 mm |
| D1 | 0 | 0.95000 |
| D2 | 0 | −0.95000 |

| Decenter data | |
|------|------|
| Decenter & Bend | Alpha |
| S8 | 45.000 |

| Global coordinates | | reference surface S5 | |
|------|------|------|------|
| | Y | Z | Alpha |
| S10 | −2.25000 | 2.25000 | 90.000 |

| Pitch OIS 1.5 degree decenter data | | | | |
|------|------|------|------|------|
| Basic | Alpha | Beta | Gamma | z-offset |
| S6 | 0.900 | 0.000 | 0.000 | 2.250 |

| Yaw OIS 1.5 degree decenter data | | | | |
|------|------|------|------|------|
| Basic | Alpha | Beta | Gamma | z-offset |
| S6 | 0.000 | 0.000 | 1.710 | 2.250 |

Referring to Table 33, in the optical system 1701 according to the eleventh embodiment, the second one or more lenses 1720 (e.g., the second lens 1722, the third lens 1723, the fourth lens 1724, the fifth lens 1725, and the sixth lens 1726) may move toward the reflective member 450 by a predetermined distance when a close shot is taken. Accordingly, the distance between the object-side surface S12 of the second lens 1722 and the light exit surface S9 of the reflective member 450 may be decreased, and the distance between the upper-side surface S21 of the sixth lens 1726 and the optical filter 444 may be increased. For example, when an image of a subject at infinity (e.g., a long shot) is taken, both D1 and D2 in Table 31 may be 0, and when an image of a subject at a distance of 500 mm (e.g., a close shot) is taken, D1 in Table 31 may be 0.95000, and D2 in Table 31 may be −0.95000. Accordingly, the distance between S9 and S12 is decreased, and the distance between S21 and S23 is increased. In the optical system 1701 according to the eleventh embodiment, the reflective surface 452 or S8 of the reflective member 450 may form an angle of 45 degrees together with the optical axes OA1 and OA2.

Figure 18A:
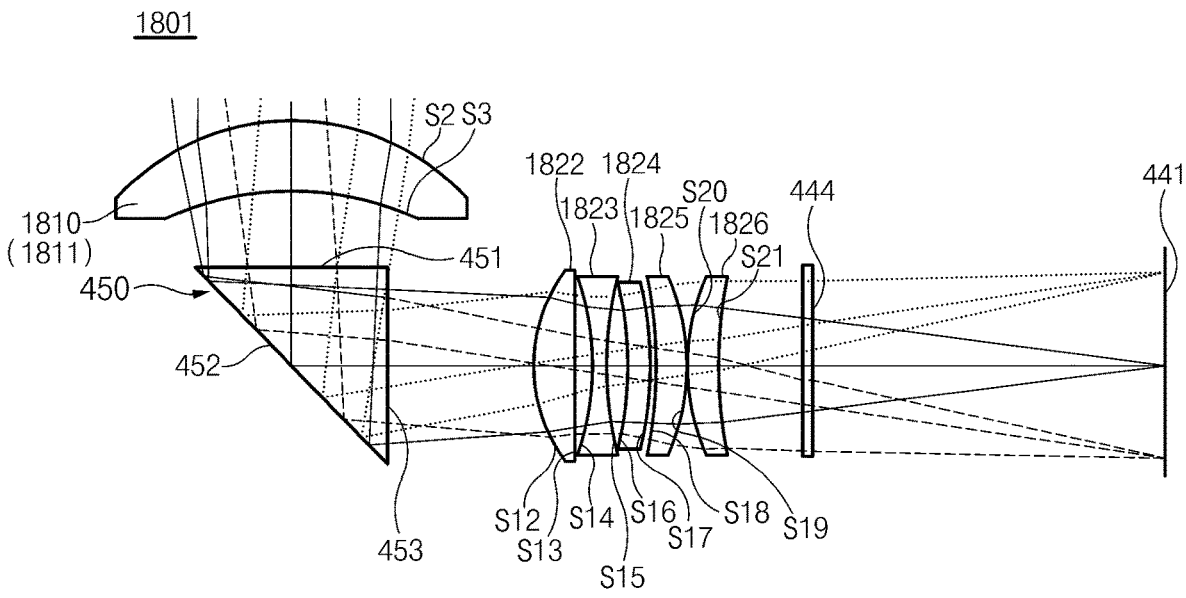
FIG. 18A is a view illustrating an optical system of a camera according to a twelfth embodiment.
Figure 18B:
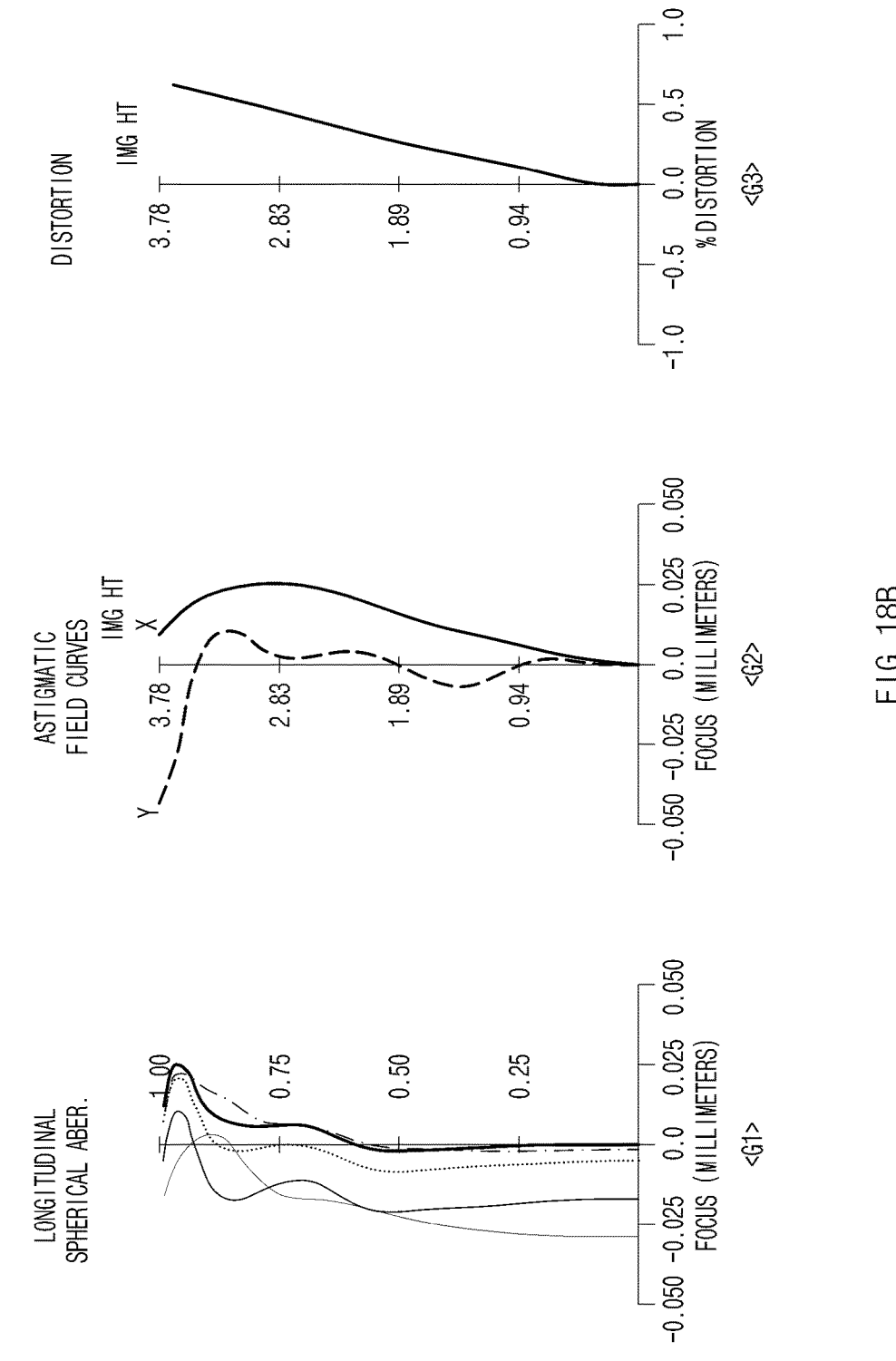
FIG. 18B is an aberration curve of the optical system of the camera according to the twelfth embodiment.
Figure 18C:
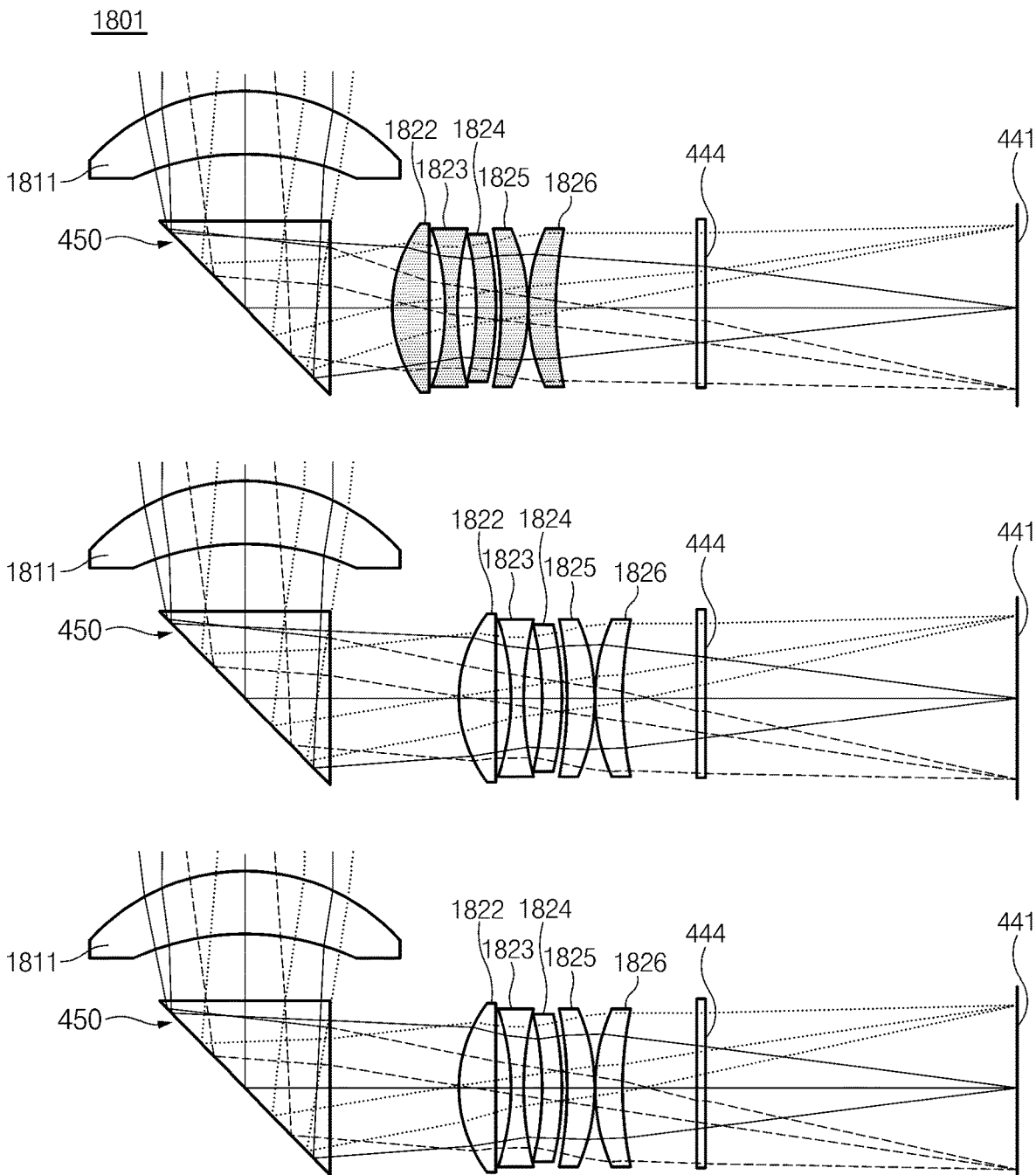
FIG. 18C is a view illustrating the optical system when the camera according to the twelfth embodiment performs an auto focus function and an image stabilization function.

FIG. 18A is a view illustrating an optical system of a camera according to a twelfth embodiment. FIG. 18B is an aberration curve of the optical system of the camera according to the twelfth embodiment. FIG. 18C is a view illustrating the optical system when the camera according to the twelfth embodiment performs an auto focus function and an image stabilization function.

Referring to FIG. 18A, the optical system 1801 of the camera according to the twelfth embodiment may include a first one or more lenses 1810 (e.g., the first one or more lenses 1110 of FIG. 13A), a second one or more lenses 1820 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1801 according to the twelfth embodiment may be configured such that lenses included in the second one or more lenses 1820 have different refractive powers (e.g., positive refractive power or negative refractive power).

In an embodiment, the first one or more lenses 1810 may include a first lens 1811 having positive refractive power.

In an embodiment, the second one or more lenses 1820 may have positive refractive power. The second one or more lenses 1820 may be disposed between the reflective member 450 and the image sensor 441 (or, the optical filter 444). The second one or more lenses 1820 may include a second lens 1822, a third lens 1823, a fourth lens 1824, a fifth lens 1825, and a sixth lens 1826 sequentially disposed from the reflective member 450 side. For example, the second one or more lenses 1820 may be configured such that the second lens 1822 is disposed closest to the reflective member 450, the sixth lens 1826 is disposed closest to the image sensor 441, and the third lend 1823, the fourth lens 1824, and the fifth lens 1825 are disposed between the second lens 1822 and the sixth lens 1826.

The second one or more lenses 1820 of the optical system 1801 according to the twelfth embodiment may include the second lens 1822 having positive refractive power, the third lens 1823 having negative refractive power, the fourth lens 1824 having negative refractive power, the fifth lens 1825 having negative refractive power, and the sixth lens 1826 having positive refractive power.

In certain embodiments, the camera 400 may be configured to adjust a focus position by moving the second one or more lenses 1820 or at least a part of the lenses included in the second one or more lenses 1820 in the direction of a second optical axis (e.g., the second optical axis OA2 of FIGS. 5 and 6). For example, the second one or more lenses 1820 may be entirely moved, or the separate lenses included in the second one or more lenses 1820 may be moved.

Likewise to the optical system 1101 according to the seventh embodiment, the optical system 1801 according to the twelfth embodiment may satisfy Conditional expression 5, Conditional expression 6, and/or Conditional expression 7 described above. For example, in the optical system 1801 according to the twelfth embodiment, the optical condition of the first lens 1811 calculated based on Conditional expression 5 may be "Fg1/Ft=1.752". In the optical system 1801 according to the twelfth embodiment, the optical condition of the second lens 1821 calculated based on Conditional expression 6 may be "t/D=0.135". In the optical system 1801 according to the twelfth embodiment, the optical condition of the second one or more lenses 1820 calculated based on Conditional expression 7 may be "Dmax/Da=1.00".

Referring to FIG. 18B, <G1> of FIG. 18B is a graph depicting spherical aberration of the optical system 1801 according to the twelfth embodiment, <G2> of FIG. 18B is a graph depicting astigmatism of the optical system 1801 according to the twelfth embodiment, and <G3> of FIG. 18B is a graph depicting distortion of the optical system 1801 according to the twelfth embodiment.

<G1> of FIG. 18B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1427 nm, and light having a wavelength of 435.8343 nm.

<G2> of FIG. 18B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 18B is a graph depicting a distortion factor for light having a wavelength of 546.0740 nm. An image taken through the optical system 1801 according to the twelfth embodiment may be somewhat distorted at a point out of the optical axis and may provide good optical characteristics with a distortion factor of less than about 1%.

Referring to FIG. 18C, the camera 400 may perform the auto focus function by moving all of the lenses included in the second one or more lenses 1820. The second one or more lenses 1820 (e.g., the second lens 1822, the third lens 1823, the fourth lens 1824, the fifth lens 1825, and the sixth lens 1826) having positive refractive power may move to an object side when a close shot is taken and may move to an upper side when a long shot is taken. For example, the second one or more lenses 1820 may move toward a light exit surface 453 of the reflective member 450 when a close shot is taken and may move toward the image sensor 441 when a long shot is taken.

Referring to FIG. 18C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA1.

Table 34 shows data of the optical system 1801 according to the twelfth embodiment.

TABLE 34

| Surf | Note | Radius of curvature (mm) | Thickness/ Distance (mm) | Nd Refractive index | Vd Abbe number | H-Ape |
|---|---|---|---|---|---|---|
| obj | object | infinity | infinity | | | |
| S1 | dummy | infinity | 0.00000 | | | 3.87082 |
| S2* | first lens | 6.92391 | 1.70000 | 1.54397 | 55.93 | 3.75000 |
| S3* | | 10.34291 | 1.12725 | | | 3.24848 |
| S4 | dummy | infinity | 0.56275 | | | 3.13829 |
| S5 | dummy | infinity | 0.00000 | | | 2.99498 |
| S6 | dummy | infinity | 0.00000 | | | 2.99498 |
| S7 | light incident surface | infinity | 2.25000 | 1.83481 | 42.72 | 3.81476 |
| S8 | reflective surface | infinity | −2.25000 | −1.83481 | 42.72 | 2.83467 |
| S9 | light exit surface | infinity | 0.00000 | | | 3.30044 |
| S10 | dummy | infinity | −3.44161 | | | 2.44285 |
| S11 | dummy | infinity | D1 | | | 1.99976 |
| S12* (sto) | second lens | −4.19693 | −0.98511 | −1.54397 | 55.93 | 1.95170 |
| S13* | | 26.61468 | −0.33557 | | | 1.83745 |
| S14* | third lens | 3.85452 | −0.40000 | −1.63916 | 23.52 | 1.80100 |
| S15* | | −7.57406 | −0.49415 | | | 1.69047 |
| S16* | fourth lens | 11.50033 | −0.45 | −1.54397 | 55.93 | 1.67317 |
| S17* | | 11.8853 | −0.19912 | | | 1.72802 |
| S18* | fifth lens | 5.19242 | −0.68449 | −1.66075 | 20.38 | 1.73593 |
| S19* | | 5.71916 | −0.03 | | | 1.825 |
| S20* | sixth lens | −3.97094 | −0.72645 | −1.63916 | 23.52 | 2.06552 |
| S21* | | −11.43634 | D2 | | | 2.10127 |
| S22 | dummy | infinity | −2 | | | 2.07994 |
| S23 | optical | infinity | −0.21 | −1.5168 | 64.2 | 2.40041 |
| S24 | filter | infinity | −8.37351 | | | 2.42241 |
| IMG | image sensor | infinity | 0 | | | 3.775 |

The positive thickness/distance in Table 34 means that it is located on the first optical axis OA1, and the negative thickness/distance means that it is located on the second optical axis OA2 perpendicular to the first optical axis OA1. In Table 34, "*" represents that an optical surface is formed of an aspheric surface. In Table 34, IMG means an image plane of the image sensor.

In Table 34, S2 means an object-side surface of the first lens 1811 included in the first one or more lenses 1810. S3 means an upper-side surface (e.g., a surface facing toward the reflective member 450) of the first lens 1811.

In Table 34, S12 (sto) means an object-side surface (e.g., a surface facing toward the reflective member 450) of the second lens 1822 included in the second one or more lenses 1820 and means that an aperture is formed in the object-side surface of the second lens 1822. S13 means an upper-side surface (e.g., a surface facing toward the image sensor 441) of the second lens 1822. S14 means an object-side surface of the third lens 1823 included in the second one or more lenses 1820, and S15 means an upper-side surface of the third lens 1823. S16 means an object-side surface of the fourth lens 1824 included in the second one or more lenses 1820, and S17 means an upper-side surface of the fourth lens 1824. S18 means an object-side surface of the fifth lens 1825 included in the second one or more lenses 1820, and S19 means an upper-side surface of the fifth lens 1825. S20 means an object-side surface of the sixth lens 1826 included in the second one or more lenses 1820, and S21 means an upper-side surface of the sixth lens 1826.

In Table 34, S7, S8, and S9 mean a light incident surface 451, a reflective surface 452, and the light exit surface 453 included in the reflective member 450 (e.g., a prism). In Table 34, S23 and S24 mean an object-side surface and an upper-side surface of the optical filter.

Aspheric coefficients of the lenses according to the twelfth embodiment may be represented as in Tables 35-1 and 35-2 below. The aspheric coefficients may be calculated based on Equation 1 described above.

TABLE 35-1

| Surf | K (Conic) | A | B | C | D |
|------|-----------|---|---|---|---|
| S2* | −2.74781E+00 | 1.41583E−03 | 6.44815E−05 | −8.49482E−06 | 4.40992E−08 |
| S3* | 6.39489E+00 | −1.17846E−04 | 2.32038E−04 | −9.42720E−05 | 2.35145E−05 |
| S12* | 1.60527E+00 | 1.19361E−03 | 2.34434E−03 | −3.38807E−03 | 3.05532E−03 |
| S13* | −2.51944E+00 | −2.51701E−03 | 1.41919E−02 | −2.33771E−02 | 2.08915E−02 |
| S14* | −8.66128E+00 | 3.00622E−03 | 1.93682E−02 | −5.37168E−02 | 5.97585E−02 |
| S15* | 1.51171E+00 | 8.01637E−03 | 9.53213E−03 | −3.37218E−02 | 2.61751E−02 |
| S16* | −1.42803E+00 | 3.77138E−02 | −1.28961E−02 | 1.59706E−02 | −4.82566E−02 |
| S17* | 5.63563E−01 | 3.39109E−02 | −3.85850E−02 | 4.53467E−02 | −6.32224E−02 |
| S18* | −6.17688E+00 | 1.57413E−02 | −2.74456E−02 | 2.78721E−02 | −2.88538E−02 |
| S19* | 2.68457E+00 | 3.31681E−02 | −3.45939E−02 | 1.71159E−02 | −1.31917E−03 |
| S20* | −7.64119E+00 | 1.96505E−02 | −1.87895E−02 | 6.97341E−03 | 3.26628E−03 |
| S21* | 0.00000E+00 | −7.22696E−03 | 1.69886E−02 | −1.81227E−02 | 1.32183E−02 |

TABLE 35-2

| Surf | E | F | G | H | J |
|------|---|---|---|---|---|
| S2* | 2.97623E−07 | −5.23805E−08 | 4.21329E−09 | −1.67327E−10 | 2.67704E−12 |
| S3* | −3.51646E−06 | 3.17653E−07 | −1.68044E−08 | 4.75803E−10 | −5.62521E−12 |
| S12* | −1.67256E−03 | 5.48426E−04 | −1.05608E−04 | 1.09736E−05 | −4.70177E−07 |
| S13* | −1.11959E−02 | 3.59996E−03 | −6.76423E−04 | 6.84373E−05 | −2.88207E−06 |
| S14* | −3.68358E−02 | 1.35220E−02 | −2.94354E−03 | 3.51664E−04 | −1.78144E−05 |
| S15* | −5.90590E−03 | −2.50874E−03 | 1.81900E−03 | −4.11478E−04 | 3.36531E−05 |
| S16* | 5.30122E−02 | −2.89758E−02 | 8.68829E−03 | −1.37533E−03 | 9.04036E−05 |
| S17* | 5.86460E−02 | −3.22246E−02 | 1.02486E−02 | −1.74533E−03 | 1.23057E−04 |
| S18* | 2.82152E−02 | −1.78818E−02 | 6.40062E−03 | −1.18532E−03 | 8.85434E−05 |
| S19* | −1.84600E−03 | 4.52462E−04 | 8.37652E−05 | −4.17639E−05 | 4.09670E−06 |
| S20* | −4.37480E−03 | 1.90455E−03 | −4.27300E−04 | 4.95618E−05 | −2.35264E−06 |
| S21* | −6.24749E−03 | 1.87558E−03 | −3.45070E−04 | 3.53852E−05 | −1.54359E−06 |

Auto focus and OIS data of the optical system 1801 according to the twelfth embodiment may be represented as in Table 36 below.

TABLE 36

| Auto-focus data | | |
|---|---|---|
| Object | infinity | 300 mm |
| D1 | 0 | 1.65500 |
| D2 | 0 | −1.65500 |

| Decenter data | |
|---|---|
| Decenter & Bend | Alpha |
| S8 | 45.000 |

| Global coordinates | reference surface S5 | | |
|---|---|---|---|
| | Y | Z | Alpha |
| S10 | −2.25000 | 2.25000 | 90.000 |

| Pitch OIS 1.5 degree decenter data | | | | |
|---|---|---|---|---|
| Basic | Alpha | Beta | Gamma | z-offset |
| S6 | 0.910 | 0.000 | 0.000 | 2.250 |

| Yaw OIS 1.5 degree decenter data | | | | |
|---|---|---|---|---|
| Basic | Alpha | Beta | Gamma | z-offset |
| S6 | 0.000 | 0.000 | 1.750 | 2.250 |

Referring to Table 36, in the optical system 1801 according to the twelfth embodiment, the second one or more lenses 1820 (e.g., the second lens 1822, the third lens 1823, the fourth lens 1824, the fifth lens 1825, and the sixth lens 1826) may move toward the reflective member 450 by a predetermined distance when a close shot is taken. Accordingly, the distance between the object-side surface S12 of the second lens 1822 and the light exit surface S9 of the reflective member 450 may be decreased, and the distance between the upper-side surface S21 of the sixth lens 1826 and the optical filter 444 may be increased. For example, when an image of a subject at infinity (e.g., a long shot) is taken, both D1 and D2 in Table 34 may be 0, and when an image of a subject at a distance of 300 mm (e.g., a close shot) is taken, D1 in Table 34 may be 1.65500, and D2 in Table 34 may be −1.65500. Accordingly, the distance between S9 and S12 is decreased, and the distance between S21 and S23 is increased. In the optical system 1801 according to the twelfth embodiment, the reflective surface 452 or S8 of the reflective member 450 may form an angle of 45 degrees together with the optical axes OA1 and OA2.

Figure 19A:
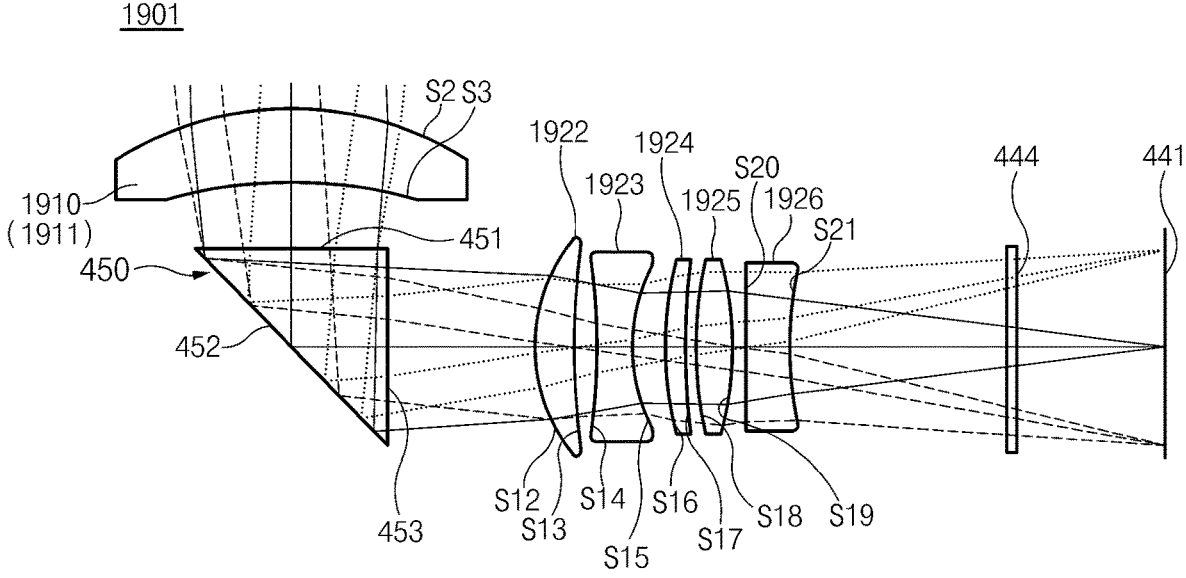
FIG. 19A is a view illustrating an optical system of a camera according to a thirteenth embodiment.
Figure 19B:
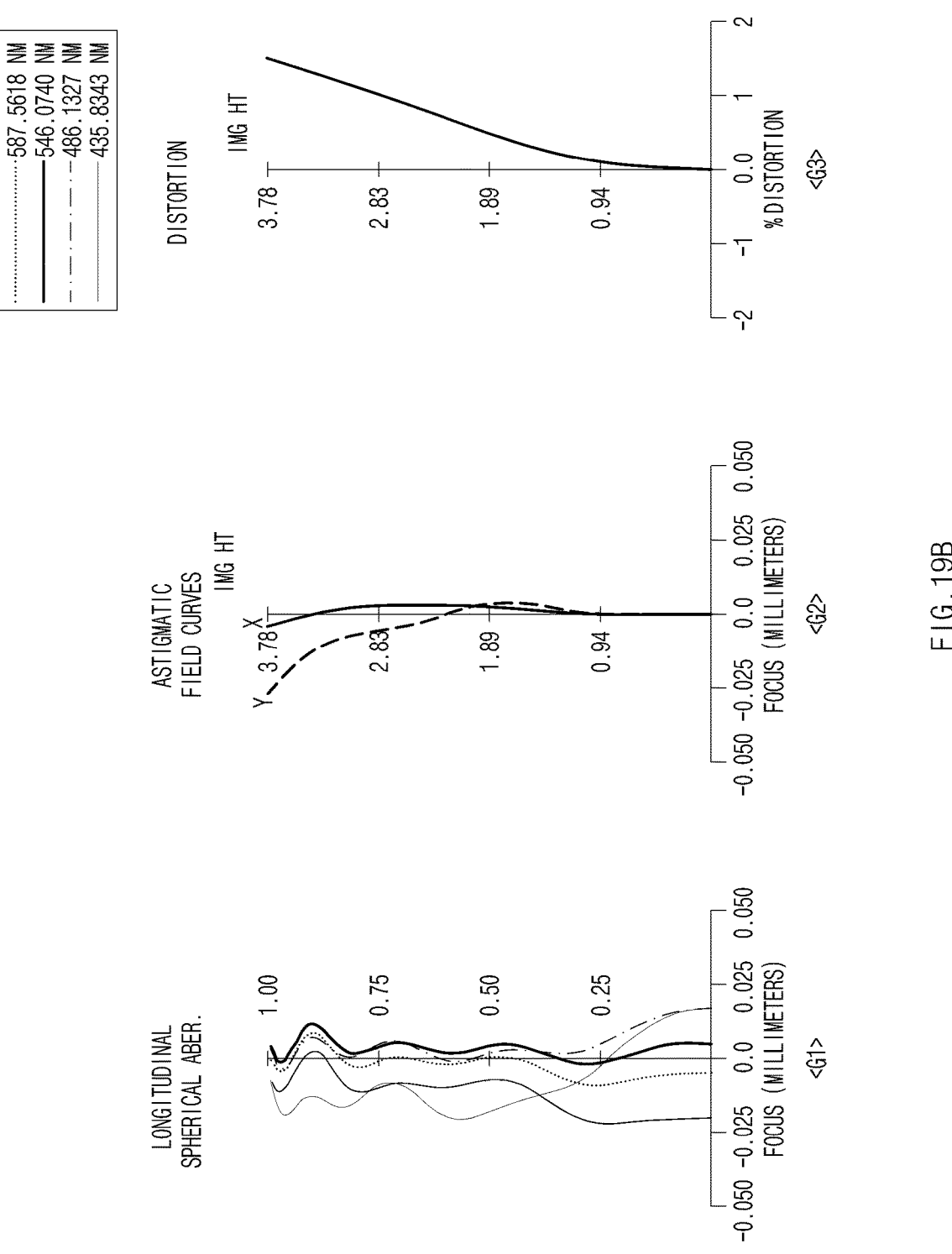
FIG. 19B is an aberration curve of the optical system of the camera according to the thirteenth embodiment.
Figure 19C:
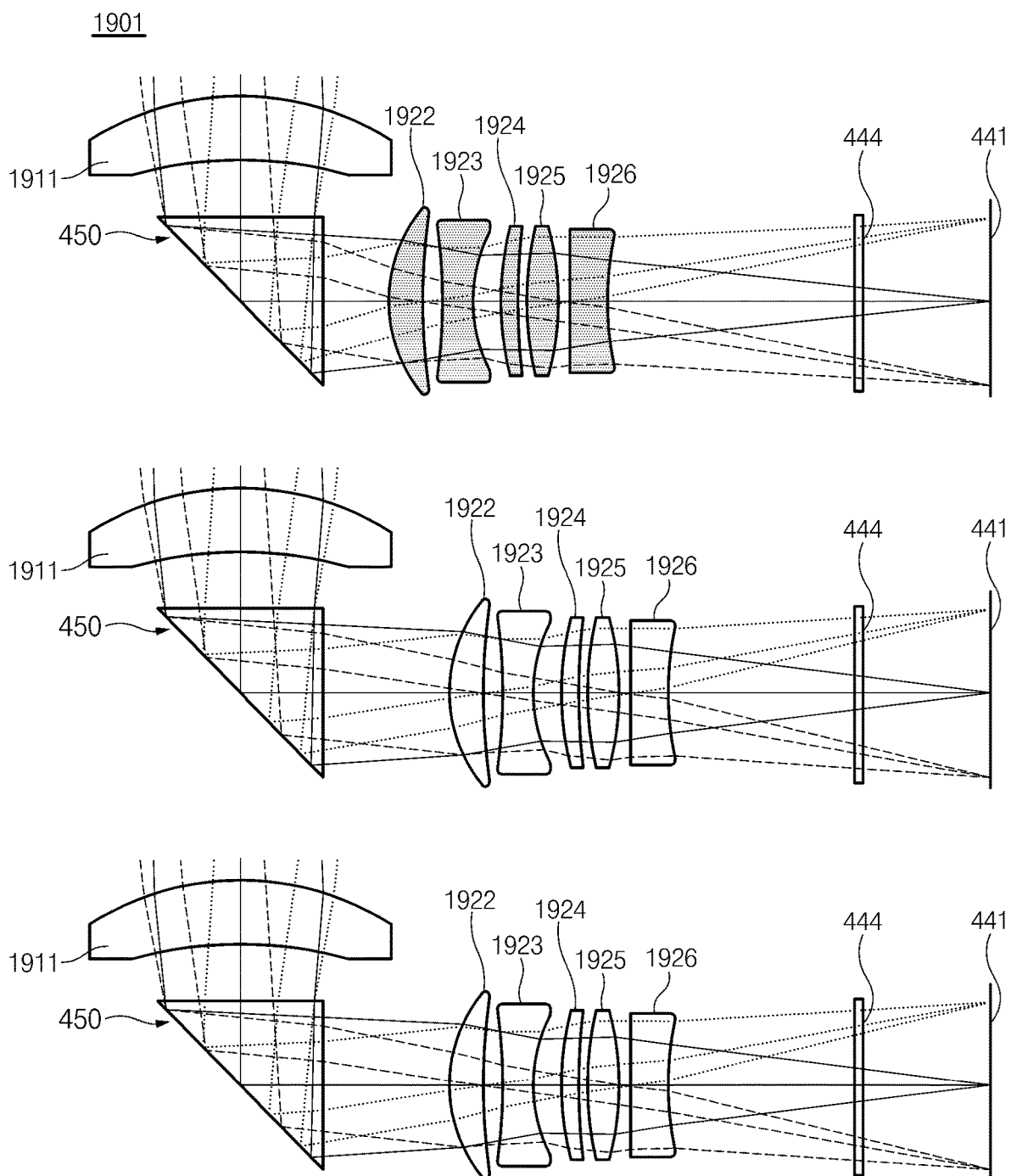
FIG. 19C is a view illustrating the optical system when the camera according to the thirteenth embodiment performs an auto focus function and an image stabilization function.

FIG. 19A is a view illustrating an optical system of a camera according to a thirteenth embodiment. FIG. 19B is an aberration curve of the optical system of the camera according to the thirteenth embodiment. FIG. 19C is a view illustrating the optical system when the camera according to the thirteenth embodiment performs an auto focus function and an image stabilization function.

Referring to FIG. 19A, the optical system 1901 of the camera according to the thirteenth embodiment may include a first one or more lenses 1910 (e.g., the first one or more lenses 1110 of FIG. 13A), a second one or more lenses 1920 (e.g., the second one or more lenses 1120 of FIG. 13A), a reflective member 450 (e.g., the reflective member 450 of FIG. 13A), an image sensor 441 (e.g., the image sensor 441 of FIG. 13A), and an optical filter 444 (e.g., the optical filter 444 of FIG. 13A). For example, when compared to the optical system according to the seventh embodiment (e.g., the optical system 1101 of FIG. 13A), the optical system 1901 according to the thirteenth embodiment may be configured such that lenses included in the second one or more lenses 1920 have different refractive powers (e.g., positive refractive power or negative refractive power).

In an embodiment, the first one or more lenses 1910 may include a first lens 1911 having positive refractive power.

In an embodiment, the second one or more lenses 1920 may have positive refractive power. The second one or more lenses 1920 may be disposed between the reflective member 450 and the image sensor 441 (or, the optical filter 444). The second one or more lenses 1920 may include a second lens 1922, a third lens 1923, a fourth lens 1924, a fifth lens 1925, and a sixth lens 1926 sequentially disposed from the reflective member 450 side. For example, the second one or more lenses 1920 may be configured such that the second lens 1922 is disposed closest to the reflective member 450, the sixth lens 1926 is disposed closest to the image sensor 441, and the third lend 1923, the fourth lens 1924, and the fifth lens 1925 are disposed between the second lens 1922 and the sixth lens 1926.

The second one or more lenses 1920 of the optical system 1901 according to the thirteenth embodiment may include the second lens 1922 having positive refractive power, the third lens 1923 having negative refractive power, the fourth lens 1924 having positive refractive power, the fifth lens 1925 having positive refractive power, and the sixth lens 1926 having negative refractive power.

In certain embodiments, the camera 400 may be configured to adjust a focus position by moving the second one or more lenses 1920 or at least a part of the lenses included in the second one or more lenses 1920 in the direction of a second optical axis (e.g., the second optical axis OA2 of FIGS. 5 and 6). For example, the second one or more lenses 1920 may be entirely moved, or the separate lenses included in the second one or more lenses 1920 may be moved.

Likewise to the optical system 1101 according to the seventh embodiment, the optical system 1901 according to the thirteenth embodiment may satisfy Conditional expression 5, Conditional expression 6, and/or Conditional expression 7 described above. For example, in the optical system 1901 according to the thirteenth embodiment, the optical condition of the first lens 1911 calculated based on Conditional expression 5 may be "Fg1/Ft=1.882". In the optical system 1901 according to the thirteenth embodiment, the optical condition of the second lens 1921 calculated based on Conditional expression 6 may be "t/D=0.155". In the optical system 1901 according to the thirteenth embodiment, the optical condition of the second one or more lenses 1920 calculated based on Conditional expression 7 may be "Dmax/Da=1.09".

Referring to FIG. 19B, <G1> of FIG. 19B is a graph depicting spherical aberration of the optical system 1901 according to the thirteenth embodiment, <G2> of FIG. 19B is a graph depicting astigmatism of the optical system 1901 according to the thirteenth embodiment, and <G3> of FIG. 19B is a graph depicting distortion of the optical system 1901 according to the thirteenth embodiment.

<G1> of FIG. 19B is a graph depicting a change in longitudinal spherical aberration depending on the wavelength of light. The horizontal axis may represent a degree of longitudinal spherical aberration, and the vertical axis may represent a normalized distance from the center of an optical axis (or, a normalized image height). For example, the longitudinal spherical aberration may be represented for light having a wavelength of 656.2725 nm, light having a wavelength of 587.5618 nm, light having a wavelength of 546.0740 nm, light having a wavelength of 486.1427 nm, and light having a wavelength of 435.8343 nm.

<G2> of FIG. 19B is a graph depicting astigmatism for light having a wavelength of 546.0740 nm and may represent astigmatic field curves. In <G2>, a dotted line Y may represent astigmatism in a tangential direction (e.g., tangential field curvature), and a solid line X may represent astigmatism in a sagittal direction (e.g., sagittal field curvature).

<G3> of FIG. 19B is a graph depicting a distortion factor for light having a wavelength of 546.0740 nm. An image taken through the optical system 1901 according to the thirteenth embodiment may be somewhat distorted at a point out of the optical axis and may provide good optical characteristics with a distortion factor of less than about 2%.

Referring to FIG. 19C, the camera 400 may perform the auto focus function by moving all of the lenses included in the second one or more lenses 1920. The second one or more lenses 1920 (e.g., the second lens 1922, the third lens 1923, the fourth lens 1924, the fifth lens 1925, and the sixth lens 1926) having positive refractive power may move to an object side when a close shot is taken and may move to an upper side when a long shot is taken. For example, the second one or more lenses 1920 may move toward a light exit surface 453 of the reflective member 450 when a close shot is taken and may move toward the image sensor 441 when a long shot is taken.

Referring to FIG. 19C, the camera 400 may perform the image stabilization function by rotating the reflective member 450 in response to disturbance applied to the electronic device 300 or the camera 400. The reflective member 450 may be configured to pitch and/or yaw. For example, the reflective member 450 may perform a pitch operation of rotating about a first rotational axis (e.g., the first rotational axis R1 of FIG. 6) perpendicular to a first optical axis OA1 and the second optical axis OA2. The reflective member 450 may perform a yaw operation of rotating about a second rotational axis (e.g., the second rotational axis R2 of FIG. 6) parallel to the first optical axis OA1.

Table 37 shows data of the optical system 1901 according to the thirteenth embodiment.

TABLE 37

| Surf | Note | Radius of curvature (mm) | Thickness/ Distance (mm) | Nd Refractive index | Vd Abbe number | H-Ape |
|------|------|------|------|------|------|------|
| obj | object | infinity | infinity | | | |
| S1 | dummy | infinity | 0.00000 | | | 3.69522 |
| S2* | first lens | 8.75503 | 1.69325 | 1.53485 | 55.74 | 3.60000 |
| S3* | | 15.28053 | 0.88974 | | | 3.20916 |
| S4 | dummy | infinity | 0.51154 | | | 3.09912 |
| S5 | dummy | infinity | 0.00000 | | | 2.97584 |
| S6 | dummy | infinity | 0.00000 | | | 2.97584 |
| S7 | light incident surface | infinity | 2.25000 | 1.78472 | 25.72 | 3.94462 |
| S8 | reflective surface | infinity | −2.25000 | −1.78472 | 25.72 | 4.42267 |
| S9 | light exit surface | infinity | 0.00000 | | | 3.94462 |
| S10 | dummy | infinity | −3.29087 | | | 2.49926 |
| S11 | dummy | infinity | D1 | | | 2.17825 |
| S12* | second | −3.95647 | −0.92467 | −1.53485 | 55.74 | 2.18500 |
| S13* (sto) | lens | −27.20625 | −0.50000 | | | 2.00300 |
| S14* | third lens | 12.60822 | −0.84074 | −1.63918 | 23.49 | 1.92032 |
| S15* | | −3.05783 | −0.68352 | | | 1.69736 |
| S16* | fourth | −6.26002 | −0.50779 | −1.54401 | 55.99 | 1.74005 |
| S17* | lens | −12.89415 | −0.21493 | | | 1.73551 |
| S18* | fifth lens | −8.57421 | −0.81616 | −1.66076 | 20.38 | 1.74861 |
| S19* | | 7.73443 | −0.24219 | | | 1.72 |
| S20* | sixth lens | −16.92687 | −1.1 | −1.63918 | 23.49 | 1.67 |
| S21* | | −5.69643 | D2 | | | 1.67 |
| S22 | dummy | infinity | −4.83814 | | | 1.64125 |
| S23 | optical | infinity | −0.21 | −1.5168 | 64.2 | 2.84176 |
| S24 | filter | infinity | −3.52599 | | | 2.87608 |
| IMG | image sensor | infinity | −0.005 | | | 3.77588 |

The positive thickness/distance in Table 37 means that it is located on the first optical axis OA1, and the negative thickness/distance means that it is located on the second optical axis OA2 perpendicular to the first optical axis OA1. In Table 37, "*" represents that an optical surface is formed of an aspheric surface. In Table 37, IMG means an image plane of the image sensor.

In Table 37, S2 means an object-side surface of the first lens 1911 included in the first one or more lenses 1910. S3 means an upper-side surface (e.g., a surface facing toward the reflective member 450) of the first lens 1911.

In Table 37, S12 means an object-side surface (e.g., a surface facing toward the reflective member 450) of the second lens 1922 included in the second one or more lenses 1920. S13 (sto) means an upper-side surface (e.g., a surface facing toward the image sensor 441) of the second lens 1922 and means that an aperture is formed in the upper-side surface of the second lens 1922. S14 means an object-side surface of the third lens 1923 included in the second one or more lenses 1920, and S15 means an upper-side surface of the third lens 1923. S16 means an object-side surface of the fourth lens 1924 included in the second one or more lenses 1920, and S17 means an upper-side surface of the fourth lens 1924. S18 means an object-side surface of the fifth lens 1925 included in the second one or more lenses 1920, and S19 means an upper-side surface of the fifth lens 1925. S20 means an object-side surface of the sixth lens 1926 included in the second one or more lenses 1920, and S21 means an upper-side surface of the sixth lens 1926.

In Table 37, S7, S8, and S9 mean a light incident surface 451, a reflective surface 452, and the light exit surface 453 included in the reflective member 450 (e.g., a prism). In Table 37, S23 and S24 mean an object-side surface and an upper-side surface of the optical filter.

Aspheric coefficients of the lenses according to the thirteenth embodiment may be represented as in Tables 38-1 and 38-2 below. The aspheric coefficients may be calculated based on Equation 1 described above.

TABLE 38-1

| Surf | K (Conic) | A | B | C | D |
|------|-----------|---|---|---|---|
| S2* | −5.63040E+00 | 1.51501E−03 | −1.70981E−06 | −1.66899E−06 | 4.74290E−07 |
| S3* | 5.69676E+00 | 6.30980E−04 | −5.45492E−05 | 4.25309E−05 | −1.51928E−05 |
| S12* | 9.04779E−01 | −2.93679E−04 | 1.26197E−04 | −5.98495E−04 | 9.35928E−04 |
| S13* | 8.82970E+01 | −7.27679E−03 | 1.53791E−03 | −1.11579E−03 | 1.53062E−03 |
| S14* | −5.67918E+00 | −5.93830E−04 | 2.57788E−05 | −1.73938E−04 | 3.11818E−05 |
| S15* | −1.11737E+00 | 8.69684E−03 | 3.72973E−03 | −1.63179E−02 | 2.05848E−02 |
| S16* | −4.68577E−01 | 1.54431E−04 | 6.84869E−03 | −1.57650E−02 | 1.98021E−02 |
| S17* | −6.62335E+01 | 1.30917E−04 | −1.60654E−03 | −1.36170E−04 | −1.93458E−03 |
| S18* | 7.58537E+00 | 8.54033E−03 | 3.26529E−03 | −9.38908E−03 | 5.19772E−03 |
| S19* | −2.70974E+00 | −3.94681E−03 | 8.31577E−04 | −7.57056E−07 | 0.00000E+00 |
| S20* | −5.35390E+00 | −2.44547E−03 | −5.49609E−03 | 1.12058E−02 | −7.48571E−03 |
| S21* | 2.33393E−01 | 5.25403E−03 | −8.64824E−04 | −9.37286E−04 | 4.96813E−03 |

TABLE 38-2

| Surf | E | F | G | H | J |
|------|---|---|---|---|---|
| S2* | −1.11899E−07 | 1.83283E−08 | −1.63247E−09 | 7.30170E−11 | −1.29076E−12 |
| S3* | 3.12150E−06 | −3.82203E−07 | 2.77611E−08 | −1.10734E−09 | 1.87529E−11 |
| S12* | −6.14295E−04 | 2.32457E−04 | −5.23071E−05 | 6.44999E−06 | −3.32915E−07 |
| S13* | −1.01179E−03 | 3.72370E−04 | −8.26177E−05 | 1.05064E−05 | −5.85802E−07 |
| S14* | −4.71511E−07 | 0.00000E+00 | 0.00000E+00 | 0.00000E+00 | 0.00000E+00 |
| S15* | −1.55452E−02 | 7.22258E−03 | −1.98556E−03 | 2.93430E−04 | −1.78023E−05 |
| S16* | −1.48787E−02 | 6.76847E−03 | −1.78559E−03 | 2.48362E−04 | −1.39795E−05 |
| S17* | 1.92712E−03 | −5.76281E−04 | 5.52314E−05 | 0.00000E+00 | 0.00000E+00 |
| S18* | −1.16313E−03 | 9.29385E−05 | 0.00000E+00 | 0.00000E+00 | 0.00000E+00 |
| S19* | 0.00000E+00 | 0.00000E+00 | 0.00000E+00 | 0.00000E+00 | 0.00000E+00 |
| S20* | 3.00563E−03 | −8.09636E−04 | 1.44463E−04 | −1.49046E−05 | 6.36124E−07 |
| S21* | −5.19559E−03 | 2.68547E−03 | −7.73949E−04 | 1.19762E−04 | −7.80062E−06 |

Auto focus and OIS data of the optical system 1901 according to the thirteenth embodiment may be represented as in Table 39 below.

TABLE 39

| Auto-focus data | | |
| --- | --- | --- |
| Object | infinity | 300 mm |
| D1 | 0 | 1.59000 |
| D2 | 0 | −1.59000 |

| Decenter data | |
| --- | --- |
| Decenter & Bend | Alpha |
| S8 | 45.000 |

| Global coordinates | reference surface S5 | | |
| --- | --- | --- | --- |
| | Y | Z | Alpha |
| S10 | −2.25000 | 2.25000 | 90.000 |

| Pitch OIS 1.5 degree decenter data | | | | |
| --- | --- | --- | --- | --- |
| Basic | Alpha | Beta | Gamma | z-offset |
| S6 | 0.900 | 0.000 | 0.000 | 2.250 |

| Yaw OIS 1.5 degree decenter data | | | | |
| --- | --- | --- | --- | --- |
| Basic | Alpha | Beta | Gamma | z-offset |
| S6 | 0.000 | 0.000 | 1.700 | 2.250 |

Referring to Table 39, in the optical system 1901 according to the thirteenth embodiment, the second one or more lenses 1920 (e.g., the second lens 1922, the third lens 1923, the fourth lens 1924, the fifth lens 1925, and the sixth lens 1926) may move toward the reflective member 450 by a predetermined distance when a close shot is taken. Accordingly, the distance between the object-side surface S12 of the second lens 1922 and the light exit surface S9 of the reflective member 450 may be decreased, and the distance between the upper-side surface S21 of the sixth lens 1926 and the optical filter 444 may be increased. For example, when an image of a subject at infinity (e.g., a long shot) is taken, both D1 and D2 in Table 39 may be 0, and when an image of a subject at a distance of 300 mm (e.g., a close shot) is taken, D1 in Table 39 may be 1.59000, and D2 in Table 39 may be −1.59000. Accordingly, the distance between S9 and S12 is decreased, and the distance between S21 and S23 is increased. In the optical system 1901 according to the thirteenth embodiment, the reflective surface 452 or S8 of the reflective member 450 may form an angle of 45 degrees together with the optical axes OA1 and OA2.

An electronic device according to an embodiment of the disclosure may include a housing and a camera at least partially disposed in the housing. The camera may include a casing. A first one or more lenses that is at least partially disposed inside a first part of the casing that is at least partially exposed to outside of the housing and that has positive refractive power and forms a first optical axis, a second one or more lenses that is disposed inside the second part of the casing that is disposed inside the housing and that forms a second optical axis substantially perpendicular to the first optical axis, a reflective member that is disposed inside the second part of the casing so as to be substantially aligned with the first optical axis and the second optical axis and that rotates about one or more rotational axes perpendicular or parallel to the first optical axis in response to disturbance, and an image sensor that is disposed on the second optical axis and that receives an optical signal passing through the second one or more lenses and generates an electrical signal related to an image, based on the optical signal.

In certain embodiments, the first one or more lenses may include a first lens that is located on an object side and that has positive refractive power and a second lens that is located on a reflective member side and that has negative refractive power.

In certain embodiments, the first lens and the second lens may satisfy Conditional expression 2:

$$[\text{Conditional expression 2}]1.5 \le Vd1/Vd2 \le 3(Vd1 \text{ is an Abbe number of the first lens, and } Vd2 \text{ is an Abbe number of the second lens}).\quad[\text{Conditional expression}$$

In certain embodiments, the Abbe number of the first lens may exceed 50, and the Abbe number of the second lens may be less than or equal to 35.

In certain embodiments, an optical system of the camera may satisfy Conditional expression 1:

$$0.6 \le Fg1/Ft \le 0.9(Fg1 \text{ is a focal length of the first one or more lens, and } Ft \text{ is a focal length of the entire optical system}).\quad[\text{Conditional expression 1}]$$

In certain embodiments, the first one or more lenses may include a telephoto lens having a larger absolute value of a focal length and/or a smaller field of view than the second one or more lens.

In certain embodiments, the second one or more lenses may be configured to linearly move between the reflective member and the image sensor along the second optical axis based on a position of an object.

In certain embodiments, the second one or more lenses may be configured to have negative refractive power and may move so as to be located closer to the image sensor when a close shot is taken than when a long shot is taken.

In certain embodiments, the second one or more lenses may include two or more lenses having refractive powers in different directions, and at least one of the two or more lenses may be configured to move along the second optical axis.

In certain embodiments, the second one or more lenses may include a third lens and a fourth lens, wherein the first lens is closer to the reflective member and a fourth lens is closer to the image sensor. The third lens may have positive refractive power, and the fourth lens may have negative refractive power.

In certain embodiments, the third lens may satisfy Conditional expression 3:

$$t/D \le 0.1(D \text{ is an effective diameter of the third lens, and } t \text{ is a maximum height difference of an object-side lens surface of the third lens}).\quad[\text{Conditional expression 3}]$$

In certain embodiments, the third lens may include an object-side surface and an upper-side surface that have a convex shape, and an aperture may be formed in the upper-side surface.

In certain embodiments, the second one or more lenses may further include a fifth lens closer to the image sensor than the fourth lens, and the fifth lens may have positive refractive power.

In certain embodiments, a plurality of lenses aligned with the second optical axis may be disposed between the reflective member and the image sensor, and the plurality of lenses may satisfy Conditional expression 4:

$$0.5 \leq D\text{max}/Da \leq 1.2 (D\text{max is } a \text{ maximum effective diameter of the plurality of lenses, and } Da \text{ is } a \text{ diameter of an aperture}). \quad \text{[Conditional expression 4]}$$

In certain embodiments, the camera may further include a third one or more lenses disposed between the second one or more lenses and the image sensor. The second one or more lenses may have negative refractive power and may be fixed at a specified position inside the second part of the casing. The third one or more lenses may have positive refractive power and may be configured to move between the second one or more lenses and the image sensor along the second optical axis depending on a position of an object.

In certain embodiments, the camera may further include a third one or more lenses disposed between the second one or more lenses and the image sensor. The second one or more lenses may have positive refractive power and may be fixed at a specified position inside the second part of the casing. The third one or more lenses may have negative refractive power and may be configured to move between the second one or more lenses and the image sensor along the second optical axis depending on a position of an object.

In certain embodiments, the first one or more lenses may include a first lens having positive refractive power. The second one or more lenses have positive refractive power and may include a second lens, a third lens, a fourth lens, and a fifth lens sequentially disposed along the second optical axis from a reflective member side. At least one of the first lens, the second lens, the third lens, or the fourth lens may be configured to linearly move between the reflective member and the image sensor along the second optical axis in response to a position of an object.

In certain embodiments, an optical system comprising the first one or more lenses and the second one or more lenses of the camera may satisfy Conditional expression 5:

$$1 \leq Fg1/Ft \leq 5 (Fg1 \text{ is } a \text{ focal length of the first one or more lens, and } Ft \text{ is } a \text{ focal length of the optical system}). \quad \text{[Conditional expression 5]}$$

In certain embodiments, an object-side lens surface of the second lens may be convex facing the reflective member, and the second lens may satisfy Conditional expression 6:

$$t/D \leq 0.35 (D \text{ is an effective diameter of the second lens, and } t \text{ is } a \text{ maximum height difference of the object-side lens surface of the second lens}). \quad \text{[Conditional expression 6]}$$

In certain embodiments, the second one or more lenses may satisfy Conditional expression 7:

$$0.5 \leq D\text{max}/Da \leq 1.3 (D\text{max is } a \text{ maximum effective diameter of the lenses included in the second one or more lens, and } Da \text{ is } a \text{ diameter of an aperture}). \quad \text{[Conditional expression 7]}$$

In certain embodiments, a camera comprises: a casing including a first part protruding from a second part; a first one or more lenses disposed inside the first part of the casing, the one or more lenses having positive refractive power, wherein the first one or more lenses form a first optical axis; a second one or more lenses disposed inside the second part of the casing, the second one or more lenses forming a second optical axis substantially perpendicular to the first optical axis; a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being configured to receive an optical signal passing through the second one or more lenses and generate an electrical signal based on the optical signal.

In certain embodiments, the first one or more lenses includes a first lens located on an object side and having positive refractive power and a second lens located on a reflective member side and having negative refractive power.

In certain embodiments, the first lens and the second lens satisfy Conditional expression 2:

$$1.5 \leq Vd1/Vd2 \leq 3 \quad \text{Conditional expression 2}$$

where, Vd1 is an Abbe number of the first lens, and Vd2 is an Abbe number of the second lens.

In certain embodiments, an optical system of the camera satisfies Conditional expression 1:

$$0.6 \leq Fg1/Ft \leq 0.9 \quad \text{Conditional expression 1}$$

where, Fg1 is a focal length of the first one or more lens, and Ft is a focal length of the entire optical system.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing; and
a camera at least partially disposed in the housing, wherein the camera includes:
a casing;

a first one or more lenses at least partially disposed inside a first part of the casing that is at least partially exposed to outside of the housing, the first one or more lenses having positive refractive power, wherein the first one or more lenses forms a first optical axis;

a second one or more lenses disposed inside a second part of the casing that is disposed inside the housing, wherein the second one or more lenses form a second optical axis substantially perpendicular to the first optical axis;

a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being configured to receive an optical signal passing through the second one or more lenses and generate an electrical signal based on the optical signal wherein the refractive power of the first one or more lenses with respect to refractive power of both the first one or more lenses and the second one or more lenses is limited to a predetermined range, and wherein a size of the first one or more lenses is larger than a size of the second one or more lenses.

2. The electronic device of claim 1, wherein the first one or more lenses includes a first lens located on an object side and having positive refractive power and a second lens located on a reflective member side and having negative refractive power.

3. The electronic device of claim 2, wherein the first lens and the second lens satisfy Conditional expression 2:

$$1.5 \le Vd1/Vd2 \le 3 \qquad \text{Conditional expression 2}$$

where, Vd1 is an Abbe number of the first lens, and Vd2 is an Abbe number of the second lens.

4. The electronic device of claim 1, wherein an optical system of the camera satisfies Conditional expression 1:

$$0.6 \le Fg1/Ft \le 0.9 \qquad \text{Conditional expression 1}$$

where, Fg1 is a focal length of the first one or more lenses, and Ft is a focal length of the camera.

5. The electronic device of claim 1, wherein an absolute value of a focal length of the first one or more lenses is smaller than an absolute value of a focal length of the second one or more lenses.

6. The electronic device of claim 1, wherein the second one or more lenses is configured to linearly move between the reflective member and the image sensor along the second optical axis based on a position of an object.

7. The electronic device of claim 6, wherein the second one or more lenses includes two or more lenses having refractive powers in different directions, and
wherein at least one of the two or more lenses is configured to move along the second optical axis.

8. The electronic device of claim 1, wherein the second one or more lenses includes a third lens and a fourth lens, wherein the third lens is closer to the reflective member than the fourth lens, and the fourth lens is closer to the image sensor than the third lens,
wherein the third lens has positive refractive power, and
wherein the fourth lens has negative refractive power.

9. The electronic device of claim 8, wherein the third lens satisfies Conditional expression 3:

$$t/D \leq 0.1 \qquad \text{Conditional expression 3}$$

where, D is an effective diameter of the third lens, and t is a maximum height difference of an object-side lens surface of the third lens.

10. The electronic device of claim 8, wherein the second one or more lenses further includes a fifth lens closer to the image sensor than the fourth lens, and wherein the fifth lens has positive refractive power.

11. The electronic device of claim 1, wherein a plurality of lenses aligned with the second optical axis are disposed between the reflective member and the image sensor, and wherein the plurality of lenses satisfy Conditional expression 4:

$$0.5 \leq Dmax/Da \leq 1.2 \qquad \text{Conditional expression 4}$$

where, Dmax is a maximum effective diameter of the plurality of lenses, and Da is a diameter of an aperture.

12. The electronic device of claim 1, wherein the first one or more lenses includes a first lens having positive refractive power, wherein the second one or more lenses have positive refractive power, wherein at least one of the lenses included in the second one or more lenses is configured to linearly move between the reflective member and the image sensor along the second optical axis in response to a position of an object, and wherein an optical system comprising the first one or more lenses and the second one or more lenses of the camera satisfies Conditional expression 5:

$$1 \leq Fg1/Ft \leq 5 \qquad \text{Conditional expression 5}$$

where, Fg1 is a focal length of the first lens, and Ft is a focal length of the optical system.

13. The electronic device of claim 12, wherein the second one or more lenses includes a second lens and a third lens sequentially disposed along the second optical axis from a reflective member side, wherein an object-side lens surface of the second lens is convex and facing the reflective member, and wherein the second lens satisfies Conditional expression 6:

$$t/D \leq 0.35 \qquad \text{Conditional expression 6}$$

where, D is an effective diameter of the second lens, and t is a maximum height difference of the object-side lens surface of the second lens.

14. The electronic device of claim 12, wherein the second one or more lenses satisfies Conditional expression 7:

$$0.5 \leq Dmax/Da \leq 1.3 \qquad \text{Conditional expression 7}$$

where, Dmax is a maximum effective diameter of the lenses included in the second one or more lenses, and Da is a diameter of an aperture.

15. The electronic device of claim 12, wherein an absolute value of a focal length of the first one or more lenses is greater than an absolute value of a focal length of the second one or more lenses.

16. The electronic device of claim 1, further comprising:

a filter disposed between the second one or more lenses and the image sensor.

17. A camera comprising:

a casing including a first part protruding from a second part;

a first one or more lenses disposed inside the first part of the casing, the first one or more lenses having positive refractive power, wherein the first one or more lenses form a first optical axis;

a second one or more lenses disposed inside the second part of the casing, wherein the second one or more lenses forming a second optical axis substantially perpendicular to the first optical axis;

a reflective member disposed inside the second part of the casing and substantially aligned with the first optical axis and the second optical axis, the reflective member being configured to rotate about one or more rotational axes perpendicular or parallel to the first optical axis in response to disturbance; and an image sensor disposed on the second optical axis, the image sensor being configured to receive an optical signal passing through the second one or more lenses and generate an electrical signal based on the optical signal, wherein the refractive power of the first one or more lenses with respect to refractive power of both the first one or more lenses and the second one or more lenses is limited to a predetermined range, and wherein a size of the first one or more lenses is larger than a size of the second one or more lenses.

18. The camera of claim 17, wherein the first one or more lenses includes a first lens located on an object side and having positive refractive power and a second lens located on a reflective member side and having negative refractive power.

19. The camera of claim 18, wherein the first lens and the second lens satisfy Conditional expression 2:

$$1.5 \leq Vd1/Vd2 \leq 3 \qquad \text{Conditional expression 2}$$

where, Vd1 is an Abbe number of the first lens, and Vd2 is an Abbe number of the second lens.

20. The camera of claim 17, wherein an optical system of the camera satisfies Conditional expression 1:

$$0.6 \leq Fg1/Ft \leq 0.9 \qquad \text{Conditional expression 1}$$

where, Fg1 is a focal length of the first one or more lenses, and Ft is a focal length of the camera.

* * * * *